(12) United States Patent
Kain et al.

(10) Patent No.: US 7,587,351 B1
(45) Date of Patent: Sep. 8, 2009

(54) METHOD FOR ALLOCATING PRINCIPAL PAYMENTS UTILIZING CAPPED NON-ACCELERATED/ACCELERATED SECURITIES

(75) Inventors: Gary D. Kain, Oak Hill, VA (US); Christopher J. Kuehl, Arlington, VA (US)

(73) Assignee: Freddie Mac, McLean, VA (US)

( * ) Notice: Subject to any disclaimer, the term of this patent is extended or adjusted under 35 U.S.C. 154(b) by 499 days.

(21) Appl. No.: 10/915,602

(22) Filed: Aug. 11, 2004

Related U.S. Application Data

(60) Provisional application No. 60/513,223, filed on Oct. 23, 2003.

(51) Int. Cl.
*G06Q 40/00* (2006.01)
(52) U.S. Cl. .................. 705/36 R; 705/35; 705/38
(58) Field of Classification Search .............. 705/38, 705/40, 35, 36 R
See application file for complete search history.

(56) References Cited

U.S. PATENT DOCUMENTS

| | | | | |
|---|---|---|---|---|
| 4,876,648 | A * | 10/1989 | Lloyd ........................... | 705/38 |
| 5,673,402 | A * | 9/1997 | Ryan et al. ..................... | 705/38 |
| 6,684,189 | B1 * | 1/2004 | Ryan et al. ..................... | 705/4 |
| 7,249,077 | B2 * | 7/2007 | Williams et al. ............... | 705/35 |
| 2001/0037287 | A1 * | 11/2001 | Broadbent et al. ............ | 705/38 |
| 2002/0065753 | A1 * | 5/2002 | Schloss et al. ................ | 705/35 |
| 2002/0123949 | A1 * | 9/2002 | VanLeeuwen ................ | 705/35 |
| 2002/0169702 | A1 * | 11/2002 | Eaton et al. .................... | 705/36 |
| 2003/0009409 | A1 * | 1/2003 | Horner et al. ................. | 705/36 |
| 2003/0033242 | A1 * | 2/2003 | Lynch et al. .................. | 705/38 |
| 2003/0115128 | A1 * | 6/2003 | Lange et al. .................. | 705/37 |
| 2003/0154161 | A1 * | 8/2003 | Stahl et al. .................... | 705/38 |
| 2003/0204459 | A1 * | 10/2003 | Schulman .................... | 705/35 |
| 2004/0002915 | A1 * | 1/2004 | McDonald et al. ........... | 705/38 |
| 2005/0060257 | A1 * | 3/2005 | Fry ............................. | 705/38 |
| 2006/0155639 | A1 * | 7/2006 | Lynch et al. .................. | 705/38 |

OTHER PUBLICATIONS

Steven L Schwarcz. The parts are greater than the whole: How securitization of divisible interess can revolutionize structured finance and open the capital markets to middle-market companies. Columbia Law School. 1993. p. 1-26.*

Steven L Schwarcz. The parts are greater than the whole: How securization of divisible interess can revolutionize structured finance and open the capital markets to middle-market companies. Columbia Law School. 1993. p. 1-26.*

* cited by examiner

*Primary Examiner*—James P Trammell
*Assistant Examiner*—Jamie H Swartz
(74) *Attorney, Agent, or Firm*—Finnegan, Henderson, Farabow, Garrett & Dunner, LLP

(57) ABSTRACT

A system and method for allocating principal payments by creating Capped NAS/AS securities classes, Both scheduled and unscheduled principal prepayments are redirected, subject to a maximum percentage, or cap, as determined by formula. The formula is a novel payment priority rule that redistributes risks related to the borrower's prepayment option through prioritization of the cash flows among the NAS/AS Classes, allowing for the efficient creation of classes with more and less WAL stability to meet specific investor's needs.

20 Claims, 48 Drawing Sheets

FIG. 3

| PERIOD | COLLAT | | | | CAP AT (SCHEDULE + (PREPAY*SHIFT)) | | | | TO FIG. 3 CONT. 1 → |
|---|---|---|---|---|---|---|---|---|---|
| | PRINCIPAL | BALANCE | SCHED PRINC | PREPAY PRINC | CAP 1 | % SHIFT PREPAY | SCHED *SHIFT | PREPAY*SHIFT | |
| TOTAL | 0.00 | 100,000,000.00 | 66,990,512.89 | 33,009,487.11 | | | | | |
| 0 | 0.00 | 100,000,000.00 | | | | | | | |
| 1 | 806,261.96 | 99,193,738.04 | 381,356.69 | 424,905.27 | 991,937.38 | 0.00 | 0.00 | 0.00 | |
| 2 | 802,766.19 | 98,390,971.85 | 381,299.64 | 421,466.55 | 983,909.72 | 0.00 | 0.00 | 0.00 | |
| 3 | 799,285.33 | 97,591,686.52 | 381,242.59 | 418,042.74 | 975,916.87 | 0.00 | 0.00 | 0.00 | |
| 4 | 795,819.32 | 96,795,867.20 | 381,185.55 | 414,633.78 | 967,958.67 | 0.00 | 0.00 | 0.00 | |
| 5 | 792,368.11 | 96,003,499.09 | 381,128.52 | 411,239.60 | 960,034.99 | 0.00 | 0.00 | 0.00 | |
| 6 | 788,931.63 | 95,214,567.46 | 381,071.49 | 407,860.14 | 952,145.67 | 0.00 | 0.00 | 0.00 | |
| 7 | 785,509.81 | 94,429,057.64 | 381,014.48 | 404,495.33 | 944,290.58 | 0.00 | 0.00 | 0.00 | |
| 8 | 782,102.60 | 93,646,955.04 | 380,957.47 | 401,145.13 | 936,469.55 | 0.00 | 0.00 | 0.00 | |
| 9 | 778,709.93 | 92,868,245.11 | 380,900.48 | 397,809.45 | 928,682.45 | 0.00 | 0.00 | 0.00 | |
| 10 | 775,331.74 | 92,092,913.37 | 380,843.49 | 394,488.25 | 920,929.13 | 0.00 | 0.00 | 0.00 | |
| 11 | 771,967.97 | 91,320,945.40 | 380,786.51 | 391,181.46 | 913,209.45 | 0.00 | 0.00 | 0.00 | |
| 12 | 768,618.55 | 90,552,326.85 | 380,729.54 | 387,889.01 | 905,523.27 | 0.00 | 0.00 | 0.00 | |
| 13 | 765,283.42 | 89,787,043.43 | 380,672.57 | 384,610.85 | 897,870.43 | 25.00 | 95,168.14 | 96,152.71 | |
| 14 | 761,962.54 | 89,025,080.89 | 380,615.62 | 381,346.92 | 890,250.81 | 25.00 | 95,153.91 | 95,336.73 | |
| 15 | 758,655.82 | 88,266,425.08 | 380,558.67 | 378,097.15 | 882,664.25 | 25.00 | 95,139.67 | 94,524.29 | |
| 16 | 755,363.22 | 87,511,061.86 | 380,501.74 | 374,861.48 | 875,110.62 | 25.00 | 95,125.44 | 93,715.37 | |
| 17 | 752,084.66 | 86,758,977.20 | 380,444.81 | 371,639.86 | 867,589.77 | 25.00 | 95,111.20 | 92,909.97 | |
| 18 | 748,820.11 | 86,010,157.09 | 380,387.89 | 368,432.22 | 860,101.57 | 25.00 | 95,096.97 | 92,108.06 | |
| 19 | 745,569.48 | 85,264,587.61 | 380,330.98 | 365,238.51 | 852,645.88 | 25.00 | 95,082.75 | 91,309.63 | |
| 20 | 742,332.73 | 84,522,254.88 | 380,274.07 | 362,058.66 | 845,222.55 | 25.00 | 95,068.52 | 90,514.67 | |
| 21 | 739,109.79 | 83,783,145.09 | 380,217.18 | 358,892.61 | 837,831.45 | 25.00 | 95,054.30 | 89,723.15 | |
| 22 | 735,900.61 | 83,047,244.48 | 380,160.29 | 355,740.32 | 830,472.44 | 25.00 | 95,040.07 | 88,935.08 | |
| 23 | 732,705.12 | 82,314,539.36 | 380,103.41 | 352,601.71 | 823,145.39 | 25.00 | 95,025.85 | 88,150.43 | |
| 24 | 729,523.27 | 81,585,016.09 | 380,046.54 | 349,476.73 | 815,850.16 | 25.00 | 95,011.64 | 87,369.18 | |

FROM FIG. 3 →
TO FIG. 3 CONT. 3 →

| CAPPED NAS | | CAPPED AS | | NON-CAPPED NAS | | NC AS | |
|---|---|---|---|---|---|---|---|
| SCHEDULES PRINCIPAL | BALANCE | PRINCIPAL | BALANCE | SCHEDULES PRINCIPAL | BALANCE | PRINCIPAL | BALANCE |
| — | 23,000,000.04 | 0.00 | 75,000,000.00 | — | 23,000,000.00 | 0.00 | 75,000,000.00 |
| 0.00 | 25,000,000.00 | 806,261.96 | 74,193,738.04 | — | 25,000,000.00 | 806,261.96 | 74,193,738.04 |
| 0.00 | 25,000,000.00 | 802,766.19 | 73,390,971.85 | — | 25,000,000.00 | 802,766.19 | 73,390,971.85 |
| 0.00 | 25,000,000.00 | 799,285.33 | 72,591,686.52 | — | 25,000,000.00 | 799,285.33 | 72,591,686.52 |
| 0.00 | 25,000,000.00 | 795,819.32 | 71,795,867.20 | — | 25,000,000.00 | 795,819.32 | 71,795,867.20 |
| 0.00 | 25,000,000.00 | 792,368.11 | 71,003,499.09 | — | 25,000,000.00 | 792,368.11 | 71,003,499.09 |
| 0.00 | 25,000,000.00 | 788,931.63 | 70,214,567.46 | — | 25,000,000.00 | 788,931.63 | 70,214,567.46 |
| 0.00 | 25,000,000.00 | 785,509.81 | 69,429,057.64 | — | 25,000,000.00 | 785,509.81 | 69,429,057.64 |
| 0.00 | 25,000,000.00 | 782,102.60 | 68,646,955.04 | — | 25,000,000.00 | 782,102.60 | 68,646,955.04 |
| 0.00 | 25,000,000.00 | 778,709.93 | 67,868,245.11 | — | 25,000,000.00 | 778,709.93 | 67,868,245.11 |
| 0.00 | 25,000,000.00 | 775,331.74 | 67,092,913.37 | — | 25,000,000.00 | 775,331.74 | 67,092,913.37 |
| 0.00 | 25,000,000.00 | 771,967.97 | 66,320,945.40 | — | 25,000,000.00 | 771,967.97 | 66,320,945.40 |
| 0.00 | 25,000,000.00 | 768,618.55 | 65,552,326.85 | — | 25,000,000.00 | 768,618.55 | 65,552,326.85 |
| 191,320.86 | 24,808,679.14 | 573,962.57 | 64,978,364.29 | 191,320.86 | 24,808,679.14 | 573,962.57 | 64,978,364.29 |
| 190,490.64 | 24,618,188.51 | 571,471.90 | 64,406,892.38 | 190,490.63 | 24,618,188.51 | 571,471.90 | 64,406,892.38 |
| 189,663.96 | 24,428,524.56 | 568,991.86 | 63,837,900.52 | 189,663.95 | 24,428,524.56 | 568,991.86 | 63,837,900.52 |
| 188,840.80 | 24,239,683.75 | 566,522.41 | 63,271,378.11 | 188,840.80 | 24,239,683.75 | 566,522.41 | 63,271,378.11 |
| 188,021.17 | 24,051,662.59 | 564,063.50 | 62,707,314.61 | 188,021.17 | 24,051,662.59 | 564,063.50 | 62,707,314.61 |
| 187,205.03 | 23,864,457.56 | 561,615.08 | 62,145,699.53 | 187,205.03 | 23,864,457.56 | 561,615.08 | 62,145,699.53 |
| 186,392.37 | 23,678,065.19 | 559,177.11 | 61,586,522.42 | 186,392.37 | 23,678,065.19 | 559,177.11 | 61,586,522.42 |
| 185,583.18 | 23,492,482.01 | 556,749.55 | 61,029,772.87 | 185,583.18 | 23,492,482.01 | 556,749.55 | 61,029,772.87 |
| 184,777.45 | 23,307,704.56 | 554,332.34 | 60,475,440.53 | 184,777.45 | 23,307,704.56 | 554,332.34 | 60,475,440.53 |
| 183,975.15 | 23,123,729.41 | 551,925.46 | 59,923,515.07 | 183,975.15 | 23,123,729.41 | 551,925.46 | 59,923,515.07 |
| 183,176.28 | 22,940,553.13 | 549,528.84 | 59,373,986.23 | 183,176.28 | 22,940,553.13 | 549,528.84 | 59,373,986.23 |
| 182,380.82 | 22,758,172.31 | 547,142.46 | 58,826,843.78 | 182,380.82 | 22,758,172.31 | 547,142.46 | 58,826,843.78 |

| | | | | | | |
|---|---|---|---|---|---|---|
| 25 | 726,355.01 | 80,858,661.08 | 379,989.68 | 346,365.32 | 808,586.61 | 50.00 | 189,994.84 | 173,182.66 |
| 26 | 723,200.26 | 80,135,460.82 | 379,932.83 | 343,267.43 | 801,354.61 | 50.00 | 189,966.42 | 171,633.72 |
| 27 | 720,058.98 | 79,415,401.84 | 379,875.99 | 340,182.99 | 794,154.02 | 50.00 | 189,938.00 | 170,091.50 |
| 28 | 716,931.11 | 78,698,470.73 | 379,819.15 | 337,111.95 | 786,984.71 | 50.00 | 189,909.58 | 168,555.98 |
| 29 | 713,816.58 | 77,984,654.15 | 379,762.32 | 334,054.26 | 779,846.54 | 50.00 | 189,881.16 | 167,027.13 |
| 30 | 710,715.35 | 77,273,938.80 | 379,705.51 | 331,009.84 | 772,739.39 | 50.00 | 189,852.76 | 165,504.92 |
| 31 | 707,627.36 | 76,566,311.44 | 379,648.70 | 327,978.66 | 765,663.11 | 50.00 | 189,824.35 | 163,989.33 |
| 32 | 704,552.54 | 75,861,758.90 | 379,591.90 | 324,960.65 | 758,617.59 | 50.00 | 189,795.95 | 162,480.33 |
| 33 | 701,490.85 | 75,160,268.05 | 379,535.10 | 321,955.75 | 751,602.68 | 50.00 | 189,767.55 | 160,977.88 |
| 34 | 698,442.22 | 74,461,825.83 | 379,478.32 | 318,963.91 | 744,618.26 | 50.00 | 189,739.16 | 159,481.96 |
| 35 | 695,406.61 | 73,766,419.22 | 379,421.54 | 315,985.07 | 737,664.19 | 50.00 | 189,710.77 | 157,992.54 |
| 36 | 692,383.96 | 73,074,035.26 | 379,364.77 | 313,019.18 | 730,740.35 | 50.00 | 189,682.39 | 156,509.59 |
| 37 | 689,374.20 | 72,384,661.06 | 379,308.02 | 310,066.19 | 723,846.61 | 75.00 | 284,481.02 | 232,549.64 |
| 38 | 686,377.29 | 71,698,283.77 | 379,251.27 | 307,126.03 | 716,982.84 | 75.00 | 284,438.45 | 230,344.52 |
| 39 | 683,393.17 | 71,014,890.59 | 379,194.52 | 304,198.65 | 710,148.91 | 75.00 | 284,395.89 | 228,148.99 |
| 40 | 680,421.79 | 70,334,468.80 | 379,137.79 | 301,284.00 | 703,344.69 | 75.00 | 284,353.34 | 225,963.00 |
| 41 | 677,463.09 | 69,657,005.70 | 379,081.07 | 298,382.03 | 696,570.06 | 75.00 | 284,310.80 | 223,786.52 |
| 42 | 674,517.02 | 68,982,488.68 | 379,024.35 | 295,492.67 | 689,824.89 | 75.00 | 284,268.26 | 221,619.50 |
| 43 | 671,583.53 | 68,310,905.15 | 378,967.64 | 292,615.89 | 683,109.05 | 75.00 | 284,225.73 | 219,461.92 |
| 44 | 668,662.55 | 67,642,242.60 | 378,910.94 | 289,751.61 | 676,422.43 | 75.00 | 284,183.21 | 217,313.71 |
| 45 | 665,754.04 | 66,976,488.56 | 378,854.25 | 286,899.79 | 669,764.89 | 75.00 | 284,140.69 | 215,174.84 |
| 46 | 662,857.95 | 66,313,630.61 | 378,797.57 | 284,060.38 | 663,136.31 | 75.00 | 284,098.18 | 213,045.29 |
| 47 | 659,974.22 | 65,653,656.39 | 378,740.89 | 281,233.32 | 656,536.56 | 75.00 | 284,055.67 | 210,924.99 |
| 48 | 657,102.79 | 64,996,553.59 | 378,684.23 | 278,418.56 | 649,965.54 | 75.00 | 284,013.17 | 208,813.92 |
| 49 | 654,243.63 | 64,342,309.97 | 378,627.57 | 275,616.05 | 643,423.10 | 75.00 | 283,970.68 | 206,712.04 |
| 50 | 651,396.66 | 63,690,913.31 | 378,570.92 | 272,825.74 | 636,909.13 | 75.00 | 283,928.19 | 204,619.31 |
| 51 | 648,561.85 | 63,042,351.46 | 378,514.28 | 270,047.56 | 630,423.51 | 75.00 | 283,885.71 | 202,535.67 |
| 52 | 645,739.13 | 62,396,612.32 | 378,457.65 | 267,281.48 | 623,966.12 | 75.00 | 283,843.24 | 200,461.11 |
| 53 | 642,928.47 | 61,753,683.85 | 378,401.03 | 264,527.44 | 617,536.84 | 75.00 | 283,800.77 | 198,395.58 |

| | | | | | | TO FIG. 3 CONT. 5 → |
|---|---|---|---|---|---|---|
| 54 | 640,129.80 | 61,113,554.05 | 378,344.41 | 261,785.39 | 611,135.54 | 283,758.31 | 196,339.04 |
| 55 | 637,343.08 | 60,476,210.97 | 378,287.81 | 259,055.27 | 604,762.11 | 283,715.86 | 194,291.45 |
| 56 | 634,568.25 | 59,841,642.72 | 378,231.21 | 256,337.04 | 598,416.43 | 283,673.41 | 192,252.78 |
| 57 | 631,805.27 | 59,209,837.45 | 378,174.62 | 253,630.65 | 592,098.37 | 283,630.97 | 190,222.99 |
| 58 | 629,054.08 | 58,580,783.37 | 378,118.04 | 250,936.04 | 585,807.83 | 283,588.53 | 188,202.03 |
| 59 | 626,314.63 | 57,954,468.74 | 378,061.47 | 248,253.16 | 579,544.69 | 283,546.10 | 186,189.87 |
| 60 | 623,586.88 | 57,330,881.87 | 378,004.90 | 245,581.97 | 573,308.82 | 283,503.68 | 184,186.48 |
| 61 | 620,870.77 | 56,710,011.10 | 377,948.35 | 242,922.42 | 567,100.11 | 283,461.26 | 182,191.82 |
| 62 | 618,166.25 | 56,091,844.85 | 377,891.80 | 240,274.45 | 560,918.45 | 283,418.85 | 180,205.84 |
| 63 | 615,473.27 | 55,476,371.58 | 377,835.26 | 237,638.01 | 554,763.72 | 283,376.45 | 178,228.51 |
| 64 | 612,791.80 | 54,863,579.78 | 377,778.73 | 235,013.06 | 548,635.80 | 283,334.05 | 176,259.80 |
| 65 | 610,121.76 | 54,253,458.02 | 377,722.21 | 232,399.55 | 542,534.58 | 283,291.66 | 174,299.66 |
| 66 | 607,463.13 | 53,645,994.89 | 377,665.70 | 229,797.43 | 536,459.95 | 283,249.28 | 172,348.07 |
| 67 | 604,815.84 | 53,041,179.05 | 377,609.19 | 227,206.65 | 530,411.79 | 283,206.89 | 170,404.99 |
| 68 | 602,179.85 | 52,438,999.20 | 377,552.70 | 224,627.15 | 524,389.99 | 283,164.53 | 168,470.36 |
| 69 | 599,555.12 | 51,839,444.08 | 377,496.21 | 222,058.91 | 518,394.44 | 283,122.16 | 166,544.18 |
| 70 | 596,941.58 | 51,242,502.50 | 377,439.73 | 219,501.85 | 512,425.03 | 283,079.80 | 164,626.39 |
| 71 | 594,339.21 | 50,648,163.29 | 377,383.26 | 216,955.95 | 506,481.63 | 283,037.45 | 162,716.96 |
| 72 | 591,747.94 | 50,056,415.35 | 377,326.80 | 214,421.14 | 500,564.15 | 282,995.10 | 160,815.86 |
| 73 | 589,167.73 | 49,467,247.61 | 377,270.34 | 211,897.39 | 494,672.48 | 282,952.76 | 158,923.04 |
| 74 | 586,598.54 | 48,880,649.07 | 377,213.90 | 209,384.64 | 488,806.49 | 282,910.43 | 157,038.48 |
| 75 | 584,040.32 | 48,296,608.76 | 377,157.46 | 206,882.85 | 482,966.09 | 282,868.10 | 155,162.14 |
| 76 | 581,493.01 | 47,715,115.75 | 377,101.03 | 204,391.98 | 477,151.16 | 282,825.77 | 153,293.99 |
| 77 | 578,956.58 | 47,136,159.17 | 377,044.61 | 201,911.96 | 471,361.59 | 282,783.46 | 151,433.97 |
| 78 | 576,430.97 | 46,559,728.20 | 376,988.20 | 199,442.77 | 465,597.28 | 282,741.15 | 149,582.08 |
| 79 | 573,916.15 | 45,985,812.05 | 376,931.80 | 196,984.35 | 459,858.12 | 282,698.85 | 147,738.26 |
| 80 | 571,412.06 | 45,414,400.00 | 376,875.40 | 194,536.65 | 454,144.00 | 282,656.55 | 145,902.49 |
| 81 | 568,918.66 | 44,845,481.34 | 376,819.02 | 192,099.64 | 448,454.81 | 282,614.27 | 144,074.73 |
| 82 | 566,435.90 | 44,279,045.44 | 376,762.64 | 189,673.26 | 442,790.45 | 282,571.98 | 142,254.95 |

← FROM FIG. 3 CONT. 2

TO FIG. 3 CONT. 6 →

| | | | | | |
|---|---|---|---|---|---|
| ← FROM FIG. 3 CONT. 4 | 480,097.35 | | 480,097.35 | 9,532,320.99 | 160,032.45 | 51,581,233.06 |
| | 478,007.31 | | 478,007.31 | 9,054,313.68 | 159,335.77 | 51,421,897.29 |
| | 475,926.19 | | 475,926.19 | 8,578,387.49 | 158,642.06 | 51,263,255.23 |
| | 473,853.95 | | 473,853.95 | 8,104,533.54 | 157,951.32 | 51,105,303.91 |
| | 471,790.56 | | 471,790.56 | 7,632,742.98 | 157,263.52 | 50,948,040.39 |
| | 469,735.97 | | 469,735.97 | 7,163,007.01 | 156,578.66 | 50,791,461.74 |
| | 467,690.15 | | 467,690.16 | 6,695,316.85 | 155,896.72 | 50,635,565.02 |
| | 465,653.08 | | 465,653.07 | 6,229,663.78 | 155,217.69 | 50,480,347.33 |
| | 463,624.69 | | 463,624.69 | 5,766,039.09 | 154,541.56 | 50,325,805.76 |
| | 461,604.95 | | 461,604.96 | 5,304,434.13 | 153,868.32 | 50,171,937.44 |
| | 459,593.84 | | 459,593.85 | 4,844,840.29 | 153,197.95 | 50,018,739.50 |
| | 457,591.32 | | 457,591.32 | 4,387,248.96 | 152,530.44 | 49,866,209.05 |
| | 455,597.35 | | 455,597.35 | 3,931,651.62 | 151,865.78 | 49,714,343.27 |
| | 453,611.88 | | 453,611.88 | 3,478,039.74 | 151,203.96 | 49,563,139.31 |
| | 451,634.89 | | 451,634.89 | 3,026,404.85 | 150,544.96 | 49,412,594.35 |
| | 449,666.34 | | 449,666.34 | 2,576,738.51 | 149,888.78 | 49,262,705.57 |
| | 447,706.19 | | 447,706.19 | 2,129,032.32 | 149,235.40 | 49,113,470.17 |
| | 445,754.41 | | 445,754.41 | 1,683,277.92 | 148,584.80 | 48,964,885.37 |
| | 443,810.96 | | 443,810.96 | 1,239,466.96 | 147,936.99 | 48,816,948.39 |
| | 441,875.80 | | 441,875.80 | 797,591.16 | 147,291.93 | 48,669,656.45 |
| | 439,948.91 | | 439,948.91 | 357,642.25 | 146,649.64 | 48,523,006.82 |
| | 357,642.25 | | 438,030.23 | 0 | 226,398.06 | 48,296,608.76 |
| | | | 436,119.76 | | 581,493.01 | 47,715,115.75 |
| | | | 434,217.43 | | 578,956.58 | 47,136,159.17 |
| | | | 432,323.23 | | 576,430.97 | 46,559,728.20 |
| | | | 430,437.11 | | 573,916.15 | 45,985,812.05 |
| | | | 428,559.04 | | 571,412.06 | 45,414,400.00 |
| | | | 426,689.00 | | 568,918.66 | 44,845,481.34 |
| | | | 424,826.93 | | 566,435.90 | 44,279,045.44 |

| | | | | | | TO FIG. 3 CONT. 7 → |
|---|---|---|---|---|---|---|
| 83 | 563,963.74 | 43,715,081.70 | | | | |
| 84 | 561,502.14 | 43,153,579.56 | | | | |
| 85 | 559,051.04 | 42,594,528.53 | 376,593.56 | 425,945.29 | 100.00 | 182,457.48 |
| 86 | 556,610.40 | 42,037,918.12 | 376,537.21 | 420,379.18 | 100.00 | 180,073.19 |
| 87 | 554,180.19 | 41,483,737.94 | 376,480.88 | 414,837.38 | 100.00 | 177,699.31 |
| 88 | 551,760.34 | 40,931,977.59 | 376,424.55 | 409,319.78 | 100.00 | 175,335.80 |
| 89 | 549,350.83 | 40,382,626.76 | 376,368.23 | 403,826.27 | 100.00 | 172,982.60 |
| 90 | 546,951.60 | 39,835,675.16 | 376,311.92 | 398,356.75 | 100.00 | 170,639.69 |
| 91 | 544,562.62 | 39,291,112.54 | 376,255.62 | 392,911.13 | 100.00 | 168,307.00 |
| 92 | 542,183.83 | 38,748,928.70 | 376,199.32 | 387,489.29 | 100.00 | 165,984.51 |
| 93 | 539,815.20 | 38,209,113.50 | 376,143.04 | 382,091.14 | 100.00 | 163,672.16 |
| 94 | 537,456.68 | 37,671,656.82 | 376,086.76 | 376,716.57 | 100.00 | 161,369.92 |
| 95 | 535,108.23 | 37,136,548.59 | 376,030.49 | 371,365.49 | 100.00 | 159,077.74 |
| 96 | 532,769.80 | 36,603,778.79 | 375,974.23 | 366,037.76 | 100.00 | 156,795.57 |
| 97 | 530,441.36 | 36,073,337.43 | 375,917.98 | 360,733.37 | 100.00 | 154,523.37 |
| 98 | 528,122.85 | 35,545,214.58 | 375,861.74 | 355,452.15 | 100.00 | 152,261.11 |
| 99 | 525,814.24 | 35,019,400.34 | 375,805.50 | 350,194.00 | 100.00 | 150,008.74 |
| 100 | 523,515.49 | 34,495,884.85 | 375,749.28 | 344,958.85 | 100.00 | 147,766.22 |
| 101 | 521,226.55 | 33,974,658.29 | 375,693.06 | 339,746.58 | 100.00 | 145,533.49 |
| 102 | 518,947.39 | 33,455,710.91 | 375,636.85 | 334,557.11 | 100.00 | 143,310.54 |
| 103 | 516,677.95 | 32,939,032.96 | 375,580.65 | 329,390.33 | 100.00 | 141,097.30 |
| 104 | 514,418.20 | 32,424,614.76 | 375,524.46 | 324,246.15 | 100.00 | 138,893.74 |
| 105 | 512,168.10 | 31,912,446.66 | 375,468.27 | 319,124.47 | 100.00 | 136,699.83 |
| 106 | 509,927.60 | 31,402,519.06 | 375,412.10 | 314,025.19 | 100.00 | 134,515.51 |
| 107 | 507,696.67 | 30,894,822.39 | 375,355.93 | 308,948.22 | 100.00 | 132,340.74 |
| 108 | 505,475.26 | 30,389,347.12 | 375,299.77 | 303,893.47 | 100.00 | 130,175.49 |
| 109 | 503,263.34 | 29,886,083.79 | 375,243.62 | 298,860.84 | 100.00 | 128,019.72 |
| 110 | 501,060.86 | 29,385,022.93 | 375,187.48 | 293,850.23 | 100.00 | 125,873.38 |
| 111 | 498,867.78 | 28,886,155.15 | 375,131.34 | 288,861.55 | 100.00 | 123,736.44 |

Note: rows 83–84 right-side values: 376,706.27 / 437,150.82 / 75.00 / 140,443.10 and 376,649.91 / 431,535.80 / 75.00 / 138,639.17; upper "TO FIG. 3 CONT. 7" column shows 282,529.70 and 282,487.43 for rows 83–84.

← FROM FIG. 3 CONT. 4

FROM FIG. 3 CONT. 5 →

| | |
|---|---|
| 563,963.74 | 43,715,081.70 |
| 561,502.14 | 43,153,579.56 |
| 559,051.04 | 42,594,528.53 |
| 556,610.40 | 42,037,918.12 |
| 554,180.19 | 41,483,737.94 |
| 551,760.34 | 40,931,977.59 |
| 549,350.83 | 40,382,626.76 |
| 546,951.60 | 39,835,675.16 |
| 544,562.62 | 39,291,112.54 |
| 542,183.83 | 38,748,928.70 |
| 539,815.20 | 38,209,113.50 |
| 537,456.68 | 37,671,656.82 |
| 535,108.23 | 37,136,548.59 |
| 532,769.80 | 36,603,778.79 |
| 530,441.36 | 36,073,337.43 |
| 528,122.85 | 35,545,214.58 |
| 525,814.24 | 35,019,400.34 |
| 523,515.49 | 34,495,884.85 |
| 521,226.55 | 33,974,658.29 |
| 518,947.39 | 33,455,710.91 |
| 516,677.95 | 32,939,032.96 |
| 514,418.20 | 32,424,614.76 |
| 512,168.10 | 31,912,446.66 |
| 509,927.60 | 31,402,519.06 |
| 507,696.67 | 30,894,822.39 |
| 505,475.26 | 30,389,347.12 |
| 503,263.34 | 29,886,083.79 |
| 501,060.86 | 29,385,022.93 |
| 498,867.78 | 28,886,155.15 |

→ TO FIG. 3 CONT. 9

Middle column (highlighted):

| | |
|---|---|
| 422,972.81 | 43,715,081.70 |
| 421,126.61 | 43,153,579.56 |
| 559,051.04 | 42,594,528.53 |
| 556,610.40 | 42,037,918.12 |
| 554,180.19 | 41,483,737.94 |
| 551,760.35 | 40,931,977.59 |
| 549,350.83 | 40,382,626.76 |
| 546,951.61 | 39,835,675.16 |
| 544,562.62 | 39,291,112.54 |
| 542,183.83 | 38,748,928.70 |
| 539,815.20 | 38,209,113.50 |
| 537,456.68 | 37,671,656.82 |
| 535,108.23 | 37,136,548.59 |
| 532,769.80 | 36,603,778.79 |
| 530,441.35 | 36,073,337.43 |
| 528,122.85 | 35,545,214.58 |
| 525,814.24 | 35,019,400.34 |
| 523,515.50 | 34,495,884.85 |
| 521,226.55 | 33,974,658.29 |
| 518,947.39 | 33,455,710.91 |
| 516,677.95 | 32,939,032.96 |
| 514,418.20 | 32,424,614.76 |
| 512,168.10 | 31,912,446.66 |
| 509,927.61 | 31,402,519.06 |
| 507,696.67 | 30,894,822.39 |
| 505,475.26 | 30,389,347.12 |
| 503,263.34 | 29,886,083.79 |
| 501,060.86 | 29,385,022.93 |
| 498,867.78 | 28,886,155.15 |

← FROM FIG. 3 CONT. 6

| |
|---|
| 422,972.81 |
| 421,126.61 |
| 425,945.29 |
| 420,379.18 |
| 414,837.38 |
| 409,319.78 |
| 403,826.27 |
| 398,356.75 |
| 392,911.13 |
| 387,489.29 |
| 382,091.14 |
| 376,716.57 |
| 371,365.49 |
| 366,037.79 |
| 360,733.37 |
| 355,452.15 |
| 350,194.00 |
| 344,958.85 |
| 339,746.58 |
| 334,557.11 |
| 329,390.33 |
| 324,246.15 |
| 319,124.47 |
| 314,025.19 |
| 308,948.22 |
| 303,893.47 |
| 298,860.84 |
| 293,850.23 |
| 288,861.55 |

| | | | | | | |
|---|---|---|---|---|---|---|
| | | | | | | TO FIG. 3 CONT. 9 → |
| FROM FIG.3 CONT.6 ← 112 | 496,684.06 | 28,389,471.09 | 375,075.22 | 121,608.84 | 283,894.71 | 375,075.22 | 121,608.84 |
| 113 | 494,509.67 | 27,894,961.42 | 375,019.10 | 119,490.57 | 278,949.61 | 100.00 | 375,019.10 | 119,490.57 |
| 114 | 492,344.56 | 27,402,616.86 | 374,962.99 | 117,381.57 | 274,026.17 | 100.00 | 374,962.99 | 117,381.57 |
| 115 | 490,188.69 | 26,912,428.17 | 374,906.89 | 115,281.80 | 269,124.28 | 100.00 | 374,906.89 | 115,281.80 |
| 116 | 488,042.03 | 26,424,386.14 | 374,850.80 | 113,191.23 | 264,243.86 | 100.00 | 374,850.80 | 113,191.23 |
| 117 | 485,904.53 | 25,938,481.62 | 374,794.72 | 111,109.81 | 259,384.82 | 100.00 | 374,794.72 | 111,109.81 |
| 118 | 483,776.15 | 25,454,705.46 | 374,738.64 | 109,037.51 | 254,547.05 | 100.00 | 374,738.64 | 109,037.51 |
| 119 | 481,656.87 | 24,973,048.60 | 374,682.57 | 106,974.29 | 249,730.49 | 100.00 | 374,682.57 | 106,974.29 |
| 120 | 479,546.63 | 24,493,501.97 | 374,626.52 | 104,920.11 | 244,935.02 | 100.00 | 374,626.52 | 104,920.11 |
| 121 | 477,445.40 | 24,016,056.57 | 374,570.47 | 102,874.93 | 240,160.57 | 100.00 | 374,570.47 | 102,874.93 |
| 122 | 475,353.14 | 23,540,703.43 | 374,514.42 | 100,838.71 | 235,407.03 | 100.00 | 374,514.42 | 100,838.71 |
| 123 | 473,269.81 | 23,067,433.62 | 374,458.39 | 98,811.42 | 230,674.34 | 100.00 | 374,458.39 | 98,811.42 |
| 124 | 471,195.38 | 22,596,238.24 | 374,402.37 | 96,793.01 | 225,962.38 | 100.00 | 374,402.37 | 96,793.01 |
| 125 | 469,129.80 | 22,127,108.44 | 374,346.35 | 94,783.45 | 221,271.08 | 100.00 | 374,346.35 | 94,783.45 |
| 126 | 467,073.05 | 21,660,035.39 | 374,290.34 | 92,782.70 | 216,600.35 | 100.00 | 374,290.34 | 92,782.70 |
| 127 | 465,025.07 | 21,195,010.32 | 374,234.34 | 90,790.73 | 211,950.10 | 100.00 | 374,234.34 | 90,790.73 |
| 128 | 462,985.84 | 20,732,024.49 | 374,178.35 | 88,807.49 | 207,320.24 | 100.00 | 374,178.35 | 88,807.49 |
| 129 | 460,955.31 | 20,271,069.18 | 374,122.37 | 86,832.94 | 202,710.69 | 100.00 | 374,122.37 | 86,832.94 |
| 130 | 458,933.45 | 19,812,135.72 | 374,066.39 | 84,867.06 | 198,121.36 | 100.00 | 374,066.39 | 84,867.06 |
| 131 | 456,920.23 | 19,355,215.49 | 374,010.43 | 82,909.80 | 193,552.15 | 100.00 | 374,010.43 | 82,909.80 |
| 132 | 454,915.60 | 18,900,299.89 | 373,954.47 | 80,961.13 | 189,003.00 | 100.00 | 373,954.47 | 80,961.13 |
| 133 | 452,919.53 | 18,447,380.36 | 373,898.52 | 79,021.01 | 184,473.80 | 100.00 | 373,898.52 | 79,021.01 |
| 134 | 450,931.98 | 17,996,448.38 | 373,842.58 | 77,089.40 | 179,964.48 | 100.00 | 373,842.58 | 77,089.40 |
| 135 | 448,952.92 | 17,547,495.47 | 373,786.65 | 75,166.27 | 175,474.95 | 100.00 | 373,786.65 | 75,166.27 |
| 136 | 446,982.30 | 17,100,513.16 | 373,730.72 | 73,251.58 | 171,005.13 | 100.00 | 373,730.72 | 73,251.58 |
| 137 | 445,020.11 | 16,655,493.06 | 373,674.81 | 71,345.30 | 166,554.93 | 100.00 | 373,674.81 | 71,345.30 |
| 138 | 443,066.28 | 16,212,426.77 | 373,618.90 | 69,447.38 | 162,124.27 | 100.00 | 373,618.90 | 69,447.38 |
| 139 | 441,120.80 | 15,771,305.97 | 373,563.00 | 67,557.80 | 157,713.06 | 100.00 | 373,563.00 | 67,557.80 |
| TO FIG.3 CONT.10 → 140 | 439,183.63 | 15,332,122.34 | 373,507.11 | 65,676.52 | 153,321.22 | 100.00 | 373,507.11 | 65,676.52 |

FROM FIG. 3 CONT. 7 →

| | |
|---|---|
| 496,684.06 | 28,389,471.09 |
| 494,509.67 | 27,894,961.42 |
| 492,344.56 | 27,402,616.86 |
| 490,188.69 | 26,912,428.17 |
| 488,042.03 | 26,424,386.14 |
| 485,904.53 | 25,938,481.62 |
| 483,776.15 | 25,454,705.46 |
| 481,656.87 | 24,973,048.60 |
| 479,546.63 | 24,493,501.97 |
| 477,445.40 | 24,016,056.57 |
| 475,353.14 | 23,540,703.43 |
| 473,269.81 | 23,067,433.62 |
| 471,195.38 | 22,596,238.24 |
| 469,129.80 | 22,127,108.44 |
| 467,073.05 | 21,660,035.39 |
| 465,025.07 | 21,195,010.32 |
| 462,985.84 | 20,732,024.49 |
| 460,955.31 | 20,271,069.18 |
| 458,933.45 | 19,812,135.72 |
| 456,920.23 | 19,355,215.49 |
| 454,915.60 | 18,900,299.89 |
| 452,919.53 | 18,447,380.36 |
| 450,931.98 | 17,996,448.38 |
| 448,952.92 | 17,547,495.47 |
| 446,982.30 | 17,100,513.16 |
| 445,020.11 | 16,655,493.06 |
| 443,066.28 | 16,212,426.77 |
| 441,120.80 | 15,771,305.97 |
| 439,183.63 | 15,332,122.34 |

TO FIG. 3 CONT. 11 →

| | |
|---|---|
| 496,684.06 | 28,389,471.09 |
| 494,509.67 | 27,894,961.42 |
| 492,344.56 | 27,402,616.86 |
| 490,188.69 | 26,912,428.17 |
| 488,042.03 | 26,424,386.14 |
| 485,904.53 | 25,938,481.62 |
| 483,776.15 | 25,454,705.46 |
| 481,656.86 | 24,973,048.60 |
| 479,546.63 | 24,493,501.97 |
| 477,445.40 | 24,016,056.57 |
| 475,353.13 | 23,540,703.43 |
| 473,269.81 | 23,067,433.62 |
| 471,195.38 | 22,596,238.24 |
| 469,129.80 | 22,127,108.44 |
| 467,073.04 | 21,660,035.39 |
| 465,025.07 | 21,195,010.32 |
| 462,985.84 | 20,732,024.49 |
| 460,955.31 | 20,271,069.18 |
| 458,933.45 | 19,812,135.72 |
| 456,920.23 | 19,355,215.49 |
| 454,915.60 | 18,900,299.89 |
| 452,919.53 | 18,447,380.36 |
| 450,931.98 | 17,996,448.38 |
| 448,952.92 | 17,547,495.47 |
| 446,982.30 | 17,100,513.16 |
| 445,020.11 | 16,655,493.06 |
| 443,066.28 | 16,212,426.77 |
| 441,120.80 | 15,771,305.97 |
| 439,183.63 | 15,332,122.34 |

FROM FIG. 3 CONT. 8 →

| |
|---|
| 283,894.77 |
| 278,949.61 |
| 274,026.17 |
| 269,124.28 |
| 264,243.86 |
| 259,384.82 |
| 254,547.05 |
| 249,730.49 |
| 244,935.02 |
| 240,160.57 |
| 235,407.03 |
| 230,674.34 |
| 225,962.38 |
| 221,271.08 |
| 216,600.35 |
| 211,950.10 |
| 207,320.24 |
| 202,710.69 |
| 198,121.36 |
| 193,552.15 |
| 189,003.00 |
| 184,473.80 |
| 179,964.48 |
| 175,474.95 |
| 171,005.13 |
| 166,554.93 |
| 162,124.27 |
| 157,713.06 |
| 153,321.22 |

| | | | | | TO FIG. 3 CONT. 11 → | |
|---|---|---|---|---|---|---|
| 141 | 437,254.73 | 14,894,867.61 | 373,451.23 | 63,803.50 | 148,948.68 | 373,451.23 | 63,803.50 |
| 142 | 435,334.06 | 14,459,533.55 | 373,395.35 | 61,938.71 | 144,595.34 | 373,395.35 | 61,938.71 |
| 143 | 433,421.60 | 14,026,111.95 | 373,339.49 | 60,082.11 | 140,261.12 | 373,339.49 | 60,082.11 |
| 144 | 431,517.30 | 13,594,594.66 | 373,283.63 | 58,233.67 | 135,945.95 | 373,283.63 | 58,233.67 |
| 145 | 429,621.13 | 13,164,973.53 | 373,227.78 | 56,393.34 | 131,649.74 | 373,227.78 | 56,393.34 |
| 146 | 427,733.05 | 12,737,240.48 | 373,171.94 | 54,561.11 | 127,372.40 | 373,171.94 | 54,561.11 |
| 147 | 425,853.04 | 12,311,387.44 | 373,116.11 | 52,736.93 | 123,113.87 | 373,116.11 | 52,736.93 |
| 148 | 423,981.06 | 11,887,406.39 | 373,060.28 | 50,920.77 | 118,874.06 | 373,060.28 | 50,920.77 |
| 149 | 422,117.06 | 11,465,289.32 | 373,004.47 | 49,112.59 | 114,652.89 | 373,004.47 | 49,112.59 |
| 150 | 420,261.03 | 11,045,028.29 | 372,948.66 | 47,312.37 | 110,450.28 | 372,948.66 | 47,312.37 |
| 151 | 418,412.92 | 10,626,615.37 | 372,892.86 | 45,520.06 | 106,266.15 | 372,892.86 | 45,520.06 |
| 152 | 416,572.71 | 10,210,042.66 | 372,837.07 | 43,735.63 | 102,100.43 | 372,837.07 | 43,735.63 |
| 153 | 414,740.35 | 9,795,302.32 | 372,781.29 | 41,959.06 | 97,953.02 | 372,781.29 | 41,959.06 |
| 154 | 412,915.81 | 9,382,386.51 | 372,725.52 | 40,190.29 | 93,823.87 | 372,725.52 | 40,190.29 |
| 155 | 411,099.06 | 8,971,287.44 | 372,669.75 | 38,429.31 | 89,712.87 | 372,669.75 | 38,429.31 |
| 156 | 409,290.08 | 8,561,997.37 | 372,613.99 | 36,676.08 | 85,619.97 | 372,613.99 | 36,676.08 |
| 157 | 407,488.81 | 8,154,508.55 | 372,558.24 | 34,930.57 | 81,545.09 | 372,558.24 | 34,930.57 |
| 158 | 405,695.24 | 7,748,813.31 | 372,502.50 | 33,192.74 | 77,488.13 | 372,502.50 | 33,192.74 |
| 159 | 403,909.33 | 7,344,903.98 | 372,446.77 | 31,462.55 | 73,449.04 | 372,446.77 | 31,462.55 |
| 160 | 402,131.04 | 6,942,772.95 | 372,391.05 | 29,739.99 | 69,427.73 | 372,391.05 | 29,739.99 |
| 161 | 400,360.34 | 6,542,412.60 | 372,335.33 | 28,025.01 | 65,424.13 | 372,335.33 | 28,025.01 |
| 162 | 398,597.21 | 6,143,815.39 | 372,279.63 | 26,317.58 | 61,438.15 | 372,279.63 | 26,317.58 |
| 163 | 396,841.60 | 5,746,973.79 | 372,223.93 | 24,617.68 | 57,469.74 | 372,223.93 | 24,617.68 |
| 164 | 395,093.50 | 5,351,880.29 | 372,168.24 | 22,925.26 | 53,518.80 | 372,168.24 | 22,925.26 |
| 165 | 393,352.85 | 4,958,527.44 | 372,112.55 | 21,240.30 | 49,585.27 | 372,112.55 | 21,240.30 |
| 166 | 391,619.64 | 4,566,907.80 | 372,056.88 | 19,562.76 | 45,669.08 | 372,056.88 | 19,562.76 |
| 167 | 389,893.83 | 4,177,013.97 | 372,001.22 | 17,892.61 | 41,770.14 | 372,001.22 | 17,892.61 |
| 168 | 388,175.39 | 3,788,838.58 | 371,945.56 | 16,229.83 | 37,888.39 | 371,945.56 | 16,229.83 |
| 169 | 386,464.28 | 3,402,374.30 | 371,889.91 | 14,574.38 | 34,023.74 | 371,889.91 | 14,574.38 |

FROM FIG. 3 CONT. 8

(column of 100.00 values between the 148,948.68 column and the 373,451.23 column, one per row)

*FIG. 3 CONT. 11*

| | | |
|---|---|---|
| 437,254.73 | 14,894,867.61 | |
| 435,334.06 | 14,459,533.55 | |
| 433,421.60 | 14,026,111.95 | |
| 431,517.30 | 13,594,594.66 | |
| 429,621.13 | 13,164,973.53 | |
| 427,733.05 | 12,737,240.48 | |
| 425,853.04 | 12,311,387.44 | |
| 423,981.06 | 11,887,406.39 | |
| 422,117.06 | 11,465,289.32 | |
| 420,261.03 | 11,045,028.29 | |
| 418,412.92 | 10,626,615.37 | |
| 416,572.71 | 10,210,042.66 | |
| 414,740.35 | 9,795,302.32 | |
| 412,915.81 | 9,382,386.51 | |
| 411,099.06 | 8,971,287.44 | |
| 409,290.08 | 8,561,997.37 | |
| 407,488.81 | 8,154,508.55 | |
| 405,695.24 | 7,748,813.31 | |
| 403,909.33 | 7,344,903.98 | |
| 402,131.04 | 6,942,772.95 | |
| 400,360.34 | 6,542,412.60 | |
| 398,597.21 | 6,143,815.39 | |
| 396,841.60 | 5,746,973.79 | |
| 395,093.50 | 5,351,880.29 | |
| 393,352.85 | 4,958,527.44 | |
| 391,619.64 | 4,566,907.80 | |
| 389,893.83 | 4,177,013.97 | |
| 388,175.39 | 3,788,838.58 | |
| 386,464.28 | 3,402,374.30 | |

← FROM FIG. 3 CONT. 9
TO FIG. 3 CONT. 13 →

FROM FIG. 3 CONT. 10 ←

148,948.68
144,595.34
140,261.12
135,945.95
131,649.74
127,372.40
123,113.87
118,874.06
114,652.89
110,450.28
106,266.15
102,100.43
97,953.02
93,823.87
89,712.87
85,619.97
81,545.09
77,488.13
73,449.04
69,427.73
65,424.13
61,438.15
57,469.74
53,518.80
49,585.27
45,669.08
41,770.14
37,888.39
34,023.74

437,254.73
435,334.06
433,421.60
431,517.30
429,621.12
427,733.05
425,853.04
423,981.05
422,117.06
420,261.03
418,412.92
416,572.70
414,740.35
412,915.81
411,099.06
409,290.07
407,488.81
405,695.24
403,909.32
402,131.04
400,360.34
398,597.21
396,841.61
395,093.50
393,352.85
391,619.64
389,893.83
388,175.39
386,464.29

| | | | | | | TO FIG. 3 CONT. 13 → |
|---|---|---|---|---|---|---|
| FROM FIG. 3 CONT. 10 | 170 | 384,760.49 | 3,017,613.81 | 371,834.27 | 12,926.22 | 30,176.14 | 100.00 | 371,834.27 | 12,926.22 |
| | 171 | 383,063.97 | 2,634,549.84 | 371,778.64 | 11,285.33 | 26,345.50 | 100.00 | 371,778.64 | 11,285.33 |
| | 172 | 381,374.69 | 2,253,175.15 | 371,723.01 | 9,651.68 | 22,531.75 | 100.00 | 371,723.01 | 9,651.68 |
| | 173 | 379,692.63 | 1,873,482.52 | 371,667.40 | 8,025.23 | 18,734.83 | 100.00 | 371,667.40 | 8,025.23 |
| | 174 | 378,017.75 | 1,495,464.78 | 371,611.79 | 6,405.96 | 14,954.65 | 100.00 | 371,611.79 | 6,405.96 |
| | 175 | 376,350.02 | 1,119,114.76 | 371,556.19 | 4,793.83 | 11,191.15 | 100.00 | 371,556.19 | 4,793.83 |
| | 176 | 374,689.41 | 744,425.34 | 371,500.60 | 3,188.81 | 7,444.25 | 100.00 | 371,500.60 | 3,188.81 |
| | 177 | 373,035.90 | 371,389.44 | 371,445.02 | 1,590.88 | 3,713.89 | 100.00 | 371,445.02 | 1,590.88 |
| | 178 | 371,389.44 | 0 | 371,389.44 | 0 | 0.00 | 100.00 | 371,389.44 | 0.00 |

*FIG. 3 CONT. 12*

← FROM FIG. 3 CONT. 11

| | |
|---|---|
| 384,760.49 | 3,017,613.81 |
| 383,063.97 | 2,634,549.84 |
| 381,374.69 | 2,253,175.15 |
| 379,692.63 | 1,873,482.52 |
| 378,017.75 | 1,495,464.78 |
| 376,350.02 | 1,119,114.76 |
| 374,689.41 | 744,425.34 |
| 373,035.90 | 371,389.44 |
| 371,389.44 | 0 |

| | | |
|---|---|---|
| 3,017,613.81 | 384,760.49 | 384,760.49 |
| 2,634,549.84 | 383,063.97 | 383,063.97 |
| 2,253,175.15 | 381,374.69 | 381,374.69 |
| 1,873,482.52 | 379,692.63 | 379,692.63 |
| 1,495,464.78 | 378,017.75 | 378,017.75 |
| 1,119,114.76 | 376,350.02 | 376,350.02 |
| 744,425.34 | 374,689.41 | 374,689.41 |
| 371,389.44 | 373,035.90 | 373,035.90 |
| 0 | 371,389.44 | 371,389.44 |

← FROM FIG. 3 CONT. 12

| |
|---|
| 30,176.14 |
| 26,345.50 |
| 22,531.75 |
| 18,734.83 |
| 14,954.65 |
| 11,191.15 |
| 7,444.25 |
| 3,713.89 |
| 0.00 |

| | COLLAT | | | | CAP AT (SCHEDULE + (PREPAY*SHIFT) | | | |
|---|---|---|---|---|---|---|---|---|
| PERIOD TOTAL | PRINCIPAL | BALANCE | SCHED PRINC | PREPAY PRINC | CAP 1 | % SHIFT PREPAY | SCHED*SHIFT | PREPAY*SHIFT |
| 0 | 0.00 | 100,000,000.00 | | | | | | |
| | | | 53,430,056.49 | 46,569,943.51 | | | | |
| 1 | 1,161,213.31 | 98,838,786.69 | 0.00 | 0.00 | 988,387.87 | 0.00 | 0.00 | 0.00 |
| 2 | 1,150,712.48 | 97,688,074.21 | 381,356.69 | 779,856.61 | 976,880.74 | 0.00 | 0.00 | 0.00 |
| 3 | 1,140,299.12 | 96,547,775.09 | 379,935.21 | 770,777.28 | 965,477.75 | 0.00 | 0.00 | 0.00 |
| 4 | 1,129,972.52 | 95,417,802.57 | 378,519.02 | 761,780.10 | 954,178.03 | 0.00 | 0.00 | 0.00 |
| 5 | 1,119,731.97 | 94,298,070.60 | 377,108.11 | 752,864.41 | 942,980.71 | 0.00 | 0.00 | 0.00 |
| 6 | 1,109,576.79 | 93,188,493.81 | 375,702.46 | 744,029.51 | 931,884.94 | 0.00 | 0.00 | 0.00 |
| 7 | 1,099,506.29 | 92,088,987.52 | 374,302.05 | 735,274.74 | 920,889.88 | 0.00 | 0.00 | 0.00 |
| 8 | 1,089,519.79 | 90,999,467.73 | 372,906.86 | 726,599.43 | 909,994.68 | 0.00 | 0.00 | 0.00 |
| 9 | 1,079,616.60 | 89,919,851.13 | 371,516.87 | 718,002.91 | 899,198.51 | 0.00 | 0.00 | 0.00 |
| 10 | 1,069,796.06 | 88,850,055.07 | 370,132.06 | 709,484.53 | 888,500.55 | 0.00 | 0.00 | 0.00 |
| 11 | 1,060,057.50 | 87,789,997.57 | 368,752.42 | 701,043.64 | 877,899.98 | 0.00 | 0.00 | 0.00 |
| 12 | 1,050,400.27 | 86,739,597.30 | 367,377.91 | 692,679.59 | 867,395.97 | 0.00 | 0.00 | 0.00 |
| 13 | 1,040,823.70 | 85,698,773.61 | 366,008.53 | 684,391.73 | 856,987.74 | 25.00 | 91,161.07 | 169,044.86 |
| 14 | 1,031,327.14 | 84,667,446.47 | 364,644.26 | 676,179.44 | 846,674.46 | 25.00 | 90,821.27 | 167,010.52 |
| 15 | 1,021,909.95 | 83,645,536.52 | 363,285.06 | 668,042.07 | 836,455.37 | 25.00 | 90,482.74 | 164,994.75 |
| 16 | 1,012,571.50 | 82,632,965.02 | 361,930.94 | 659,979.01 | 826,329.65 | 25.00 | 90,145.47 | 162,997.41 |
| 17 | 1,003,311.13 | 81,629,653.89 | 360,581.86 | 651,989.63 | 816,296.54 | 25.00 | 89,809.45 | 161,018.33 |
| 18 | 994,128.24 | 80,635,525.65 | 359,237.81 | 644,073.32 | 806,355.26 | 25.00 | 89,474.69 | 159,057.37 |
| 19 | 985,022.18 | 79,650,503.48 | 357,898.77 | 636,229.46 | 796,505.03 | 25.00 | 89,141.18 | 157,114.36 |
| 20 | 975,992.34 | 78,674,511.14 | 356,564.73 | 628,457.45 | 786,745.11 | 25.00 | 88,808.91 | 155,189.17 |
| 21 | 967,038.11 | 77,707,473.03 | 355,235.65 | 620,756.69 | 777,074.73 | 25.00 | 88,477.88 | 153,281.65 |
| 22 | 958,158.87 | 76,749,314.17 | 353,911.53 | 613,126.58 | 767,493.14 | 25.00 | 88,148.09 | 151,391.63 |
| 23 | 949,354.02 | 75,799,960.15 | 352,592.34 | 605,566.52 | 757,999.60 | 25.00 | 87,819.52 | 149,518.99 |
| 24 | 940,622.95 | 74,859,337.20 | 351,278.08 | 598,075.94 | 748,593.37 | 25.00 | 87,492.18 | 147,663.56 |

TO FIG. 5 CONT. 2 →

| CAPPED NAS SCHEDULES | CAPPED AS PRINCIPAL BALANCE | PRINCIPAL | NON-CAPPED NAS SCHEDULES | NON-CAPPED NAS PRINCIPAL BALANCE | PRINCIPAL | NC AS BALANCE |
|---|---|---|---|---|---|---|
| 24,999,999.98 | | | 24,999,999.97 | | | |
| | 25,000,000.00 | | | 25,000,000.00 | | 75,000,000.00 |
| | 25,000,000.00 | 1,161,213.31 | | 25,000,000.00 | 1,161,213.31 | 73,838,786.69 |
| | 25,000,000.00 | 1,150,712.48 | | 25,000,000.00 | 1,150,712.48 | 72,688,074.21 |
| | 25,000,000.00 | 1,140,299.12 | | 25,000,000.00 | 1,140,299.12 | 71,547,775.09 |
| | 25,000,000.00 | 1,129,972.52 | | 25,000,000.00 | 1,129,972.52 | 70,417,802.57 |
| | 25,000,000.00 | 1,119,731.97 | | 25,000,000.00 | 1,119,731.97 | 69,298,070.60 |
| | 25,000,000.00 | 1,109,576.79 | | 25,000,000.00 | 1,109,576.79 | 68,188,493.81 |
| | 25,000,000.00 | 1,099,506.29 | | 25,000,000.00 | 1,099,506.29 | 67,088,987.52 |
| | 25,000,000.00 | 1,089,519.79 | | 25,000,000.00 | 1,089,519.79 | 65,999,467.73 |
| | 25,000,000.00 | 1,079,616.60 | | 25,000,000.00 | 1,079,616.60 | 64,919,851.13 |
| | 25,000,000.00 | 1,069,796.06 | | 25,000,000.00 | 1,069,796.06 | 63,850,055.07 |
| | 25,000,000.00 | 1,060,057.50 | | 25,000,000.00 | 1,060,057.50 | 62,789,997.57 |
| | 25,000,000.00 | 1,050,400.27 | | 25,000,000.00 | 1,050,400.27 | 61,739,597.30 |
| 260,205.92 | 24,739,794.08 | 780,617.77 | 260,205.92 | 24,739,794.08 | 780,617.77 | 60,958,979.53 |
| 257,831.78 | 24,481,962.29 | 773,495.35 | 257,831.78 | 24,481,962.29 | 773,495.35 | 60,185,484.18 |
| 255,477.49 | 24,226,484.80 | 766,432.46 | 255,477.49 | 24,226,484.80 | 766,432.46 | 59,419,051.71 |
| 253,142.87 | 23,973,341.93 | 759,428.62 | 253,142.87 | 23,973,341.93 | 759,428.62 | 58,659,623.09 |
| 250,827.78 | 23,722,514.15 | 752,483.35 | 250,827.78 | 23,722,514.15 | 752,483.35 | 57,907,139.74 |
| 248,532.06 | 23,473,982.09 | 745,596.18 | 248,532.06 | 23,473,982.09 | 745,596.18 | 57,161,543.57 |
| 246,255.54 | 23,227,726.54 | 738,766.63 | 246,255.54 | 23,227,726.54 | 738,766.63 | 56,422,776.93 |
| 243,998.08 | 22,983,728.46 | 731,994.25 | 243,998.08 | 22,983,728.46 | 731,994.25 | 55,690,782.68 |
| 241,759.53 | 22,741,968.93 | 725,278.58 | 241,759.53 | 22,741,968.93 | 725,278.58 | 54,965,504.10 |
| 239,539.72 | 22,502,429.22 | 718,619.15 | 239,539.72 | 22,502,429.22 | 718,619.15 | 54,246,884.95 |
| 237,338.51 | 22,265,090.71 | 712,015.51 | 237,338.51 | 22,265,090.71 | 712,015.51 | 53,534,869.44 |
| 235,155.74 | 22,029,934.97 | 705,467.22 | 235,155.74 | 22,029,934.97 | 705,467.22 | 52,829,402.22 |

| | | | | | |
|---|---|---|---|---|---|
| 25 | 931,965.09 | 73,927,372.11 | 348,664.22 | 583,300.87 | 739,273.72 | 50.00 | 174,332.11 | 291,650.44 |
| 26 | 923,379.82 | 73,003,992.29 | 347,364.59 | 576,015.23 | 730,039.92 | 50.00 | 173,682.30 | 288,007.62 |
| 27 | 914,866.57 | 72,089,125.73 | 346,069.81 | 568,796.76 | 720,891.26 | 50.00 | 173,034.91 | 284,398.38 |
| 28 | 906,424.75 | 71,182,700.98 | 344,779.85 | 561,644.90 | 711,827.01 | 50.00 | 172,389.93 | 280,822.45 |
| 29 | 898,053.79 | 70,284,647.19 | 343,494.70 | 554,559.08 | 702,846.47 | 50.00 | 171,747.35 | 277,279.54 |
| 30 | 889,753.11 | 69,394,894.08 | 342,214.35 | 547,538.76 | 693,948.94 | 50.00 | 171,107.18 | 273,769.38 |
| 31 | 881,522.15 | 68,513,371.93 | 340,938.76 | 540,583.39 | 685,133.72 | 50.00 | 170,469.38 | 270,291.70 |
| 32 | 873,360.34 | 67,640,011.58 | 339,667.93 | 533,692.41 | 676,400.12 | 50.00 | 169,833.97 | 266,846.21 |
| 33 | 865,267.13 | 66,774,744.45 | 338,401.84 | 526,865.29 | 667,747.44 | 50.00 | 169,200.92 | 263,432.65 |
| 34 | 857,241.96 | 65,917,502.50 | 337,140.46 | 520,101.49 | 659,175.03 | 50.00 | 168,570.23 | 260,050.75 |
| 35 | 849,284.27 | 65,068,218.23 | 335,883.79 | 513,400.48 | 650,682.18 | 50.00 | 167,941.90 | 256,700.24 |
| 36 | 841,393.53 | 64,226,824.70 | 334,631.80 | 506,761.72 | 642,268.25 | 50.00 | 167,315.90 | 253,380.86 |
| 37 | 833,569.19 | 63,393,255.51 | 333,384.48 | 500,184.71 | 633,932.56 | 75.00 | 250,038.36 | 375,138.53 |
| 38 | 825,810.72 | 62,567,444.79 | 332,141.81 | 493,668.91 | 625,674.45 | 75.00 | 249,106.36 | 370,251.68 |
| 39 | 818,117.57 | 61,749,327.22 | 330,903.77 | 487,213.80 | 617,493.27 | 75.00 | 248,177.83 | 365,410.35 |
| 40 | 810,489.24 | 60,938,837.98 | 329,670.35 | 480,818.89 | 609,388.38 | 75.00 | 247,252.76 | 360,614.17 |
| 41 | 802,925.18 | 60,135,912.80 | 328,441.52 | 474,483.66 | 601,359.13 | 75.00 | 246,331.14 | 355,862.75 |
| 42 | 795,424.88 | 59,340,487.92 | 327,217.27 | 468,207.61 | 593,404.88 | 75.00 | 245,412.95 | 351,155.71 |
| 43 | 787,987.82 | 58,552,500.10 | 325,997.59 | 461,990.24 | 585,525.00 | 75.00 | 244,498.19 | 346,492.68 |
| 44 | 780,613.50 | 57,771,886.61 | 324,782.45 | 455,831.05 | 577,718.87 | 75.00 | 243,586.84 | 341,873.29 |
| 45 | 773,301.39 | 56,998,585.21 | 323,571.84 | 449,729.56 | 569,985.85 | 75.00 | 242,678.88 | 337,297.17 |
| 46 | 766,051.01 | 56,232,534.20 | 322,365.74 | 443,685.27 | 562,325.34 | 75.00 | 241,774.31 | 332,763.95 |
| 47 | 758,861.85 | 55,473,672.35 | 321,164.14 | 437,697.71 | 554,736.72 | 75.00 | 240,873.11 | 328,273.28 |
| 48 | 751,733.41 | 54,721,938.94 | 319,967.02 | 431,766.39 | 547,219.39 | 75.00 | 239,975.27 | 323,824.79 |
| 49 | 744,665.20 | 53,977,273.74 | 318,774.36 | 425,890.84 | 539,772.74 | 75.00 | 239,080.77 | 319,418.13 |
| 50 | 737,656.74 | 53,239,617.00 | 317,586.15 | 420,070.59 | 532,396.17 | 75.00 | 238,189.61 | 315,052.94 |
| 51 | 730,707.53 | 52,508,909.47 | 316,402.36 | 414,305.17 | 525,089.09 | 75.00 | 237,301.77 | 310,728.88 |
| 52 | 723,817.11 | 51,785,092.36 | 315,222.99 | 408,594.12 | 517,850.92 | 75.00 | 236,417.24 | 306,445.59 |
| 53 | 716,984.99 | 51,068,107.37 | 314,048.01 | 402,936.97 | 510,681.07 | 75.00 | 235,536.01 | 302,202.73 |

FROM FIG. 5 ←

| | | | | | | TO FIG. 5 CONT. 5 → |
|---|---|---|---|---|---|---|
| 54 | 710,210.69 | 50,357,896.68 | 312,877.42 | 397,333.27 | 503,578.97 | 234,658.07 | 297,999.95 |
| 55 | 703,493.76 | 49,654,402.92 | 311,711.19 | 391,782.58 | 496,544.03 | 75.00 | 233,783.39 | 293,836.94 |
| 56 | 696,833.73 | 48,957,569.19 | 310,549.30 | 386,284.43 | 489,575.69 | 75.00 | 232,911.98 | 289,713.32 |
| 57 | 690,230.13 | 48,267,339.07 | 309,391.74 | 380,838.38 | 482,673.39 | 75.00 | 232,043.81 | 285,628.79 |
| 58 | 683,682.50 | 47,583,656.56 | 308,238.50 | 375,444.00 | 475,836.57 | 75.00 | 231,178.88 | 281,583.00 |
| 59 | 677,190.40 | 46,906,466.16 | 307,089.56 | 370,100.84 | 469,064.66 | 75.00 | 230,317.17 | 277,575.63 |
| 60 | 670,753.37 | 46,235,712.79 | 305,944.90 | 364,808.47 | 462,357.13 | 75.00 | 229,458.68 | 273,606.35 |
| 61 | 664,370.97 | 45,571,341.83 | 304,804.51 | 359,566.46 | 455,713.42 | 75.00 | 228,603.38 | 269,674.85 |
| 62 | 658,042.74 | 44,913,299.09 | 303,668.37 | 354,374.38 | 449,132.99 | 75.00 | 227,751.28 | 265,780.79 |
| 63 | 651,768.26 | 44,261,530.82 | 302,536.46 | 349,231.80 | 442,615.31 | 75.00 | 226,902.35 | 261,923.85 |
| 64 | 645,547.09 | 43,615,983.74 | 301,408.77 | 344,138.31 | 436,159.84 | 75.00 | 226,056.58 | 258,103.73 |
| 65 | 639,378.78 | 42,976,604.95 | 300,285.29 | 339,093.49 | 429,766.05 | 75.00 | 225,213.97 | 254,320.12 |
| 66 | 633,262.92 | 42,343,342.03 | 299,165.99 | 334,096.93 | 423,433.42 | 75.00 | 224,374.49 | 250,572.70 |
| 67 | 627,199.08 | 41,716,142.95 | 298,050.87 | 329,148.21 | 417,161.43 | 75.00 | 223,538.15 | 246,861.16 |
| 68 | 621,186.83 | 41,094,956.12 | 296,939.90 | 324,246.93 | 410,949.56 | 75.00 | 222,704.93 | 243,185.20 |
| 69 | 615,225.76 | 40,479,730.37 | 295,833.07 | 319,392.68 | 404,797.30 | 75.00 | 221,874.80 | 239,544.51 |
| 70 | 609,315.44 | 39,870,414.92 | 294,730.37 | 314,585.07 | 398,704.15 | 75.00 | 221,047.78 | 235,938.80 |
| 71 | 603,455.47 | 39,266,959.45 | 293,631.78 | 309,823.69 | 392,669.59 | 75.00 | 220,223.84 | 232,367.77 |
| 72 | 597,645.44 | 38,669,314.01 | 292,537.28 | 305,108.16 | 386,693.14 | 75.00 | 219,402.96 | 228,831.12 |
| 73 | 591,884.94 | 38,077,429.07 | 291,446.87 | 300,438.08 | 380,774.29 | 75.00 | 218,585.15 | 225,328.56 |
| 74 | 586,173.57 | 37,491,255.49 | 290,360.51 | 295,813.06 | 374,912.55 | 75.00 | 217,770.38 | 221,859.80 |
| 75 | 580,510.93 | 36,910,744.57 | 289,278.21 | 291,232.72 | 369,107.45 | 75.00 | 216,958.66 | 218,424.54 |
| 76 | 574,896.62 | 36,335,847.95 | 288,199.94 | 286,696.67 | 363,358.48 | 75.00 | 216,149.96 | 215,022.50 |
| 77 | 569,330.24 | 35,766,517.71 | 287,125.69 | 282,204.55 | 357,665.18 | 75.00 | 215,344.27 | 211,653.41 |
| 78 | 563,811.42 | 35,202,706.28 | 286,055.45 | 277,755.97 | 352,027.06 | 75.00 | 214,541.59 | 208,316.98 |
| 79 | 558,339.76 | 34,644,366.52 | 284,989.19 | 273,350.57 | 346,443.67 | 75.00 | 213,741.89 | 205,012.93 |
| 80 | 552,914.88 | 34,091,451.65 | 283,926.91 | 268,987.96 | 340,914.52 | 75.00 | 212,945.18 | 201,740.97 |
| 81 | 547,536.39 | 33,543,915.26 | 282,868.59 | 264,667.80 | 335,439.15 | 75.00 | 212,151.44 | 198,500.85 |
| 82 | 542,203.92 | 33,001,711.34 | 281,814.21 | 260,389.71 | 330,017.11 | 75.00 | 211,360.66 | 195,292.28 |

← FROM FIG. 5 CONT. 2

| | | | | | |
|---|---|---|---|---|---|
| FROM FIG. 5 CONT. 4 → | | | | FROM FIG. 5 CONT. 3 ← | |
| 503,578.97 | 503,578.97 | 6,526,044.54 | 206,631.73 | 43,831,852.14 | 177,552.67 | 44,045,913.97 |
| 496,544.03 | 496,544.03 | 6,029,500.51 | 206,949.73 | 43,624,902.41 | 175,873.44 | 43,870,040.53 |
| 489,575.69 | 489,575.69 | 5,539,924.82 | 207,258.03 | 43,417,644.37 | 174,208.43 | 43,695,832.10 |
| 482,673.39 | 482,673.39 | 5,057,251.43 | 207,556.73 | 43,210,087.64 | 172,557.53 | 43,523,274.57 |
| 475,836.57 | 475,836.57 | 4,581,414.86 | 207,845.94 | 43,002,241.70 | 170,920.63 | 43,352,353.94 |
| 469,064.66 | 469,064.66 | 4,112,350.20 | 208,125.74 | 42,794,115.97 | 169,297.60 | 43,183,056.34 |
| 462,357.13 | 462,357.13 | 3,649,993.07 | 208,396.24 | 42,585,719.72 | 167,688.34 | 43,015,368.00 |
| 455,713.42 | 455,713.42 | 3,194,279.65 | 208,657.55 | 42,377,062.17 | 166,092.74 | 42,849,275.26 |
| 449,132.99 | 449,132.99 | 2,745,146.66 | 208,909.75 | 42,168,152.42 | 164,510.69 | 42,684,764.57 |
| 442,615.31 | 442,615.31 | 2,302,531.35 | 209,152.95 | 41,958,999.47 | 162,942.07 | 42,521,822.51 |
| 436,159.84 | 436,159.84 | 1,866,371.52 | 209,387.25 | 41,749,612.22 | 161,386.77 | 42,360,435.73 |
| 429,766.05 | 429,766.05 | 1,436,605.47 | 209,612.73 | 41,539,999.49 | 159,844.70 | 42,200,591.04 |
| 423,433.42 | 423,433.42 | 1,013,172.05 | 209,829.50 | 41,330,169.98 | 158,315.73 | 42,042,275.31 |
| 417,161.43 | 417,161.43 | 596,010.62 | 210,037.65 | 41,120,132.33 | 326,132.36 | 41,716,142.95 |
| 410,949.56 | 410,949.56 | 185,061.06 | 210,237.27 | 40,909,895.07 | 621,186.83 | 41,094,956.12 |
| 404,797.30 | | | 430,164.70 | 40,479,730.37 | 615,225.76 | 40,479,730.37 |
| 398,704.15 | | | 609,315.44 | 39,870,414.92 | 609,315.44 | 39,870,414.92 |
| 392,669.59 | | | 603,455.47 | 39,266,959.45 | 603,455.47 | 39,266,959.45 |
| 386,693.14 | | | 597,645.44 | 38,669,314.01 | 597,645.44 | 38,669,314.01 |
| 380,774.29 | | | 591,884.94 | 38,077,429.07 | 591,884.94 | 38,077,429.07 |
| 374,912.55 | | | 586,173.57 | 37,491,255.49 | 586,173.57 | 37,491,255.49 |
| 369,107.45 | | | 580,510.93 | 36,910,744.57 | 580,510.93 | 36,910,744.57 |
| 363,358.48 | | | 574,896.62 | 36,335,847.95 | 574,896.62 | 36,335,847.95 |
| 357,665.18 | | | 569,330.24 | 35,766,517.71 | 569,330.24 | 35,766,517.71 |
| 352,027.06 | | | 563,811.42 | 35,202,706.28 | 563,811.42 | 35,202,706.28 |
| 346,443.67 | | | 558,339.76 | 34,644,366.52 | 558,339.76 | 34,644,366.52 |
| 340,914.52 | | | 552,914.88 | 34,091,451.65 | 552,914.88 | 34,091,451.65 |
| 335,439.15 | | | 547,536.39 | 33,543,915.26 | 547,536.39 | 33,543,915.26 |
| 330,017.11 | | | 542,203.92 | 33,001,711.34 | 542,203.92 | 33,001,711.34 |

TO FIG. 5 CONT. 7 →

| | | | | | | | |
|---|---|---|---|---|---|---|---|
| 83 | 536,917.10 | 32,464,794.24 | 280,763.77 | 256,153.33 | 324,647.94 | 75.00 | 210,572.83 | 192,115.00 |
| 84 | 531,675.55 | 31,933,118.69 | 279,717.23 | 251,958.31 | 319,331.19 | 75.00 | 209,787.92 | 188,968.73 |
| 85 | 526,478.90 | 31,406,639.79 | 278,674.60 | 247,804.29 | 314,066.40 | 100.00 | 278,674.60 | 247,804.29 |
| 86 | 521,326.79 | 30,885,313.01 | 277,635.86 | 243,690.93 | 308,853.13 | 100.00 | 277,635.86 | 243,690.93 |
| 87 | 516,218.85 | 30,369,094.15 | 276,600.99 | 239,617.86 | 303,690.94 | 100.00 | 276,600.99 | 239,617.86 |
| 88 | 511,154.73 | 29,857,939.42 | 275,569.97 | 235,584.76 | 298,579.39 | 100.00 | 275,569.97 | 235,584.76 |
| 89 | 506,134.07 | 29,351,805.36 | 274,542.80 | 231,591.26 | 293,518.05 | 100.00 | 274,542.80 | 231,591.26 |
| 90 | 501,156.50 | 28,850,648.86 | 273,519.46 | 227,637.04 | 288,506.49 | 100.00 | 273,519.46 | 227,637.04 |
| 91 | 496,221.69 | 28,354,427.16 | 272,499.93 | 223,721.76 | 283,544.27 | 100.00 | 272,499.93 | 223,721.76 |
| 92 | 491,329.28 | 27,863,097.88 | 271,484.20 | 219,845.08 | 278,630.98 | 100.00 | 271,484.20 | 219,845.08 |
| 93 | 486,478.93 | 27,376,618.95 | 270,472.26 | 216,006.67 | 273,766.19 | 100.00 | 270,472.26 | 216,006.67 |
| 94 | 481,670.29 | 26,894,948.66 | 269,464.09 | 212,206.20 | 268,949.49 | 100.00 | 269,464.09 | 212,206.20 |
| 95 | 476,903.02 | 26,418,045.63 | 268,459.68 | 208,443.35 | 264,180.46 | 100.00 | 268,459.68 | 208,443.35 |
| 96 | 472,176.79 | 25,945,868.84 | 267,459.01 | 204,717.78 | 259,458.69 | 100.00 | 267,459.01 | 204,717.78 |
| 97 | 467,491.26 | 25,478,377.58 | 266,462.07 | 201,029.19 | 254,783.78 | 100.00 | 266,462.07 | 201,029.19 |
| 98 | 462,846.09 | 25,015,531.49 | 265,468.85 | 197,377.25 | 250,155.31 | 100.00 | 265,468.85 | 197,377.25 |
| 99 | 458,240.97 | 24,557,290.52 | 264,479.33 | 193,761.64 | 245,572.91 | 100.00 | 264,479.33 | 193,761.64 |
| 100 | 453,675.55 | 24,103,614.97 | 263,493.49 | 190,182.05 | 241,036.15 | 100.00 | 263,493.49 | 190,182.05 |
| 101 | 449,149.52 | 23,654,465.45 | 262,511.34 | 186,638.18 | 236,544.65 | 100.00 | 262,511.34 | 186,638.18 |
| 102 | 444,662.55 | 23,209,802.90 | 261,532.84 | 183,129.71 | 232,098.03 | 100.00 | 261,532.84 | 183,129.71 |
| 103 | 440,214.33 | 22,769,588.58 | 260,557.99 | 179,656.34 | 227,695.89 | 100.00 | 260,557.99 | 179,656.34 |
| 104 | 435,804.53 | 22,333,784.05 | 259,586.78 | 176,217.76 | 223,337.84 | 100.00 | 259,586.78 | 176,217.76 |
| 105 | 431,432.85 | 21,902,351.19 | 258,619.18 | 172,813.67 | 219,023.51 | 100.00 | 258,619.18 | 172,813.67 |
| 106 | 427,098.97 | 21,475,252.22 | 257,655.19 | 169,443.78 | 214,752.52 | 100.00 | 257,655.19 | 169,443.78 |
| 107 | 422,802.58 | 21,052,449.64 | 256,694.80 | 166,107.79 | 210,524.50 | 100.00 | 256,694.80 | 166,107.79 |
| 108 | 418,543.38 | 20,633,906.26 | 255,737.98 | 162,805.40 | 206,339.06 | 100.00 | 255,737.98 | 162,805.40 |
| 109 | 414,321.06 | 20,219,585.20 | 254,784.73 | 159,536.33 | 202,195.85 | 100.00 | 254,784.73 | 159,536.33 |
| 110 | 410,135.32 | 19,809,449.88 | 253,835.04 | 156,300.28 | 198,094.50 | 100.00 | 253,835.04 | 156,300.28 |
| 111 | 405,985.86 | 19,403,464.02 | 252,888.88 | 153,096.98 | 194,034.64 | 100.00 | 252,888.88 | 153,096.98 |

| | | |
|---|---|---|
| 536,917.10 | 32,464,794.24 | 402,687.83 |
| 531,675.55 | 31,933,118.69 | 398,756.66 |
| 526,478.90 | 31,406,639.79 | 526,478.89 |
| 521,326.79 | 30,885,313.01 | 521,326.79 |
| 516,218.85 | 30,369,094.15 | 516,218.85 |
| 511,154.73 | 29,857,939.42 | 511,154.73 |
| 506,134.07 | 29,351,805.36 | 506,134.06 |
| 501,156.50 | 28,850,648.86 | 501,156.50 |
| 496,221.69 | 28,354,427.16 | 496,221.69 |
| 491,329.28 | 27,863,097.88 | 491,329.28 |
| 486,478.93 | 27,376,618.95 | 486,478.93 |
| 481,670.29 | 26,894,948.66 | 481,670.29 |
| 476,903.02 | 26,418,045.63 | 476,903.03 |
| 472,176.79 | 25,945,868.84 | 472,176.79 |
| 467,491.26 | 25,478,377.58 | 467,491.26 |
| 462,846.09 | 25,015,531.49 | 462,846.10 |
| 458,240.97 | 24,557,290.52 | 458,240.97 |
| 453,675.55 | 24,103,614.97 | 453,675.54 |
| 449,149.52 | 23,654,465.45 | 449,149.52 |
| 444,662.55 | 23,209,802.90 | 444,662.55 |
| 440,214.33 | 22,769,588.58 | 440,214.33 |
| 435,804.53 | 22,333,784.05 | 435,804.54 |
| 431,432.85 | 21,902,351.19 | 431,432.85 |
| 427,098.97 | 21,475,252.22 | 427,098.97 |
| 422,802.58 | 21,052,449.64 | 422,802.59 |
| 418,543.38 | 20,633,906.26 | 418,543.38 |
| 414,321.06 | 20,219,585.20 | 414,321.06 |
| 410,135.32 | 19,809,449.88 | 410,135.32 |
| 405,985.86 | 19,403,464.02 | 405,985.86 |

FROM FIG. 5 CONT. 6:

| | | | | | |
|---|---|---|---|---|---|
| 112 | 401,872.38 | 19,001,591.64 | 251,946.25 | 149,926.13 | |
| 113 | 397,794.59 | 18,603,797.04 | 251,007.13 | 146,787.46 | |
| 114 | 393,752.20 | 18,210,044.85 | 250,071.52 | 143,680.68 | 190,015.92 | 100.00 | 251,946.25 | 149,926.13
| 115 | 389,744.91 | 17,820,299.94 | 249,139.39 | 140,605.52 |
| 116 | 385,772.44 | 17,434,527.50 | 248,210.74 | 137,561.70 |
| 117 | 381,834.50 | 17,052,693.00 | 247,285.55 | 134,548.95 |
| 118 | 377,930.81 | 16,674,762.18 | 246,363.80 | 131,567.01 |
| 119 | 374,061.09 | 16,300,701.09 | 245,445.50 | 128,615.60 |
| 120 | 370,225.06 | 15,930,476.02 | 244,530.61 | 125,694.45 |
| 121 | 366,422.45 | 15,564,053.58 | 243,619.14 | 122,803.31 |
| 122 | 362,652.97 | 15,201,400.61 | 242,711.06 | 119,941.91 |
| 123 | 358,916.36 | 14,842,484.25 | 241,806.37 | 117,109.99 |
| 124 | 355,212.35 | 14,487,271.90 | 240,905.05 | 114,307.30 |
| 125 | 351,540.67 | 14,135,731.23 | 240,007.09 | 111,533.58 |
| 126 | 347,901.05 | 13,787,830.18 | 239,112.48 | 108,788.57 |
| 127 | 344,293.23 | 13,443,536.95 | 238,221.20 | 106,072.03 |
| 128 | 340,716.95 | 13,102,820.00 | 237,333.24 | 103,383.71 |
| 129 | 337,171.96 | 12,765,648.04 | 236,448.59 | 100,723.36 |
| 130 | 333,657.98 | 12,431,990.05 | 235,567.25 | 98,090.74 |
| 131 | 330,174.78 | 12,101,815.27 | 234,689.18 | 95,485.60 |
| 132 | 326,722.09 | 11,775,093.18 | 233,814.39 | 92,907.70 |
| 133 | 323,299.67 | 11,451,793.52 | 232,942.86 | 90,356.80 |
| 134 | 319,907.26 | 11,131,886.26 | 232,074.58 | 87,832.68 |
| 135 | 316,544.61 | 10,815,341.65 | 231,209.53 | 85,335.08 |
| 136 | 313,211.50 | 10,502,130.15 | 230,347.71 | 82,863.78 |
| 137 | 309,907.66 | 10,192,222.50 | 229,489.11 | 80,418.55 |
| 138 | 306,632.86 | 9,885,589.64 | 228,633.70 | 77,999.16 |
| 139 | 303,386.86 | 9,582,202.78 | 227,781.48 | 75,605.38 |
| 140 | 300,169.42 | 9,282,033.35 | 226,932.43 | 73,236.99 |

| Row | Col1 | Col2 | Col3 | Col4 | Col5 | Col6 |
|---|---|---|---|---|---|---|
| 112 | 401,872.38 | 19,001,591.64 | 251,946.25 | 149,926.13 | 190,015.92 | 100.00 |
| 113 | 397,794.59 | 18,603,797.04 | 251,007.13 | 146,787.46 | 186,037.97 | 100.00 |
| 114 | 393,752.20 | 18,210,044.85 | 250,071.52 | 143,680.68 | 182,100.45 | 100.00 |
| 115 | 389,744.91 | 17,820,299.94 | 249,139.39 | 140,605.52 | 178,203.00 | 100.00 |
| 116 | 385,772.44 | 17,434,527.50 | 248,210.74 | 137,561.70 | 174,345.28 | 100.00 |
| 117 | 381,834.50 | 17,052,693.00 | 247,285.55 | 134,548.95 | 170,526.93 | 100.00 |
| 118 | 377,930.81 | 16,674,762.18 | 246,363.80 | 131,567.01 | 166,747.62 | 100.00 |
| 119 | 374,061.09 | 16,300,701.09 | 245,445.50 | 128,615.60 | 163,007.01 | 100.00 |
| 120 | 370,225.06 | 15,930,476.02 | 244,530.61 | 125,694.45 | 159,304.76 | 100.00 |
| 121 | 366,422.45 | 15,564,053.58 | 243,619.14 | 122,803.31 | 155,640.54 | 100.00 |
| 122 | 362,652.97 | 15,201,400.61 | 242,711.06 | 119,941.91 | 152,014.01 | 100.00 |
| 123 | 358,916.36 | 14,842,484.25 | 241,806.37 | 117,109.99 | 148,424.84 | 100.00 |
| 124 | 355,212.35 | 14,487,271.90 | 240,905.05 | 114,307.30 | 144,872.72 | 100.00 |
| 125 | 351,540.67 | 14,135,731.23 | 240,007.09 | 111,533.58 | 141,357.31 | 100.00 |
| 126 | 347,901.05 | 13,787,830.18 | 239,112.48 | 108,788.57 | 137,878.30 | 100.00 |
| 127 | 344,293.23 | 13,443,536.95 | 238,221.20 | 106,072.03 | 134,435.37 | 100.00 |
| 128 | 340,716.95 | 13,102,820.00 | 237,333.24 | 103,383.71 | 131,028.20 | 100.00 |
| 129 | 337,171.96 | 12,765,648.04 | 236,448.59 | 100,723.36 | 127,656.48 | 100.00 |
| 130 | 333,657.98 | 12,431,990.05 | 235,567.25 | 98,090.74 | 124,319.90 | 100.00 |
| 131 | 330,174.78 | 12,101,815.27 | 234,689.18 | 95,485.60 | 121,018.15 | 100.00 |
| 132 | 326,722.09 | 11,775,093.18 | 233,814.39 | 92,907.70 | 117,750.93 | 100.00 |
| 133 | 323,299.67 | 11,451,793.52 | 232,942.86 | 90,356.80 | 114,517.94 | 100.00 |
| 134 | 319,907.26 | 11,131,886.26 | 232,074.58 | 87,832.68 | 111,318.86 | 100.00 |
| 135 | 316,544.61 | 10,815,341.65 | 231,209.53 | 85,335.08 | 108,153.42 | 100.00 |
| 136 | 313,211.50 | 10,502,130.15 | 230,347.71 | 82,863.78 | 105,021.30 | 100.00 |
| 137 | 309,907.66 | 10,192,222.50 | 229,489.11 | 80,418.55 | 101,922.23 | 100.00 |
| 138 | 306,632.86 | 9,885,589.64 | 228,633.70 | 77,999.16 | 98,855.90 | 100.00 |
| 139 | 303,386.86 | 9,582,202.78 | 227,781.48 | 75,605.38 | 95,822.03 | 100.00 |
| 140 | 300,169.42 | 9,282,033.35 | 226,932.43 | 73,236.99 | 92,820.33 | 100.00 |

Rightmost columns (TO FIG. 5 CONT. 9):
251,946.25 / 149,926.13; 251,007.13 / 146,787.46; 250,071.52 / 143,680.68; 249,139.39 / 140,605.52; 248,210.74 / 137,561.70; 247,285.55 / 134,548.95; 246,363.80 / 131,567.01; 245,445.50 / 128,615.60; 244,530.61 / 125,694.45; 243,619.14 / 122,803.31; 242,711.06 / 119,941.91; 241,806.37 / 117,109.99; 240,905.05 / 114,307.30; 240,007.09 / 111,533.58; 239,112.48 / 108,788.57; 238,221.20 / 106,072.03; 237,333.24 / 103,383.71; 236,448.59 / 100,723.36; 235,567.25 / 98,090.74; 234,689.18 / 95,485.60; 233,814.39 / 92,907.70; 232,942.86 / 90,356.80; 232,074.58 / 87,832.68; 231,209.53 / 85,335.08; 230,347.71 / 82,863.78; 229,489.11 / 80,418.55; 228,633.70 / 77,999.16; 227,781.48 / 75,605.38; 226,932.43 / 73,236.99

FROM FIG. 5 CONT. 6 → TO FIG. 5 CONT. 10

*FIG. 5 CONT. 9*

FROM FIG. 5 CONT. 7 →

| | |
|---|---|
| 401,872.38 | 19,001,591.64 |
| 397,794.59 | 18,603,797.04 |
| 393,752.20 | 18,210,044.85 |
| 389,744.91 | 17,820,299.94 |
| 385,772.44 | 17,434,527.50 |
| 381,834.50 | 17,052,693.00 |
| 377,930.81 | 16,674,762.18 |
| 374,061.09 | 16,300,701.09 |
| 370,225.06 | 15,930,476.02 |
| 366,422.45 | 15,564,053.58 |
| 362,652.97 | 15,201,400.61 |
| 358,916.36 | 14,842,484.25 |
| 355,212.35 | 14,487,271.90 |
| 351,540.67 | 14,135,731.23 |
| 347,901.05 | 13,787,830.18 |
| 344,293.23 | 13,443,536.95 |
| 340,716.95 | 13,102,820.00 |
| 337,171.96 | 12,765,648.04 |
| 333,657.98 | 12,431,990.05 |
| 330,174.78 | 12,101,815.27 |
| 326,722.09 | 11,775,093.18 |
| 323,299.67 | 11,451,793.52 |
| 319,907.26 | 11,131,886.26 |
| 316,544.61 | 10,815,341.65 |
| 313,211.50 | 10,502,130.15 |
| 309,907.66 | 10,192,222.50 |
| 306,632.86 | 9,885,589.64 |
| 303,386.86 | 9,582,202.78 |
| 300,169.42 | 9,282,033.35 |

TO FIG. 5 CONT. 11 →

| | | |
|---|---|---|
| 401,872.38 | 401,872.38 | 19,001,591.64 |
| 397,794.59 | 397,794.59 | 18,603,797.04 |
| 393,752.20 | 393,752.20 | 18,210,044.85 |
| 389,744.91 | 389,744.91 | 17,820,299.94 |
| 385,772.44 | 385,772.44 | 17,434,527.50 |
| 381,834.50 | 381,834.50 | 17,052,693.00 |
| 377,930.81 | 377,930.81 | 16,674,762.18 |
| 374,061.09 | 374,061.10 | 16,300,701.09 |
| 370,225.06 | 370,225.06 | 15,930,476.02 |
| 366,422.45 | 366,422.45 | 15,564,053.58 |
| 362,652.97 | 362,652.97 | 15,201,400.61 |
| 358,916.36 | 358,916.36 | 14,842,484.25 |
| 355,212.35 | 355,212.35 | 14,487,271.90 |
| 351,540.67 | 351,540.67 | 14,135,731.23 |
| 347,901.05 | 347,901.05 | 13,787,830.18 |
| 344,293.23 | 344,293.23 | 13,443,536.95 |
| 340,716.95 | 340,716.95 | 13,102,820.00 |
| 337,171.96 | 337,171.95 | 12,765,648.04 |
| 333,657.98 | 333,657.99 | 12,431,990.05 |
| 330,174.78 | 330,174.78 | 12,101,815.27 |
| 326,722.09 | 326,722.09 | 11,775,093.18 |
| 323,299.67 | 323,299.66 | 11,451,793.52 |
| 319,907.26 | 319,907.26 | 11,131,886.26 |
| 316,544.61 | 316,544.61 | 10,815,341.65 |
| 313,211.50 | 313,211.49 | 10,502,130.15 |
| 309,907.66 | 309,907.66 | 10,192,222.50 |
| 306,632.86 | 306,632.86 | 9,885,589.64 |
| 303,386.86 | 303,386.86 | 9,582,202.78 |
| 300,169.42 | 300,169.42 | 9,282,033.35 |

FROM FIG. 5 CONT. 8 ↓

| |
|---|
| 190,015.92 |
| 186,037.97 |
| 182,100.45 |
| 178,203.00 |
| 174,345.28 |
| 170,526.93 |
| 166,747.62 |
| 163,007.01 |
| 159,304.76 |
| 155,640.54 |
| 152,014.01 |
| 148,424.84 |
| 144,872.72 |
| 141,357.31 |
| 137,878.30 |
| 134,435.37 |
| 131,028.20 |
| 127,656.48 |
| 124,319.90 |
| 121,018.15 |
| 117,750.93 |
| 114,517.94 |
| 111,318.86 |
| 108,153.42 |
| 105,021.30 |
| 101,922.23 |
| 98,855.90 |
| 95,822.03 |
| 92,820.33 |

| | | | | | | |
|---|---|---|---|---|---|---|
| 141 | 296,980.31 | 8,985,053.04 | 226,086.56 | 70,893.76 | 89,850.53 | 100.00 | 226,086.56 | 70,893.76 |
| 142 | 293,819.30 | 8,691,233.74 | 225,243.83 | 68,575.47 | 86,912.34 | 100.00 | 225,243.83 | 68,575.47 |
| 143 | 290,686.15 | 8,400,547.59 | 224,404.25 | 66,281.90 | 84,005.48 | 100.00 | 224,404.25 | 66,281.90 |
| 144 | 287,580.63 | 8,112,966.96 | 223,567.79 | 64,012.83 | 81,129.67 | 100.00 | 223,567.79 | 64,012.83 |
| 145 | 284,502.51 | 7,828,464.45 | 222,734.46 | 61,768.06 | 78,284.64 | 100.00 | 222,734.46 | 61,768.06 |
| 146 | 281,451.58 | 7,547,012.87 | 221,904.23 | 59,547.35 | 75,470.13 | 100.00 | 221,904.23 | 59,547.35 |
| 147 | 278,427.60 | 7,268,585.28 | 221,077.09 | 57,350.50 | 72,685.85 | 100.00 | 221,077.09 | 57,350.50 |
| 148 | 275,430.35 | 6,993,154.93 | 220,253.04 | 55,177.31 | 69,931.55 | 100.00 | 220,253.04 | 55,177.31 |
| 149 | 272,459.61 | 6,720,695.32 | 219,432.06 | 53,027.55 | 67,206.95 | 100.00 | 219,432.06 | 53,027.55 |
| 150 | 269,515.16 | 6,451,180.16 | 218,614.14 | 50,901.02 | 64,511.80 | 100.00 | 218,614.14 | 50,901.02 |
| 151 | 266,596.79 | 6,184,583.37 | 217,799.26 | 48,797.53 | 61,845.83 | 100.00 | 217,799.26 | 48,797.53 |
| 152 | 263,704.28 | 5,920,879.09 | 216,987.43 | 46,716.85 | 59,208.79 | 100.00 | 216,987.43 | 46,716.85 |
| 153 | 260,837.41 | 5,660,041.68 | 216,178.62 | 44,658.79 | 56,600.42 | 100.00 | 216,178.62 | 44,658.79 |
| 154 | 257,995.98 | 5,402,045.69 | 215,372.83 | 42,623.16 | 54,020.46 | 100.00 | 215,372.83 | 42,623.16 |
| 155 | 255,179.78 | 5,146,865.92 | 214,570.04 | 40,609.74 | 51,468.66 | 100.00 | 214,570.04 | 40,609.74 |
| 156 | 252,388.59 | 4,894,477.33 | 213,770.24 | 38,618.35 | 48,944.77 | 100.00 | 213,770.24 | 38,618.35 |
| 157 | 249,622.20 | 4,644,855.13 | 212,973.42 | 36,648.78 | 46,448.55 | 100.00 | 212,973.42 | 36,648.78 |
| 158 | 246,880.42 | 4,397,974.70 | 212,179.58 | 34,700.85 | 43,979.75 | 100.00 | 212,179.58 | 34,700.85 |
| 159 | 244,163.04 | 4,153,811.66 | 211,388.69 | 32,774.36 | 41,538.12 | 100.00 | 211,388.69 | 32,774.36 |
| 160 | 241,469.86 | 3,912,341.80 | 210,600.75 | 30,869.11 | 39,123.42 | 100.00 | 210,600.75 | 30,869.11 |
| 161 | 238,800.68 | 3,673,541.12 | 209,815.75 | 28,984.93 | 36,735.41 | 100.00 | 209,815.75 | 28,984.93 |
| 162 | 236,155.29 | 3,437,385.83 | 209,033.67 | 27,121.62 | 34,373.86 | 100.00 | 209,033.67 | 27,121.62 |
| 163 | 233,533.51 | 3,203,852.33 | 208,254.51 | 25,279.00 | 32,038.52 | 100.00 | 208,254.51 | 25,279.00 |
| 164 | 230,935.13 | 2,972,917.20 | 207,478.25 | 23,456.88 | 29,729.17 | 100.00 | 207,478.25 | 23,456.88 |
| 165 | 228,359.96 | 2,744,557.24 | 206,704.89 | 21,655.07 | 27,445.57 | 100.00 | 206,704.89 | 21,655.07 |
| 166 | 225,807.81 | 2,518,749.43 | 205,934.41 | 19,873.41 | 25,187.49 | 100.00 | 205,934.41 | 19,873.41 |
| 167 | 223,278.49 | 2,295,470.93 | 205,166.80 | 18,111.70 | 22,954.71 | 100.00 | 205,166.80 | 18,111.70 |
| 168 | 220,771.82 | 2,074,699.12 | 204,402.05 | 16,369.77 | 20,746.99 | 100.00 | 204,402.05 | 16,369.77 |
| 169 | 218,287.59 | 1,856,411.53 | 203,640.15 | 14,647.44 | 18,564.12 | 100.00 | 203,640.15 | 14,647.44 |

FROM FIG. 5 CONT. 9 →

TO FIG. 5 CONT. 13 →

← FROM FIG. 5 CONT. 10

| | | |
|---|---|---|
| 296,980.31 | 8,985,053.04 | 296,980.32 |
| 293,819.30 | 8,691,233.74 | 293,819.30 |
| 290,686.15 | 8,400,547.59 | 290,686.15 |
| 287,580.63 | 8,112,966.96 | 287,580.62 |
| 284,502.51 | 7,828,464.45 | 284,502.52 |
| 281,451.58 | 7,547,012.87 | 281,451.58 |
| 278,427.60 | 7,268,585.28 | 278,427.59 |
| 275,430.35 | 6,993,154.93 | 275,430.35 |
| 272,459.61 | 6,720,695.32 | 272,459.61 |
| 269,515.16 | 6,451,180.16 | 269,515.16 |
| 266,596.79 | 6,184,583.37 | 266,596.79 |
| 263,704.28 | 5,920,879.09 | 263,704.28 |
| 260,837.41 | 5,660,041.68 | 260,837.41 |
| 257,995.98 | 5,402,045.69 | 257,995.99 |
| 255,179.78 | 5,146,865.92 | 255,179.78 |
| 252,388.59 | 4,894,477.33 | 252,388.59 |
| 249,622.20 | 4,644,855.13 | 249,622.20 |
| 246,880.42 | 4,397,974.70 | 246,880.43 |
| 244,163.04 | 4,153,811.66 | 244,163.05 |
| 241,469.86 | 3,912,341.80 | 241,469.86 |
| 238,800.68 | 3,673,541.12 | 238,800.68 |
| 236,155.29 | 3,437,385.83 | 236,155.29 |
| 233,533.51 | 3,203,852.33 | 233,533.51 |
| 230,935.13 | 2,972,917.20 | 230,935.13 |
| 228,359.96 | 2,744,557.24 | 228,359.96 |
| 225,807.81 | 2,518,749.43 | 225,807.82 |
| 223,278.49 | 2,295,470.93 | 223,278.50 |
| 220,771.82 | 2,074,699.12 | 220,771.82 |
| 218,287.59 | 1,856,411.53 | 218,287.59 |

Lower column (FROM FIG. 5 CONT. 10):

89,850.53
86,912.34
84,005.48
81,129.67
78,284.64
75,470.13
72,685.85
69,931.55
67,206.95
64,511.80
61,845.83
59,208.79
56,600.42
54,020.46
51,468.66
48,944.77
46,448.55
43,979.75
41,538.12
39,123.42
36,735.41
34,373.86
32,038.52
29,729.17
27,445.57
25,187.49
22,954.71
20,746.99
18,564.12

| | | | | | TO FIG. 5 CONT. 13 → |
|---|---|---|---|---|---|
| FROM FIG. 5 CONT. 10 | 170 | 215,825.63 | 1,640,585.90 | 202,881.09 | 12,944.53 | 16,405.86 | 100.00 | 202,881.09 | 12,944.53 |
| | 171 | 213,385.74 | 1,427,200.16 | 202,124.87 | 11,260.88 | 14,272.00 | 100.00 | 202,124.87 | 11,260.88 |
| | 172 | 210,967.76 | 1,216,232.40 | 201,371.46 | 9,596.30 | 12,162.32 | 100.00 | 201,371.46 | 9,596.30 |
| | 173 | 208,571.49 | 1,007,660.91 | 200,620.86 | 7,950.63 | 10,076.61 | 100.00 | 200,620.86 | 7,950.63 |
| | 174 | 206,196.76 | 801,464.15 | 199,873.05 | 6,323.70 | 8,014.64 | 100.00 | 199,873.05 | 6,323.70 |
| | 175 | 203,843.38 | 597,620.77 | 199,128.04 | 4,715.34 | 5,976.21 | 100.00 | 199,128.04 | 4,715.34 |
| | 176 | 201,511.18 | 396,109.59 | 198,385.80 | 3,125.38 | 3,961.10 | 100.00 | 198,385.80 | 3,125.38 |
| | 177 | 199,199.98 | 196,909.61 | 197,646.33 | 1,553.65 | 1,969.10 | 100.00 | 197,646.33 | 1,553.65 |
| | 178 | 196,909.61 | 0 | 196,909.61 | 0 | 0.00 | 100.00 | 196,909.61 | 0.00 |

↑ FROM FIG. 5 CONT. 11

| | |
|---|---|
| 215,825.63 | 1,640,585.90 |
| 213,385.74 | 1,427,200.16 |
| 210,967.76 | 1,216,232.40 |
| 208,571.49 | 1,007,660.91 |
| 206,196.76 | 801,464.15 |
| 203,843.38 | 597,620.77 |
| 201,511.18 | 396,109.59 |
| 199,199.98 | 196,909.61 |
| 196,909.61 | - |

| | |
|---|---|
| 1,640,585.90 | 215,825.62 |
| 1,427,200.16 | 213,385.75 |
| 1,216,232.40 | 210,967.76 |
| 1,007,660.91 | 208,571.49 |
| 801,464.15 | 206,196.75 |
| 597,620.77 | 203,843.38 |
| 396,109.59 | 201,511.18 |
| 196,909.61 | 199,199.98 |
| - | 196,909.61 |

| |
|---|
| 215,825.63 |
| 213,385.74 |
| 210,967.76 |
| 208,571.49 |
| 206,196.76 |
| 203,843.38 |
| 201,511.18 |
| 199,199.98 |
| 196,909.61 |

← FROM FIG. 5 CONT. 12

| |
|---|
| 16,405.86 |
| 14,272.00 |
| 12,162.32 |
| 10,076.61 |
| 8,014.64 |
| 5,976.21 |
| 3,961.10 |
| 1,969.10 |
| - |

FIG. 7

| PERIOD | PRINCIPAL | COLLAT BALANCE | SCHED PRINC | PREPAY PRINC | CAP 1 | CAP AT (SCHEDULE + (PREPAY*SHIFT)) % SHIFT OF PREPAY | SCHED*SHIFT | PREPAY*SHIFT |
|---|---|---|---|---|---|---|---|---|
| TOTAL | 100,000,000.00 | | 12,151,292.69 | 87,848,707.31 | | | | |
| 0 | 0.00 | 100,000,000.00 | 0.00 | 0.00 | | | | |
| 1 | 3,894,095.77 | 96,105,904.23 | 381,356.69 | 3,512,739.07 | 961,059.04 | 0.00 | 0.00 | 0.00 |
| 2 | 3,745,276.59 | 92,360,627.64 | 369,430.04 | 3,375,846.55 | 923,606.28 | 0.00 | 0.00 | 0.00 |
| 3 | 3,602,064.90 | 88,758,562.74 | 357,876.38 | 3,244,188.52 | 887,585.63 | 0.00 | 0.00 | 0.00 |
| 4 | 3,464,251.71 | 85,294,311.03 | 346,684.05 | 3,117,567.66 | 852,943.11 | 0.00 | 0.00 | 0.00 |
| 5 | 3,331,635.77 | 81,962,675.26 | 335,841.76 | 2,995,794.01 | 819,626.75 | 0.00 | 0.00 | 0.00 |
| 6 | 3,204,023.23 | 78,758,652.03 | 325,338.55 | 2,878,684.68 | 787,586.52 | 0.00 | 0.00 | 0.00 |
| 7 | 3,081,227.45 | 75,677,424.58 | 315,163.82 | 2,766,063.63 | 756,774.25 | 0.00 | 0.00 | 0.00 |
| 8 | 2,963,068.66 | 72,714,355.92 | 305,307.30 | 2,657,761.36 | 727,143.56 | 0.00 | 0.00 | 0.00 |
| 9 | 2,849,373.76 | 69,864,982.16 | 295,759.03 | 2,553,614.73 | 698,649.82 | 0.00 | 0.00 | 0.00 |
| 10 | 2,739,976.04 | 67,125,006.11 | 286,509.38 | 2,453,466.66 | 671,250.06 | 0.00 | 0.00 | 0.00 |
| 11 | 2,634,714.96 | 64,490,291.15 | 277,549.01 | 2,357,165.96 | 644,902.91 | 0.00 | 0.00 | 0.00 |
| 12 | 2,533,435.93 | 61,956,855.22 | 268,868.86 | 2,264,567.07 | 619,568.55 | 0.00 | 0.00 | 0.00 |
| 13 | 2,435,990.09 | 59,520,865.13 | 260,460.18 | 2,175,529.90 | 595,208.65 | 25.00 | 65,115.05 | 543,882.48 |
| 14 | 2,342,234.06 | 57,178,631.07 | 252,314.48 | 2,089,919.58 | 571,786.31 | 25.00 | 63,078.62 | 522,479.90 |
| 15 | 2,252,029.82 | 54,926,601.25 | 244,423.52 | 2,007,606.30 | 549,266.01 | 25.00 | 61,105.88 | 501,901.58 |
| 16 | 2,165,244.43 | 52,761,356.82 | 236,779.35 | 1,928,465.07 | 527,613.57 | 25.00 | 59,194.84 | 482,116.27 |
| 17 | 2,081,749.89 | 50,679,606.93 | 229,374.25 | 1,852,375.64 | 506,796.07 | 25.00 | 57,343.56 | 463,093.91 |
| 18 | 2,001,422.94 | 48,678,183.99 | 222,200.74 | 1,779,222.21 | 486,781.84 | 25.00 | 55,550.19 | 444,805.55 |
| 19 | 1,924,144.91 | 46,754,039.08 | 215,251.57 | 1,708,893.34 | 467,540.39 | 25.00 | 53,812.89 | 427,223.34 |
| 20 | 1,849,801.51 | 44,904,237.57 | 208,519.73 | 1,641,281.78 | 449,042.38 | 25.00 | 52,129.93 | 410,320.45 |
| 21 | 1,778,282.71 | 43,125,954.86 | 201,998.43 | 1,576,284.29 | 431,259.55 | 25.00 | 50,499.61 | 394,071.07 |
| 22 | 1,709,482.56 | 41,416,472.30 | 195,681.07 | 1,513,801.48 | 414,164.72 | 25.00 | 48,920.27 | 378,450.37 |
| 23 | 1,643,299.02 | 39,773,173.28 | 189,561.29 | 1,453,737.74 | 397,731.73 | 25.00 | 47,390.32 | 363,434.44 |
| 24 | 1,579,633.89 | 38,193,539.39 | 183,632.89 | 1,396,001.00 | 381,935.39 | 25.00 | 45,908.22 | 349,000.25 |

| CAPPED NAS | | | CAPPED AS | | NON-CAPPED NAS | | | NC AS |
|---|---|---|---|---|---|---|---|---|
| SCHEDULES | PRINCIPAL | BALANCE | PRINCIPAL | BALANCE | SCHEDULES | PRINCIPAL | BALANCE | PRINCIPAL | BALANCE |
| | | 25,000,000.04 | | 75,000,000.00 | | | 25,000,000.00 | | 75,000,000.00 |
| 0.00 | | 25,000,000.00 | 3,894,095.77 | 71,105,904.23 | | | 25,000,000.00 | 3,894,095.77 | 71,105,904.23 |
| 0.00 | | 25,000,000.00 | 3,745,276.59 | 67,360,627.64 | | | 25,000,000.00 | 3,745,276.59 | 67,360,627.64 |
| 0.00 | | 25,000,000.00 | 3,602,064.90 | 63,758,562.74 | | | 25,000,000.00 | 3,602,064.90 | 63,758,562.74 |
| 0.00 | | 25,000,000.00 | 3,464,251.71 | 60,294,311.03 | | | 25,000,000.00 | 3,464,251.71 | 60,294,311.03 |
| 0.00 | | 25,000,000.00 | 3,331,635.77 | 56,962,675.26 | | | 25,000,000.00 | 3,331,635.77 | 56,962,675.26 |
| 0.00 | | 25,000,000.00 | 3,204,023.23 | 53,758,652.03 | | | 25,000,000.00 | 3,204,023.23 | 53,758,652.03 |
| 0.00 | | 25,000,000.00 | 3,081,227.45 | 50,677,424.58 | | | 25,000,000.00 | 3,081,227.45 | 50,677,424.58 |
| 0.00 | | 25,000,000.00 | 2,963,068.66 | 47,714,355.92 | | | 25,000,000.00 | 2,963,068.66 | 47,714,355.92 |
| 0.00 | | 25,000,000.00 | 2,849,373.76 | 44,864,982.16 | | | 25,000,000.00 | 2,849,373.76 | 44,864,982.16 |
| 0.00 | | 25,000,000.00 | 2,739,976.04 | 42,125,006.11 | | | 25,000,000.00 | 2,739,976.04 | 42,125,006.11 |
| 0.00 | | 25,000,000.00 | 2,634,714.96 | 39,490,291.15 | | | 25,000,000.00 | 2,634,714.96 | 39,490,291.15 |
| 0.00 | | 25,000,000.00 | 2,533,435.93 | 36,956,855.22 | | | 25,000,000.00 | 2,533,435.93 | 36,956,855.22 |
| 595,208.65 | | 24,404,791.35 | 1,840,781.43 | 35,116,073.78 | 608,997.52 | | 24,391,002.48 | 1,826,992.56 | 35,129,862.65 |
| 571,786.31 | | 23,833,005.04 | 1,770,447.75 | 33,345,626.03 | 585,558.52 | | 23,805,443.96 | 1,756,675.55 | 33,373,187.10 |
| 549,266.01 | | 23,283,739.03 | 1,702,763.81 | 31,642,862.22 | 563,007.45 | | 23,242,436.51 | 1,689,022.36 | 31,684,164.74 |
| 527,613.57 | | 22,756,125.46 | 1,637,630.86 | 30,005,231.36 | 541,311.11 | | 22,701,125.40 | 1,623,933.32 | 30,060,231.42 |
| 506,796.07 | | 22,249,329.39 | 1,574,953.82 | 28,430,277.55 | 520,437.47 | | 22,180,687.93 | 1,561,312.41 | 28,498,919.00 |
| 486,781.84 | | 21,762,547.55 | 1,514,641.10 | 26,915,636.44 | 500,355.74 | | 21,680,332.19 | 1,501,067.21 | 26,997,851.80 |
| 467,540.39 | | 21,295,007.16 | 1,456,604.52 | 25,459,031.92 | 481,036.23 | | 21,199,295.97 | 1,443,108.68 | 25,554,743.12 |
| 449,042.38 | | 20,845,964.78 | 1,400,759.14 | 24,058,272.79 | 462,450.38 | | 20,736,845.59 | 1,387,351.13 | 24,167,391.98 |
| 431,259.55 | | 20,414,705.23 | 1,347,023.16 | 22,711,249.62 | 444,570.68 | | 20,292,274.91 | 1,333,712.03 | 22,833,679.95 |
| 414,164.72 | | 20,000,540.51 | 1,295,317.83 | 21,415,931.79 | 427,370.64 | | 19,864,904.27 | 1,282,111.92 | 21,551,568.03 |
| 397,731.73 | | 19,602,808.78 | 1,245,567.29 | 20,170,364.50 | 410,824.76 | | 19,454,079.52 | 1,232,474.27 | 20,319,093.76 |
| 381,935.39 | | 19,220,873.38 | 1,197,698.50 | 18,972,666.00 | 394,908.47 | | 19,059,171.04 | 1,184,725.42 | 19,134,368.34 |

| | | | | | | | |
|---|---|---|---|---|---|---|---|
| 25 | 1,518,392.58 | 36,675,146.81 | 177,889.91 | 1,340,502.67 | 366,751.47 | 50.00 | 88,944.96 | 670,251.34 |
| 26 | 1,459,484.02 | 35,215,662.79 | 172,326.53 | 1,287,157.49 | 352,156.63 | 50.00 | 86,163.27 | 643,578.75 |
| 27 | 1,402,820.54 | 33,812,842.25 | 166,937.14 | 1,235,883.40 | 338,128.42 | 50.00 | 83,468.57 | 617,941.70 |
| 28 | 1,348,317.73 | 32,464,524.51 | 161,716.30 | 1,186,601.43 | 324,645.25 | 50.00 | 80,858.15 | 593,300.72 |
| 29 | 1,295,894.32 | 31,168,630.19 | 156,658.74 | 1,139,235.58 | 311,686.30 | 50.00 | 78,329.37 | 569,617.79 |
| 30 | 1,245,472.04 | 29,923,158.16 | 151,759.35 | 1,093,712.69 | 299,231.58 | 50.00 | 75,879.68 | 546,856.35 |
| 31 | 1,196,975.57 | 28,726,182.59 | 147,013.19 | 1,049,962.38 | 287,261.83 | 50.00 | 73,506.60 | 524,981.19 |
| 32 | 1,150,332.37 | 27,575,850.22 | 142,415.46 | 1,007,916.92 | 275,758.50 | 50.00 | 71,207.73 | 503,958.46 |
| 33 | 1,105,472.62 | 26,470,377.60 | 137,961.51 | 967,511.11 | 264,703.78 | 50.00 | 68,980.76 | 483,755.56 |
| 34 | 1,062,329.09 | 25,408,048.51 | 133,646.87 | 928,682.22 | 254,080.49 | 50.00 | 66,823.44 | 464,341.11 |
| 35 | 1,020,837.06 | 24,387,211.45 | 129,467.16 | 891,369.90 | 243,872.11 | 50.00 | 64,733.58 | 445,684.95 |
| 36 | 980,934.23 | 23,406,277.22 | 125,418.17 | 855,516.06 | 234,062.77 | 50.00 | 62,709.09 | 427,758.03 |
| 37 | 942,560.60 | 22,463,716.62 | 121,495.80 | 821,064.80 | 224,637.17 | 75.00 | 91,121.85 | 615,798.60 |
| 38 | 905,658.45 | 21,558,058.17 | 117,696.11 | 787,962.34 | 215,580.58 | 75.00 | 88,272.08 | 590,971.76 |
| 39 | 870,172.18 | 20,687,885.99 | 114,015.25 | 756,156.93 | 206,878.86 | 75.00 | 85,511.44 | 567,117.70 |
| 40 | 836,048.27 | 19,851,837.72 | 110,449.50 | 725,598.77 | 198,518.38 | 75.00 | 82,837.13 | 544,199.08 |
| 41 | 803,235.23 | 19,048,602.49 | 106,995.27 | 696,239.95 | 190,486.02 | 75.00 | 80,246.45 | 522,179.96 |
| 42 | 771,683.45 | 18,276,919.04 | 103,649.07 | 668,034.37 | 182,769.19 | 75.00 | 77,736.80 | 501,025.78 |
| 43 | 741,345.21 | 17,535,573.84 | 100,407.52 | 640,937.68 | 175,355.74 | 75.00 | 75,305.64 | 480,703.26 |
| 44 | 712,174.55 | 16,823,399.29 | 97,267.35 | 614,907.20 | 168,233.99 | 75.00 | 72,950.51 | 461,180.40 |
| 45 | 684,127.24 | 16,139,272.05 | 94,225.38 | 589,901.86 | 161,392.72 | 75.00 | 70,669.04 | 442,426.40 |
| 46 | 657,160.72 | 15,482,111.32 | 91,278.55 | 565,882.17 | 154,821.11 | 75.00 | 68,458.91 | 424,411.63 |
| 47 | 631,234.00 | 14,850,877.33 | 88,423.88 | 542,810.12 | 148,508.77 | 75.00 | 66,317.91 | 407,107.59 |
| 48 | 606,307.63 | 14,244,569.69 | 85,658.49 | 520,649.14 | 142,445.70 | 75.00 | 64,243.87 | 390,486.86 |
| 49 | 582,343.65 | 13,662,226.05 | 82,979.58 | 499,364.07 | 136,622.26 | 75.00 | 62,234.69 | 374,523.05 |
| 50 | 559,305.51 | 13,102,920.54 | 80,384.46 | 478,921.05 | 131,029.21 | 75.00 | 60,288.35 | 359,190.79 |
| 51 | 537,158.04 | 12,565,762.50 | 77,870.49 | 459,287.55 | 125,657.63 | 75.00 | 58,402.87 | 344,465.66 |
| 52 | 515,867.37 | 12,049,895.13 | 75,435.15 | 440,432.23 | 120,498.95 | 75.00 | 56,576.36 | 330,324.17 |

| ← FROM FIG. 7 CONT. 2 | | | | | | FROM FIG. 7 CONT. 1 ↓ |
|---|---|---|---|---|---|---|
| 366,751.47 | 18,854,121.92 | 1,151,641.11 | 17,821,024.89 | 759,196.29 | 18,299,974.75 | 759,196.29 18,375,172.06 |
| 352,156.63 | 18,501,965.29 | 1,107,327.39 | 16,713,697.50 | 729,742.01 | 17,570,232.74 | 729,742.01 17,645,430.05 |
| 338,128.42 | 18,163,836.86 | 1,064,692.12 | 15,649,005.38 | 701,410.27 | 16,868,822.47 | 701,410.27 16,944,019.77 |
| 324,645.25 | 17,839,191.62 | 1,023,672.49 | 14,625,332.89 | 674,158.87 | 16,194,663.60 | 674,158.87 16,269,860.91 |
| 311,686.30 | 17,527,505.32 | 984,208.01 | 13,641,124.88 | 647,947.16 | 15,546,716.45 | 647,947.16 15,621,913.75 |
| 299,231.58 | 17,228,273.74 | 946,240.46 | 12,694,884.42 | 622,736.02 | 14,923,980.43 | 622,736.02 14,999,177.73 |
| 287,261.83 | 16,941,011.91 | 909,713.74 | 11,785,170.68 | 598,487.78 | 14,325,492.64 | 598,487.78 14,400,689.94 |
| 275,758.50 | 16,665,253.41 | 874,573.87 | 10,910,596.81 | 575,166.19 | 13,750,326.46 | 575,166.19 13,825,523.76 |
| 264,703.78 | 16,400,549.63 | 840,768.84 | 10,069,827.97 | 552,736.31 | 13,197,590.15 | 552,736.31 13,272,787.45 |
| 254,080.49 | 16,146,469.15 | 808,248.60 | 9,261,579.36 | 531,164.54 | 12,666,425.60 | 531,164.54 12,741,622.90 |
| 243,872.11 | 15,902,597.03 | 776,964.95 | 8,484,614.41 | 510,418.53 | 12,156,007.07 | 510,418.53 12,231,204.37 |
| 234,062.77 | 15,668,534.26 | 746,871.45 | 7,737,742.96 | 490,467.11 | 11,665,539.96 | 490,467.11 11,740,737.26 |
| 224,637.17 | 15,443,897.09 | 717,923.44 | 7,019,819.52 | 706,920.45 | 10,958,619.51 | 235,640.15 11,505,097.11 |
| 215,580.58 | 15,228,316.51 | 690,077.87 | 6,329,741.66 | 679,243.84 | 10,279,375.67 | 226,414.61 11,278,682.50 |
| 206,878.86 | 15,021,437.65 | 663,293.32 | 5,666,448.34 | 652,629.13 | 9,626,746.54 | 217,543.04 11,061,139.45 |
| 198,518.38 | 14,822,919.28 | 637,529.90 | 5,028,918.44 | 627,036.21 | 8,999,710.33 | 209,012.07 10,852,127.39 |
| 190,486.02 | 14,632,433.25 | 612,749.20 | 4,416,169.24 | 602,426.42 | 8,397,283.91 | 200,808.81 10,651,318.58 |
| 182,769.19 | 14,449,664.06 | 588,914.26 | 3,827,254.98 | 578,762.59 | 7,818,521.32 | 192,920.86 10,458,397.72 |
| 175,355.74 | 14,274,308.32 | 565,989.47 | 3,261,265.51 | 556,008.90 | 7,262,512.42 | 185,336.30 10,273,061.42 |
| 168,233.99 | 14,106,074.33 | 543,940.55 | 2,717,324.96 | 534,130.91 | 6,728,381.51 | 178,043.64 10,095,017.78 |
| 161,392.72 | 13,944,681.61 | 522,734.52 | 2,194,590.44 | 513,095.43 | 6,215,286.08 | 171,031.81 9,923,985.97 |
| 154,821.11 | 13,789,860.50 | 502,339.61 | 1,692,250.83 | 492,870.54 | 5,722,415.54 | 164,290.18 9,759,695.79 |
| 148,508.77 | 13,641,351.72 | 482,725.23 | 1,209,525.60 | 473,425.50 | 5,248,990.04 | 157,808.50 9,601,887.29 |
| 142,445.70 | 13,498,906.03 | 463,861.93 | 745,663.67 | 454,730.72 | 4,794,259.31 | 151,576.91 9,450,310.38 |
| 136,622.26 | 13,362,283.76 | 445,721.39 | 299,942.28 | 436,757.74 | 4,357,501.58 | 145,585.91 9,304,724.47 |
| 131,029.21 | 13,102,920.54 | 299,942.28 | | 419,479.13 | 3,938,022.45 | 139,826.38 9,164,898.09 |
| 125,657.63 | 12,565,762.50 | | | 402,868.53 | 3,535,153.92 | 134,289.51 9,030,608.58 |
| 120,498.95 | 12,049,895.13 | | | 386,900.53 | 3,148,253.39 | 128,966.84 8,901,641.74 |

| | | | | | | |
|---|---|---|---|---|---|---|
| 53 | 495,400.94 | 11,554,494.19 | 73,075.97 | 422,324.97 | 115,544.94 | 75.00 | 54,806.98 | 316,743.73 |
| 54 | 475,727.37 | 11,078,766.83 | 70,790.57 | 404,936.80 | 110,787.67 | 75.00 | 53,092.93 | 303,702.60 |
| 55 | 456,816.47 | 10,621,950.35 | 68,576.64 | 388,239.83 | 106,219.50 | 75.00 | 51,432.48 | 291,179.87 |
| 56 | 438,639.21 | 10,183,311.14 | 66,431.96 | 372,207.26 | 101,833.11 | 75.00 | 49,823.97 | 279,155.45 |
| 57 | 421,167.63 | 9,762,143.51 | 64,354.35 | 356,813.28 | 97,621.44 | 75.00 | 48,265.76 | 267,609.96 |
| 58 | 404,374.80 | 9,357,768.70 | 62,341.71 | 342,033.09 | 93,577.69 | 75.00 | 46,756.28 | 256,524.82 |
| 59 | 388,234.85 | 8,969,533.85 | 60,392.02 | 327,842.83 | 89,695.34 | 75.00 | 45,294.02 | 245,882.12 |
| 60 | 372,722.85 | 8,596,811.00 | 58,503.30 | 314,219.55 | 85,968.11 | 75.00 | 43,877.48 | 235,664.66 |
| 61 | 357,814.82 | 8,238,996.18 | 56,673.65 | 301,141.16 | 82,389.96 | 75.00 | 42,505.24 | 225,855.87 |
| 62 | 343,487.67 | 7,895,508.51 | 54,901.23 | 288,586.45 | 78,955.09 | 75.00 | 41,175.92 | 216,439.84 |
| 63 | 329,719.20 | 7,565,789.31 | 53,184.23 | 276,534.97 | 75,657.89 | 75.00 | 39,888.17 | 207,401.23 |
| 64 | 316,488.04 | 7,249,301.27 | 51,520.93 | 264,967.11 | 72,493.01 | 75.00 | 38,640.70 | 198,725.33 |
| 65 | 303,773.62 | 6,945,527.65 | 49,909.65 | 253,863.97 | 69,455.28 | 75.00 | 37,432.24 | 190,397.98 |
| 66 | 291,556.15 | 6,653,971.50 | 48,348.76 | 243,207.39 | 66,539.72 | 75.00 | 36,261.57 | 182,405.54 |
| 67 | 279,816.58 | 6,374,154.92 | 46,836.69 | 232,979.89 | 63,741.55 | 75.00 | 35,127.52 | 174,734.92 |
| 68 | 268,536.59 | 6,105,618.33 | 45,371.91 | 223,164.69 | 61,056.18 | 75.00 | 34,028.93 | 167,373.52 |
| 69 | 257,698.55 | 5,847,919.77 | 43,952.93 | 213,745.62 | 58,479.20 | 75.00 | 32,964.70 | 160,309.22 |
| 70 | 247,285.50 | 5,600,634.27 | 42,578.34 | 204,707.16 | 56,006.34 | 75.00 | 31,933.76 | 153,530.37 |
| 71 | 237,281.10 | 5,363,353.18 | 41,246.73 | 196,034.37 | 53,633.53 | 75.00 | 30,935.05 | 147,025.78 |
| 72 | 227,669.65 | 5,135,683.53 | 39,956.77 | 187,712.88 | 51,356.84 | 75.00 | 29,967.58 | 140,784.66 |
| 73 | 218,436.04 | 4,917,247.49 | 38,707.15 | 179,728.89 | 49,172.47 | 75.00 | 29,030.36 | 134,796.67 |
| 74 | 209,565.72 | 4,707,681.77 | 37,496.61 | 172,069.11 | 47,076.82 | 75.00 | 28,122.46 | 129,051.83 |
| 75 | 201,044.72 | 4,506,637.05 | 36,323.93 | 164,720.79 | 45,066.37 | 75.00 | 27,242.95 | 123,540.59 |
| 76 | 192,859.56 | 4,313,777.49 | 35,187.93 | 157,671.63 | 43,137.77 | 75.00 | 26,390.95 | 118,253.72 |
| 77 | 184,997.30 | 4,128,780.20 | 34,087.45 | 150,909.85 | 41,287.80 | 75.00 | 25,565.59 | 113,182.39 |
| 78 | 177,445.48 | 3,951,334.72 | 33,021.39 | 144,424.09 | 39,513.35 | 75.00 | 24,766.04 | 108,318.07 |
| 79 | 170,192.12 | 3,781,142.60 | 31,988.67 | 138,203.45 | 37,811.43 | 75.00 | 23,991.50 | 103,652.59 |
| 80 | 163,225.68 | 3,617,916.92 | 30,988.25 | 132,237.43 | 36,179.17 | 75.00 | 23,241.19 | 99,178.07 |
| 81 | 156,535.08 | 3,461,381.84 | 30,019.11 | 126,515.97 | 34,613.82 | 75.00 | 22,514.33 | 94,886.98 |

FIG. 7 CONT. 5

← FROM FIG. 7 CONT. 3

| | | |
|---:|---:|---:|
| 371,550.70 | 2,776,702.69 | 8,777,791.50 |
| 356,795.52 | 2,419,907.16 | 8,658,859.66 |
| 342,612.36 | 2,077,294.81 | 8,544,655.54 |
| 328,979.41 | 1,748,315.40 | 8,434,995.74 |
| 315,875.72 | 1,432,439.68 | 8,329,703.83 |
| 303,281.10 | 1,129,158.57 | 8,228,610.13 |
| 291,176.14 | 837,982.43 | 8,131,551.42 |
| 279,542.14 | 558,440.29 | 8,038,370.71 |
| 268,361.11 | 290,079.18 | 7,948,917.00 |
| 257,615.75 | 32,463.43 | 7,863,045.08 |
| | · | 7,565,789.31 |
| | | 7,249,301.27 |

| | | |
|---:|---:|---:|
| 371,550.71 | 123,850.23 | 8,777,791.50 |
| 356,795.53 | 118,931.84 | 8,658,859.66 |
| 342,612.35 | 114,204.12 | 8,544,655.54 |
| 328,979.42 | 109,659.80 | 8,434,995.74 |
| 315,875.72 | 105,291.91 | 8,329,703.83 |
| 303,281.10 | 101,093.70 | 8,228,610.13 |
| 291,176.14 | 97,058.71 | 8,131,551.42 |
| 279,542.14 | 93,180.71 | 8,038,370.71 |
| 268,361.11 | 89,453.70 | 7,948,917.00 |
| 257,615.76 | 85,871.92 | 7,863,045.08 |
| 247,289.40 | 297,255.77 | 7,565,789.31 |
| 237,366.03 | 316,488.04 | 7,249,301.27 |
| 227,830.22 | 303,773.62 | 6,945,527.65 |
| 218,667.11 | 291,556.15 | 6,653,971.50 |
| 209,862.44 | 279,816.58 | 6,374,154.92 |
| 201,402.45 | 268,536.59 | 6,105,618.33 |
| 193,273.91 | 257,698.55 | 5,847,919.77 |
| 185,464.13 | 247,285.50 | 5,600,634.27 |
| 177,960.83 | 237,281.10 | 5,363,353.18 |
| 170,752.24 | 227,669.65 | 5,135,683.53 |
| 163,827.03 | 218,436.04 | 4,917,247.49 |
| 157,174.29 | 209,565.72 | 4,707,681.77 |
| 150,783.54 | 201,044.72 | 4,506,637.05 |
| 144,644.67 | 192,859.56 | 4,313,777.49 |
| 138,747.98 | 184,997.30 | 4,128,780.20 |
| 133,084.11 | 177,445.48 | 3,951,334.72 |
| 127,644.09 | 170,192.12 | 3,781,142.60 |
| 122,419.26 | 163,225.68 | 3,617,916.92 |
| 117,401.31 | 156,535.08 | 3,461,381.84 |

TO FIG. 7 CONT. 7 →

← FROM FIG. 7 CONT. 4

| | |
|---:|---:|
| 115,544.94 | 11,554,494.19 |
| 110,787.67 | 11,078,766.83 |
| 106,219.50 | 10,621,950.35 |
| 101,833.11 | 10,183,311.14 |
| 97,621.44 | 9,762,143.51 |
| 93,577.69 | 9,357,768.70 |
| 89,695.34 | 8,969,533.85 |
| 85,968.11 | 8,596,811.00 |
| 82,389.96 | 8,238,996.18 |
| 78,955.09 | 7,895,508.51 |
| 75,657.89 | 7,565,789.31 |
| 72,493.01 | 7,249,301.27 |
| 69,455.28 | 6,945,527.65 |
| 66,539.72 | 6,653,971.50 |
| 63,741.55 | 6,374,154.92 |
| 6,056.18 | 6,105,618.33 |
| 58,479.20 | 5,847,919.77 |
| 56,006.34 | 5,600,634.27 |
| 53,633.53 | 5,363,353.18 |
| 51,356.84 | 5,135,683.53 |
| 49,172.47 | 4,917,247.49 |
| 47,076.82 | 4,707,681.77 |
| 45,066.37 | 4,506,637.05 |
| 43,137.77 | 4,313,777.49 |
| 41,287.80 | 4,128,780.20 |
| 39,513.35 | 3,951,334.72 |
| 37,811.43 | 3,781,142.60 |
| 36,179.17 | 3,617,916.92 |
| 34,613.82 | 3,461,381.84 |

| | |
|---:|---:|
| 495,400.94 | 316,488.04 |
| 475,727.37 | 303,773.62 |
| 456,816.47 | 291,556.15 |
| 438,639.21 | 279,816.58 |
| 421,167.63 | 268,536.59 |
| 404,374.80 | 257,698.55 |
| 388,234.85 | 247,285.50 |
| 372,722.85 | 237,281.10 |
| 357,814.82 | 227,669.65 |
| 343,487.67 | 218,436.04 |
| 329,719.20 | 209,565.72 |
| | 201,044.72 |
| | 192,859.56 |
| | 184,997.30 |
| | 177,445.48 |
| | 170,192.12 |
| | 163,225.68 |
| | 156,535.08 |

| | | | | | |
|---|---|---|---|---|---|
| 82 | 150,109.64 | 3,311,272.21 | 29,080.28 | 121,029.35 | 33,112.72 | 75.00 | 21,810.21 | 90,772.01 |
| 83 | 143,939.09 | 3,167,333.11 | 28,170.82 | 115,768.28 | 31,673.33 | 75.00 | 21,128.12 | 86,826.21 |
| 84 | 138,013.58 | 3,029,319.54 | 27,289.80 | 110,723.78 | 30,293.20 | 75.00 | 20,467.35 | 83,042.84 |
| 85 | 132,323.59 | 2,896,995.95 | 26,436.33 | 105,887.26 | 28,969.96 | 100.00 | 26,436.33 | 105,887.26 |
| 86 | 126,859.99 | 2,770,135.96 | 25,609.55 | 101,250.44 | 27,701.36 | 100.00 | 25,609.55 | 101,250.44 |
| 87 | 121,613.99 | 2,648,521.97 | 24,808.63 | 96,805.36 | 26,485.22 | 100.00 | 24,808.63 | 96,805.36 |
| 88 | 116,577.14 | 2,531,944.83 | 24,032.76 | 92,544.38 | 25,319.45 | 100.00 | 24,032.76 | 92,544.38 |
| 89 | 111,741.31 | 2,420,203.52 | 23,281.15 | 88,460.16 | 24,202.04 | 100.00 | 23,281.15 | 88,460.16 |
| 90 | 107,098.68 | 2,313,104.84 | 22,553.05 | 84,545.63 | 23,131.05 | 100.00 | 22,553.05 | 84,545.63 |
| 91 | 102,641.72 | 2,210,463.12 | 21,847.72 | 80,794.00 | 22,104.63 | 100.00 | 21,847.72 | 80,794.00 |
| 92 | 98,363.20 | 2,112,099.92 | 21,164.45 | 77,198.75 | 21,121.00 | 100.00 | 21,164.45 | 77,198.75 |
| 93 | 94,256.17 | 2,017,843.75 | 20,502.55 | 73,753.62 | 20,178.44 | 100.00 | 20,502.55 | 73,753.62 |
| 94 | 90,313.93 | 1,927,529.83 | 19,861.34 | 70,452.58 | 19,275.30 | 100.00 | 19,861.34 | 70,452.58 |
| 95 | 86,530.04 | 1,840,999.78 | 19,240.19 | 67,289.85 | 18,410.00 | 100.00 | 19,240.19 | 67,289.85 |
| 96 | 82,898.33 | 1,758,101.45 | 18,638.47 | 64,259.86 | 17,581.01 | 100.00 | 18,638.47 | 64,259.86 |
| 97 | 79,412.83 | 1,678,688.63 | 18,055.57 | 61,357.26 | 16,786.89 | 100.00 | 18,055.57 | 61,357.26 |
| 98 | 76,067.82 | 1,602,620.81 | 17,490.89 | 58,576.93 | 16,026.21 | 100.00 | 17,490.89 | 58,576.93 |
| 99 | 72,857.80 | 1,529,763.00 | 16,943.88 | 55,913.92 | 15,297.63 | 100.00 | 16,943.88 | 55,913.92 |
| 100 | 69,777.48 | 1,459,985.53 | 16,413.97 | 53,363.51 | 14,599.86 | 100.00 | 16,413.97 | 53,363.51 |
| 101 | 66,821.76 | 1,393,163.77 | 15,900.63 | 50,921.13 | 13,931.64 | 100.00 | 15,900.63 | 50,921.13 |
| 102 | 63,985.75 | 1,329,178.01 | 15,403.35 | 48,582.40 | 13,291.78 | 100.00 | 15,403.35 | 48,582.40 |
| 103 | 61,264.75 | 1,267,913.26 | 14,921.62 | 46,343.13 | 12,679.13 | 100.00 | 14,921.62 | 46,343.13 |
| 104 | 58,654.24 | 1,209,259.02 | 14,454.96 | 44,199.28 | 12,092.59 | 100.00 | 14,454.96 | 44,199.28 |
| 105 | 56,149.85 | 1,153,109.17 | 14,002.89 | 42,146.96 | 11,531.09 | 100.00 | 14,002.89 | 42,146.96 |
| 106 | 53,747.42 | 1,099,361.76 | 13,564.96 | 40,182.45 | 10,993.62 | 100.00 | 13,564.96 | 40,182.45 |
| 107 | 51,442.91 | 1,047,918.85 | 13,140.73 | 38,302.18 | 10,479.19 | 100.00 | 13,140.73 | 38,302.18 |
| 108 | 49,232.46 | 998,686.39 | 12,729.76 | 36,502.70 | 9,986.86 | 100.00 | 12,729.76 | 36,502.70 |
| 109 | 47,112.35 | 951,574.04 | 12,331.65 | 34,780.71 | 9,515.74 | 100.00 | 12,331.65 | 34,780.71 |
| 110 | 45,079.02 | 906,495.02 | 11,945.98 | 33,133.04 | 9,064.95 | 100.00 | 11,945.98 | 33,133.04 |

FROM FIG. 7 CONT. 5 →

| | | |
|---|---|---|
| 150,109.64 | 3,311,272.21 | |
| 143,939.09 | 3,167,333.11 | |
| 138,013.58 | 3,029,319.54 | |
| 132,323.59 | 2,896,995.95 | |
| 126,859.99 | 2,770,135.96 | |
| 121,613.99 | 2,648,521.97 | |
| 116,577.14 | 2,531,944.83 | |
| 111,741.31 | 2,420,203.52 | |
| 107,098.68 | 2,313,104.84 | |
| 102,641.72 | 2,210,463.12 | |
| 98,363.20 | 2,112,099.92 | |
| 94,256.17 | 2,017,843.75 | |
| 90,313.93 | 1,927,529.83 | |
| 86,530.04 | 1,840,999.78 | |
| 82,898.33 | 1,758,101.45 | |
| 79,412.83 | 1,678,688.63 | |
| 76,067.82 | 1,602,620.81 | |
| 72,857.80 | 1,529,763.00 | |
| 69,777.48 | 1,459,985.53 | |
| 66,821.76 | 1,393,163.77 | |
| 63,985.75 | 1,329,178.01 | |
| 61,264.75 | 1,267,913.26 | |
| 58,654.24 | 1,209,259.02 | |
| 56,149.85 | 1,153,109.17 | |
| 53,747.42 | 1,099,361.76 | |
| 51,442.91 | 1,047,918.85 | |
| 49,232.46 | 998,686.39 | |
| 47,112.35 | 951,574.04 | |
| 45,079.02 | 906,495.02 | |

TO FIG. 7 CONT. 9 →

Middle highlighted column:
112,582.22
107,954.33
103,510.19
132,323.59
126,859.99
121,613.99
116,577.14
111,741.31
107,098.68
102,641.72
98,363.20
94,256.17
90,313.92
86,530.04
82,898.33
79,412.83
76,067.82
72,857.80
69,777.48
66,821.76
63,985.75
61,264.75
58,654.24
56,149.85
53,747.41
51,442.91
49,232.46
47,112.36
45,079.02

FROM FIG. 7 CONT. 6 ↓

| | | |
|---|---|---|
| 33,112.72 | 150,109.64 | 3,311,272.21 |
| 31,673.33 | 143,939.09 | 3,167,333.11 |
| 30,293.20 | 138,013.58 | 3,029,319.54 |
| 28,969.96 | 132,323.59 | 2,896,995.95 |
| 27,701.36 | 126,859.99 | 2,770,135.96 |
| 26,485.22 | 121,613.99 | 2,648,521.97 |
| 25,319.45 | 116,577.14 | 2,531,944.83 |
| 24,202.04 | 111,741.31 | 2,420,203.52 |
| 23,131.05 | 107,098.68 | 2,313,104.84 |
| 22,104.63 | 102,641.72 | 2,210,463.12 |
| 21,121.00 | 98,363.20 | 2,112,099.92 |
| 20,178.44 | 94,256.17 | 2,017,843.75 |
| 19,275.30 | 90,313.93 | 1,927,529.83 |
| 18,410.00 | 86,530.04 | 1,840,999.78 |
| 17,581.01 | 82,898.33 | 1,758,101.45 |
| 16,786.89 | 79,412.83 | 1,678,688.63 |
| 16,026.21 | 76,067.82 | 1,602,620.81 |
| 15,297.63 | 72,857.80 | 1,529,763.00 |
| 14,599.86 | 69,777.48 | 1,459,985.53 |
| 13,931.64 | 66,821.76 | 1,393,163.77 |
| 13,291.78 | 63,985.75 | 1,329,178.01 |
| 12,679.13 | 61,264.75 | 1,267,913.26 |
| 12,092.59 | 58,654.24 | 1,209,259.02 |
| 11,531.09 | 56,149.85 | 1,153,109.17 |
| 10,993.62 | 53,747.42 | 1,099,361.76 |
| 10,479.19 | 51,442.91 | 1,047,918.85 |
| 9,986.86 | 49,232.46 | 998,686.39 |
| 9,515.74 | 47,112.35 | 951,574.04 |
| 9,064.95 | 45,079.02 | 906,495.02 |

| | | | | | |
|---|---|---|---|---|---|
| 111 | 43,129.02 | 863,366.00 | 31,556.64 | 11,572.38 | 8,633.66 | 100.00 | 11,572.38 | 31,556.64 |
| 112 | 41,259.06 | 822,106.94 | 30,048.59 | 11,210.46 | 8,221.07 | 100.00 | 11,210.46 | 30,048.59 |
| 113 | 39,465.95 | 782,640.99 | 28,606.08 | 10,859.86 | 7,826.41 | 100.00 | 10,859.86 | 28,606.08 |
| 114 | 37,746.65 | 744,894.34 | 27,226.42 | 10,520.23 | 7,448.94 | 100.00 | 10,520.23 | 27,226.42 |
| 115 | 36,098.22 | 708,796.12 | 25,907.00 | 10,191.22 | 7,087.96 | 100.00 | 10,191.22 | 25,907.00 |
| 116 | 34,517.84 | 674,278.28 | 24,645.35 | 9,872.49 | 6,742.78 | 100.00 | 9,872.49 | 24,645.35 |
| 117 | 33,002.81 | 641,275.47 | 23,439.07 | 9,563.74 | 6,412.75 | 100.00 | 9,563.74 | 23,439.07 |
| 118 | 31,550.52 | 609,724.95 | 22,285.88 | 9,264.64 | 6,097.25 | 100.00 | 9,264.64 | 22,285.88 |
| 119 | 30,158.46 | 579,566.48 | 21,183.57 | 8,974.90 | 5,795.66 | 100.00 | 8,974.90 | 21,183.57 |
| 120 | 28,824.23 | 550,742.25 | 20,130.02 | 8,694.21 | 5,507.42 | 100.00 | 8,694.21 | 20,130.02 |
| 121 | 27,545.52 | 523,196.73 | 19,123.21 | 8,422.31 | 5,231.97 | 100.00 | 8,422.31 | 19,123.21 |
| 122 | 26,320.10 | 496,876.63 | 18,161.19 | 8,158.90 | 4,968.77 | 100.00 | 8,158.90 | 18,161.19 |
| 123 | 25,145.84 | 471,730.80 | 17,242.10 | 7,903.74 | 4,717.31 | 100.00 | 7,903.74 | 17,242.10 |
| 124 | 24,020.68 | 447,710.12 | 16,364.12 | 7,656.56 | 4,477.10 | 100.00 | 7,656.56 | 16,364.12 |
| 125 | 22,942.66 | 424,767.46 | 15,525.55 | 7,417.10 | 4,247.67 | 100.00 | 7,417.10 | 15,525.55 |
| 126 | 21,909.87 | 402,857.59 | 14,724.73 | 7,185.14 | 4,028.58 | 100.00 | 7,185.14 | 14,724.73 |
| 127 | 20,920.50 | 381,937.09 | 13,960.07 | 6,960.43 | 3,819.37 | 100.00 | 6,960.43 | 13,960.07 |
| 128 | 19,972.80 | 361,964.29 | 13,230.05 | 6,742.75 | 3,619.64 | 100.00 | 6,742.75 | 13,230.05 |
| 129 | 19,065.08 | 342,899.21 | 12,533.21 | 6,531.87 | 3,428.99 | 100.00 | 6,531.87 | 12,533.21 |
| 130 | 18,195.74 | 324,703.47 | 11,868.14 | 6,327.59 | 3,247.03 | 100.00 | 6,327.59 | 11,868.14 |
| 131 | 17,363.21 | 307,340.27 | 11,233.51 | 6,129.70 | 3,073.40 | 100.00 | 6,129.70 | 11,233.51 |
| 132 | 16,566.01 | 290,774.26 | 10,628.01 | 5,938.00 | 2,907.74 | 100.00 | 5,938.00 | 10,628.01 |
| 133 | 15,802.70 | 274,971.56 | 10,050.41 | 5,752.29 | 2,749.72 | 100.00 | 5,752.29 | 10,050.41 |
| 134 | 15,071.91 | 259,899.65 | 9,499.52 | 5,572.39 | 2,599.00 | 100.00 | 5,572.39 | 9,499.52 |
| 135 | 14,372.32 | 245,527.33 | 8,974.20 | 5,398.12 | 2,455.27 | 100.00 | 5,398.12 | 8,974.20 |
| 136 | 13,702.66 | 231,824.67 | 8,473.36 | 5,229.30 | 2,318.25 | 100.00 | 5,229.30 | 8,473.36 |
| 137 | 13,061.70 | 218,762.98 | 7,995.94 | 5,065.76 | 2,187.63 | 100.00 | 5,065.76 | 7,995.94 |
| 138 | 12,448.28 | 206,314.70 | 7,540.95 | 4,907.33 | 2,063.15 | 100.00 | 4,907.33 | 7,540.95 |
| 139 | 11,861.27 | 194,453.43 | 7,107.41 | 4,753.86 | 1,944.53 | 100.00 | 4,753.86 | 7,107.41 |

*FIG. 7 CONT. 8*

← FROM FIG. 7 CONT. 7

| | | |
|---:|---:|---:|
| | 43,129.02 | 863,366.00 |
| | 41,259.06 | 822,106.94 |
| | 39,465.95 | 782,640.99 |
| | 37,746.65 | 744,894.34 |
| | 36,098.22 | 708,796.12 |
| | 34,517.84 | 674,278.28 |
| | 33,002.81 | 641,275.47 |
| | 31,550.52 | 609,724.95 |
| | 30,158.46 | 579,566.48 |
| | 28,824.23 | 550,742.25 |
| | 27,545.52 | 523,196.73 |
| | 26,320.10 | 496,876.63 |
| | 25,145.84 | 471,730.80 |
| | 24,020.68 | 447,710.12 |
| | 22,942.66 | 424,767.46 |
| | 21,909.87 | 402,857.59 |
| | 20,920.50 | 381,937.09 |
| | 19,972.80 | 361,964.29 |
| | 19,065.08 | 342,899.21 |
| | 18,195.74 | 324,703.47 |
| | 17,363.21 | 307,340.27 |
| | 16,566.01 | 290,774.26 |
| | 15,802.70 | 274,971.56 |
| | 15,071.91 | 259,899.65 |
| | 14,372.32 | 245,527.33 |
| | 13,702.66 | 231,824.67 |
| | 13,061.70 | 218,762.98 |
| | 12,448.28 | 206,314.70 |
| | 11,861.27 | 194,453.43 |

← FROM FIG. 7 CONT. 8

| | | |
|---:|---:|---:|
| 8,633.66 | 43,129.02 | 863,366.00 |
| 8,221.07 | 41,259.06 | 822,106.94 |
| 7,826.41 | 39,465.95 | 782,640.99 |
| 7,448.94 | 37,746.65 | 744,894.34 |
| 7,087.96 | 36,098.22 | 708,796.12 |
| 6,742.78 | 34,517.84 | 674,278.28 |
| 6,412.75 | 33,002.81 | 641,275.47 |
| 6,097.25 | 31,550.52 | 609,724.95 |
| 5,795.66 | 30,158.46 | 579,566.48 |
| 5,507.42 | 28,824.23 | 550,742.25 |
| 5,231.97 | 27,545.52 | 523,196.73 |
| 4,968.77 | 26,320.10 | 496,876.63 |
| 4,717.31 | 25,145.84 | 471,730.80 |
| 4,477.10 | 24,020.68 | 447,710.12 |
| 4,247.67 | 22,942.66 | 424,767.46 |
| 4,028.58 | 21,909.87 | 402,857.59 |
| 3,819.37 | 20,920.50 | 381,937.09 |
| 3,619.64 | 19,972.80 | 361,964.29 |
| 3,428.99 | 19,065.08 | 342,899.21 |
| 3,247.03 | 18,195.74 | 324,703.47 |
| 3,073.40 | 17,363.21 | 307,340.27 |
| 2,907.74 | 16,566.01 | 290,774.26 |
| 2,749.72 | 15,802.70 | 274,971.56 |
| 2,599.00 | 15,071.91 | 259,899.65 |
| 2,455.27 | 14,372.32 | 245,527.33 |
| 2,318.25 | 13,702.66 | 231,824.67 |
| 2,187.63 | 13,061.70 | 218,762.98 |
| 2,063.15 | 12,448.28 | 206,314.70 |
| 1,944.53 | 11,861.27 | 194,453.43 |

| | | | | | | |
|---|---|---|---|---|---|---|
| 140 | 11,299.59 | 183,153.85 | 4,605.18 | 6,694.40 | 1,831.54 | 4,605.18 | 6,694.40 |
| 141 | 10,762.20 | 172,391.65 | 4,461.16 | 6,301.04 | 1,723.92 | 4,461.16 | 6,301.04 |
| 142 | 10,248.10 | 162,143.55 | 4,321.64 | 5,926.46 | 1,621.44 | 4,321.64 | 5,926.46 |
| 143 | 9,756.34 | 152,387.21 | 4,186.48 | 5,569.86 | 1,523.87 | 4,186.48 | 5,569.86 |
| 144 | 9,286.00 | 143,101.20 | 4,055.55 | 5,230.45 | 1,431.01 | 4,055.55 | 5,230.45 |
| 145 | 8,836.20 | 134,265.00 | 3,928.72 | 4,907.48 | 1,342.65 | 3,928.72 | 4,907.48 |
| 146 | 8,406.08 | 125,858.92 | 3,805.85 | 4,600.23 | 1,258.59 | 3,805.85 | 4,600.23 |
| 147 | 7,994.84 | 117,864.08 | 3,686.83 | 4,308.02 | 1,178.64 | 3,686.83 | 4,308.02 |
| 148 | 7,601.69 | 110,262.38 | 3,571.52 | 4,030.17 | 1,102.62 | 3,571.52 | 4,030.17 |
| 149 | 7,225.88 | 103,036.50 | 3,459.83 | 3,766.06 | 1,030.37 | 3,459.83 | 3,766.06 |
| 150 | 6,866.70 | 96,169.80 | 3,351.62 | 3,515.07 | 961.70 | 3,351.62 | 3,515.07 |
| 151 | 6,523.44 | 89,646.36 | 3,246.80 | 3,276.64 | 896.46 | 3,246.80 | 3,276.64 |
| 152 | 6,195.45 | 83,450.91 | 3,145.26 | 3,050.19 | 834.51 | 3,145.26 | 3,050.19 |
| 153 | 5,882.09 | 77,568.82 | 3,046.90 | 2,835.20 | 775.69 | 3,046.90 | 2,835.20 |
| 154 | 5,582.75 | 71,986.07 | 2,951.61 | 2,631.14 | 719.86 | 2,951.61 | 2,631.14 |
| 155 | 5,296.84 | 66,689.23 | 2,859.30 | 2,437.54 | 666.89 | 2,859.30 | 2,437.54 |
| 156 | 5,023.79 | 61,665.44 | 2,769.87 | 2,253.92 | 616.65 | 2,769.87 | 2,253.92 |
| 157 | 4,763.07 | 56,902.37 | 2,683.25 | 2,079.82 | 569.02 | 2,683.25 | 2,079.82 |
| 158 | 4,514.16 | 52,388.21 | 2,599.33 | 1,914.83 | 523.88 | 2,599.33 | 1,914.83 |
| 159 | 4,276.56 | 48,111.66 | 2,518.04 | 1,758.52 | 481.12 | 2,518.04 | 1,758.52 |
| 160 | 4,049.78 | 44,061.88 | 2,439.29 | 1,610.49 | 440.62 | 2,439.29 | 1,610.49 |
| 161 | 3,833.38 | 40,228.49 | 2,363.00 | 1,470.38 | 402.28 | 2,363.00 | 1,470.38 |
| 162 | 3,626.92 | 36,601.58 | 2,289.10 | 1,337.81 | 366.02 | 2,289.10 | 1,337.81 |
| 163 | 3,429.96 | 33,171.62 | 2,217.51 | 1,212.45 | 331.72 | 2,217.51 | 1,212.45 |
| 164 | 3,242.11 | 29,929.51 | 2,148.16 | 1,093.94 | 299.30 | 2,148.16 | 1,093.94 |
| 165 | 3,062.97 | 26,866.54 | 2,080.98 | 981.99 | 268.67 | 2,080.98 | 981.99 |
| 166 | 2,892.18 | 23,974.37 | 2,015.90 | 876.28 | 239.74 | 2,015.90 | 876.28 |
| 167 | 2,729.37 | 21,245.00 | 1,952.85 | 776.52 | 212.45 | 1,952.85 | 776.52 |
| 168 | 2,574.21 | 18,670.79 | 1,891.78 | 682.43 | 186.71 | 1,891.78 | 682.43 |

(100.00 in column 6 for all rows)

← FROM FIG.7 CONT. 9

| | |
|---|---|
| 183,153.85 | 11,299.59 |
| 172,391.65 | 10,762.20 |
| 162,143.55 | 10,248.10 |
| 152,387.21 | 9,756.34 |
| 143,101.20 | 9,286.00 |
| 134,265.00 | 8,836.20 |
| 125,858.92 | 8,406.08 |
| 117,864.08 | 7,994.84 |
| 110,262.38 | 7,601.69 |
| 103,036.50 | 7,225.88 |
| 96,169.80 | 6,866.70 |
| 89,646.36 | 6,523.44 |
| 83,450.91 | 6,195.45 |
| 77,568.82 | 5,882.09 |
| 71,986.07 | 5,582.75 |
| 66,689.23 | 5,296.84 |
| 61,665.44 | 5,023.79 |
| 56,902.37 | 4,763.07 |
| 52,388.21 | 4,514.16 |
| 48,111.66 | 4,276.56 |
| 44,061.88 | 4,049.78 |
| 40,228.49 | 3,833.38 |
| 36,601.58 | 3,626.92 |
| 33,171.62 | 3,429.96 |
| 29,929.51 | 3,242.11 |
| 26,866.54 | 3,062.97 |
| 23,974.37 | 2,892.18 |
| 21,245.00 | 2,729.37 |
| 18,670.79 | 2,574.21 |

TO FIG.7 CONT.13 →

| |
|---|
| 11,299.58 |
| 10,762.20 |
| 10,248.10 |
| 9,756.34 |
| 9,286.00 |
| 8,836.20 |
| 8,406.08 |
| 7,994.85 |
| 7,601.69 |
| 7,225.89 |
| 6,866.69 |
| 6,523.44 |
| 6,195.45 |
| 5,882.10 |
| 5,582.75 |
| 5,296.84 |
| 5,023.79 |
| 4,763.07 |
| 4,514.16 |
| 4,276.56 |
| 4,049.78 |
| 3,833.38 |
| 3,626.91 |
| 3,429.96 |
| 3,242.10 |
| 3,062.97 |
| 2,892.18 |
| 2,729.37 |
| 2,574.21 |

← FROM FIG. 7 CONT. 10

| | |
|---|---|
| 1,831.54 | 11,299.59 |
| 1,723.92 | 10,762.20 |
| 1,621.44 | 10,248.10 |
| 1,523.87 | 9,756.34 |
| 1,431.01 | 9,286.00 |
| 1,342.65 | 8,836.20 |
| 1,258.59 | 8,406.08 |
| 1,178.64 | 7,994.84 |
| 1,102.62 | 7,601.69 |
| 1,030.37 | 7,225.88 |
| 961.70 | 6,866.70 |
| 896.46 | 6,523.44 |
| 834.51 | 6,195.45 |
| 775.69 | 5,882.09 |
| 719.86 | 5,582.75 |
| 666.89 | 5,296.84 |
| 616.65 | 5,023.79 |
| 569.02 | 4,763.07 |
| 523.88 | 4,514.16 |
| 481.12 | 4,276.56 |
| 440.62 | 4,049.78 |
| 402.28 | 3,833.38 |
| 366.02 | 3,626.92 |
| 331.72 | 3,429.96 |
| 299.30 | 3,242.11 |
| 268.67 | 3,062.97 |
| 239.74 | 2,892.18 |
| 212.45 | 2,729.37 |
| 186.71 | 2,574.21 |

| | | | | | TO FIG. 7 CONT. 13 → |
|---|---|---|---|---|---|
| FROM FIG. 7 CONT. 10 | 169 | 2,426.36 | 16,244.43 | 1,832.61 | 593.75 | 162.44 | 100.00 | 1,832.61 | 593.75 |
| | 170 | 2,285.51 | 13,958.92 | 1,775.30 | 510.21 | 139.59 | 100.00 | 1,775.30 | 510.21 |
| | 171 | 2,151.35 | 11,807.57 | 1,719.78 | 431.57 | 118.08 | 100.00 | 1,719.78 | 431.57 |
| | 172 | 2,023.60 | 9,783.96 | 1,665.99 | 357.61 | 97.84 | 100.00 | 1,665.99 | 357.61 |
| | 173 | 1,901.98 | 7,881.98 | 1,613.89 | 288.09 | 78.82 | 100.00 | 1,613.89 | 288.09 |
| | 174 | 1,786.22 | 6,095.76 | 1,563.42 | 222.80 | 60.96 | 100.00 | 1,563.42 | 222.80 |
| | 175 | 1,676.07 | 4,419.69 | 1,514.52 | 161.54 | 44.20 | 100.00 | 1,514.52 | 161.54 |
| | 176 | 1,571.27 | 2,848.42 | 1,467.16 | 104.11 | 28.48 | 100.00 | 1,467.16 | 104.11 |
| | 177 | 1,471.60 | 1,376.82 | 1,421.27 | 50.32 | 13.77 | 100.00 | 1,421.27 | 50.32 |
| | 178 | 1,376.82 | 0 | 1,376.82 | 0 | 0.00 | 100.00 | 1,376.82 | 0.00 |

*FIG. 7 CONT. 12*

| | | FROM FIG. 7 CONT. 11 ↓ |
|---|---|---|
| | 2,426.36 | 16,244.43 |
| | 2,285.51 | 13,958.92 |
| | 2,151.35 | 11,807.57 |
| | 2,023.60 | 9,783.96 |
| | 1,901.98 | 7,881.98 |
| | 1,786.22 | 6,095.76 |
| | 1,676.07 | 4,419.69 |
| | 1,571.27 | 2,848.42 |
| | 1,471.60 | 1,376.82 |
| | 1,376.82 | - |

| | |
|---|---|
| 2,426.36 | |
| 2,285.51 | |
| 2,151.35 | |
| 2,023.60 | |
| 1,901.98 | |
| 1,786.22 | |
| 1,676.06 | |
| 1,571.27 | |
| 1,471.59 | |
| 1,376.82 | |

| FROM FIG. 7 CONT. 12 | | |
|---|---|---|
| 162.44 | 2,426.36 | 16,244.43 |
| 139.59 | 2,285.51 | 13,958.92 |
| 118.08 | 2,151.35 | 11,807.57 |
| 97.84 | 2,023.60 | 9,783.96 |
| 78.82 | 1,901.98 | 7,881.98 |
| 60.96 | 1,786.22 | 6,095.76 |
| 44.20 | 1,676.07 | 4,419.69 |
| 28.48 | 1,571.27 | 2,848.42 |
| 13.77 | 1,471.60 | 1,376.82 |
| 0.00 | 1,376.82 | - |

| Non-Capped NAS/AS | | | |
|---|---|---|---|
| Scenario | Extension (5 CPR) | Base (8 CPR) | Call (35 CPR) |
| NAS WAL | 4.02 | 3.69 | 2.98 |
| NAS WAL % change | 8% | 0% | -24% |
| AS WAL | 7.38 | 6.35 | 1.84 |
| AS WAL % change | 14% | 0% | -245% |

| Capped NAS/AS | | | |
|---|---|---|---|
| Scenario | Extension (5 CPR) | Base (8 CPR) | Call (35 CPR) |
| NAS WAL | 4.02 | 3.69 | 4.31 |
| NAS WAL % change | 8% | 0% | 14% |
| AS WAL | 7.38 | 6.35 | 1.40 |
| AS WAL % change | 14% | 0% | -355% |

| | |
|---|---|
| SMM | 1.0000000000 |
| CPR | 11.3615128284 |
| | |
| CPR | 8.0000000000 |
| SMM | 0.6924382628 |

FIGURE 9

| | | N5cNC 4.0y | | N5c 4.0y | | C5c 6.5y | |
|---|---|---|---|---|---|---|---|
| | | NC NAS | NC AS | Capped NAS | Capped AS | Capped Collateral | |
| 0-Jan-00 | 0 | 100 | 100 | 100 | 100 | 100 | |
| 15-Apr-05 | 1 | 100 | 87 | 87 | 87 | 91 | |
| 15-Apr-06 | 2 | 91 | 78 | 78 | 78 | 82 | |
| 15-Apr-07 | 3 | 74 | 73 | 73 | 73 | 73 | |
| 15-Apr-08 | 4 | 50 | 70 | 70 | 70 | 65 | |
| 15-Apr-09 | 5 | 27 | 68 | 68 | 68 | 57 | |
| 15-Apr-10 | 6 | 5 | 65 | 65 | 65 | 50 | |
| 15-Apr-11 | 7 | 0 | 58 | 58 | 58 | 43 | |
| 15-Apr-12 | 8 | 0 | 49 | 49 | 49 | 37 | |
| 15-Apr-13 | 9 | 0 | 41 | 41 | 41 | 30 | |
| 15-Apr-14 | 10 | 0 | 33 | 33 | 33 | 24 | |
| 15-Apr-15 | 11 | 0 | 25 | 25 | 25 | 19 | |
| 15-Apr-16 | 12 | 0 | 18 | 18 | 18 | 14 | |
| 15-Apr-17 | 13 | 0 | 11 | 11 | 11 | 9 | |
| 15-Apr-18 | 14 | 0 | 5 | 5 | 5 | 4 | |
| 15-Apr-19 | 15 | 0 | 0 | 0 | 0 | 0 | |
| WAL | | 4.02318 | 7.384 | 4.02318 | 7.38416 | 6.54392 | |
| Principal Window | | May05-Jul10 | May04-Feb19 | May05-Jul10 | May04-Feb19 | May04-Feb19 | |
| Prepay | | 5 CPR | 5 CPR | 5 CPR | 5 CPR | 5 CPR | |

| | | N9c 3.6y | | | | |
|---|---|---|---|---|---|---|
| | | NC NAS | NC AS | Capped NAS | Capped AS | Capped Collateral |
| 0-Jan-00 | | 100 | 100 | 100 | 100 | 100 |
| 15-Apr-05 | | 100 | 82 | 82 | 82 | 87 |
| 15-Apr-06 | | 88 | 70 | 88 | 70 | 75 |
| 15-Apr-07 | | 67 | 63 | 67 | 63 | 64 |
| 15-Apr-08 | | 38 | 60 | 39 | 60 | 55 |
| 15-Apr-09 | | 13 | 57 | 15 | 57 | 46 |
| 15-Apr-10 | | 0 | 52 | 0 | 52 | 39 |
| 15-Apr-11 | | 0 | 43 | 0 | 43 | 32 |
| 15-Apr-12 | | | 35 | 0 | 35 | 26 |
| 15-Apr-13 | | | 28 | 0 | 28 | 21 |
| 15-Apr-14 | | | 21 | 0 | 21 | 16 |
| 15-Apr-15 | | | 16 | 0 | 16 | 12 |
| 15-Apr-16 | | | 11 | 0 | 11 | 8 |
| 15-Apr-17 | | | 7 | 0 | 7 | 5 |
| 15-Apr-18 | | | 3 | 0 | 3 | 2 |
| 15-Apr-19 | | | 0 | 0 | 0 | 0 |
| WAL | | 3.6054 | 6.04724 | 3.6302 | 6.03899 | 5.43679 |
| Principal Window | | May05-Nov09 | May04-Feb19 | May05-Jan10 | May04-Feb19 | May04-Feb19 |
| Prepay | | 9 CPR | 9 CPR | 9 CPR | 9 CPR | 9 CPR |

| | | N35cNC 3.0y | | N35c 4.3y | | C35c 2.1y | |
|---|---|---|---|---|---|---|---|
| | | NC NAS | NC AS | Capped NAS | Capped AS | Capped Collateral | |
| 0-Jan-00 | | 100 | 100 | 100 | 100 | 100 | |
| 15-Apr-05 | | 100 | 49 | 100 | 49 | 62 | |
| 15-Apr-06 | | 76 | 26 | 77 | 25 | 38 | |
| 15-Apr-07 | | 47 | 16 | 63 | 10 | 23 | |
| 15-Apr-08 | | 19 | 13 | 54 | 1 | 14 | |
| 15-Apr-09 | | 2 | 11 | 34 | 0 | 9 | |
| 15-Apr-10 | | 0 | 7 | 21 | 0 | 5 | |
| 15-Apr-11 | | 0 | 4 | 12 | 0 | 3 | |
| 15-Apr-12 | | 0 | 2 | 7 | 0 | 2 | |
| 15-Apr-13 | | 0 | 1 | 4 | 0 | 1 | |
| 15-Apr-14 | | 0 | 1 | 2 | 0 | 1 | |
| 15-Apr-15 | | 0 | 0 | 1 | 0 | 0 | |
| 15-Apr-16 | | 0 | 0 | 1 | 0 | 0 | |
| 15-Apr-17 | | 0 | 0 | 0 | 0 | 0 | |
| 15-Apr-18 | | 0 | 0 | 0 | 0 | 0 | |
| 15-Apr-19 | | 0 | 0 | 0 | 0 | 0 | |
| WAL | | 2.97591 | 1.84152 | 4.31008 | 1.3968 | 2.12512 | |
| Principal Window | | May05-Jul09 | May04-Feb19 | May05-Feb19 | May04-Jun08 | May04-Feb19 | |
| Prepay | | 35 CPR | 35 CPR | 35 CPR | 35 CPR | 35 CPR | |

METHOD FOR ALLOCATING PRINCIPAL PAYMENTS UTILIZING CAPPED NON-ACCELERATED/ACCELERATED SECURITIES

This application claims priority from U.S. Provisional Application Ser. No. 60/513,223 filed Oct. 23, 2003. The entirety of that provisional application is incorporated herein by reference.

BACKGROUND

1. Field of the Invention

The present invention relates generally to financial instruments, and more particularly, relates to a specific allocation of principal payments for securities with structured cash flows, such as, but not limited to, structured mortgage-backed securities, securities based on account receivables, student loans or credit card receivables.

2. Related Art

In the mortgage market, consumers (or borrowers) purchasing a home usually borrow funds from a lender (e.g., a bank, finance company or the like, who are also called "originators" or "lenders"). As is well known in the relevant art(s), the legal document by which the mortgaged property is used to guarantee repayment of the loan is known as a mortgage (or mortgage loan).

In order to have funds to meet additional consumer demand for home mortgages, lenders generate and liberate capital by selling the mortgages they originate into the secondary market, keeping the supply of money for housing more widely available and ultimately lowering costs to borrowers.

The majority of mortgages sold into the secondary market are sold directly or indirectly to the Federal Home Loan Mortgage Corporation ("Freddie Mac") or the Federal National Mortgage Association ("Fannie Mae"), although some are sold to other market conduits. In order to generate funds to buy more mortgages, these secondary market entities create securities backed by the purchased mortgages. These securities, which in their most basic form, pass through the borrowers' payments to investors are referred to as "mortgage pass-through securities" or mortgage-backed securities ("MBS").

MBS serve only a segment of the mortgage-backed securities market. Other investors, including many institutional investors, purchase or hedge in securities backed by MBS, or securities that are resecuritized. In its simplest terms, a resecuritization means that a new security is created using another security as the underlying collateral; in much the same way that mortgages are the underlying collateral for MBS, MBS are often the collateral for another mortgage-related security. These resecuritizations may be combined (sometimes several times) into various structures that are layers removed from the original mortgages and even the MBS. Each security, however, is based directly or indirectly on the income stream of borrower mortgage payments.

These structured securities typically have complex rules for payment allocations to investors. An example of a structured transaction known by those in the relevant art(s) is a Real Estate Mortgage Investment Conduit ("REMIC"). A REMIC is comprised of multiple classes of mortgage-related securities in which cash flows from the underlying collateral are allocated to individual "classes" (sometimes called "bonds" or "tranches") with varying maturities and principal and interest payment priorities. REMICS are popular transactions within the mortgage investment industry because of their flexibility in structuring mortgage payment cash flows to suit specific investor risk and return thresholds related to these risks.

Investors in any mortgage-related security are exposed to a number of associated risks, including prepayment risk and reinvestment risk, in addition to the usual risks associated with investment in securities. An investor in a REMIC tranche may base its investment decision upon (i) maximizing static yield (i.e., the annual percentage rate of return earned on a security) without regard to reinvestment risk, or (ii) risk-adjusted returns (as described below).

As will be apparent to those skilled in the relevant art(s), the following discussion applies not only to mortgage-related securities, generally, but to other structured and asset-backed securities as well.

The weighted average life (or "WAL") of a security refers to the average number of years that the security is outstanding (i.e., until a investor receives its final payment on that security). The WAL of a particular class of an asset-backed security, such as a mortgage-related security, will depend primarily on the rate of principal payments—a combination of scheduled payments and unscheduled payments (or "prepayments")—on the underlying assets.

WAL variability of a mortgage-related security is driven primarily by prepayments. A prepayment on a mortgage occurs whenever a borrower exercises its option to prepay, partially or fully, a mortgage at any time. Prepayments, which result from voluntary or involuntary sales of homes, refinancings or any other unscheduled principal payments, are difficult to predict because borrower behavior is difficult to predict.

Prepayment risk is closely related to reinvestment risk. When prepayments occur and an investor's investment is returned as a result, the investor is exposed to reinvestment risk (i.e., the risk of investing funds at a lower rate of return and/or with a different risk profile). For example, in a declining interest rate environment, the returned funds likely will be reinvested at lower rates, reducing the investor's investment yield, assuming the investor wants to remain in investments with comparable risks. In fast prepayment environments, investors may fail to recover any premiums paid when they purchased their mortgage-related securities because their principal is returned at par value (i.e., face value or the amount that the issuer agrees to pay at the maturity date). For example, an investor may pay $103 for a security with a $100 principal amount, but if the security prepays, the investor will receive only $100 in principal.

The description of the following embodiments of the present invention focuses on principal payments, although most, but not all, mortgage-related securities have both an interest and principal payment component. The interest, however calculated for a particular class of securities, is generally calculated on the basis of the then-outstanding principal balance of the security, which is in turn based directly or indirectly on the then-outstanding balance of the underlying mortgages.

It is a challenge to structure cash flows from these underlying payments that efficiently fulfill investors' yield requirements, taking into consideration differing investor risk postures, or willingness to invest in cash flows with more or less WAL variability. Prevailing interest rates are the leading indicator for predicting prepayments. Predicting when a borrower may elect to exercise its option to prepay its mortgage obligation is an uncertainty at all times, however, and among other risks, manifests itself in two major risk scenarios.

Call risk is a specific risk typically associated with declining interest rates. When interest rates decline, the borrower may choose to exercise the right to prepay its mortgage, perhaps through refinancing, and take out a mortgage at a prevailing lower rate. In this scenario, the investor would prefer that the borrower not refinance or otherwise prepay the mortgage because the investor is getting a higher interest rate return than current market. Any full or partial prepayments by the borrower are passed through to the investor, who must then reinvest those funds, presumably at prevailing lower market rates.

On the other hand, extension risk typically exists when interest rates increase. The borrower may choose to pay the mortgage according to the original amortization schedule (and correspondingly lower rate) or repayment term (e.g., 30 years), effectively extending the full repayment of principal as long possible over the term of the loan. The borrower has no economic incentive to prepay early or refinance and borrow funds at higher rates. In contrast, the investor would prefer that the borrower prepay the mortgage early in this situation so that the funds could be reinvested at prevailing higher market rates. For an investor, this scenario creates a risk of extending the investment longer than anticipated, based on the predictions described above.

In the relevant art(s), certain structured securities (e.g., REMICs) are used to address investor call and extension risk. For example, REMICs distribute cash flows received from the underlying mortgages and mortgage-related securities through the various REMIC classes, designed to redistribute the risks along with the cash flows in accordance with investors' needs and risk tolerances. Each class within a REMIC has its own payment priority (which may shift under certain scenarios), which determines, to the extent possible, whether the WAL variability of a particular class will be more or less stable (or have more or less predictable risk).

Prior mortgage-related securities structures have attempted to address the above-described investment risks in structures designed to provide call and extension risk protection. For example, previous REMIC securities offerings have used generic non-accelerated security/accelerated security (NAS/AS) Classes in their structures. In those structures, the NAS Class usually received principal payment allocations more slowly than its underlying collateral in the early stages of the transaction's cash flow stream, with the percentage of payments allocated to the NAS Class increasing over time. Since payments on a NAS Class are linked to payments on one or more AS Classes, the AS Class(es), conversely, received a greater allocation of principal payments in the early periods. NAS and AS Classes redirected principal payments from and to each other at varying rates as a function of time only.

Prior structures using NAS/AS Classes, however, did not provide NAS Class investors with call risk protection during later payment periods or fast prepayment scenarios. In other words, NAS investors could receive a return of their investment earlier than anticipated if prepayments on the underlying mortgages accelerated.

Given the foregoing, what is needed is a method for allocating principal payments for mortgage-related securities that more effectively addresses the above-described risk scenarios with a more defined distribution of prepayment and reinvestment risks.

DESCRIPTION OF THE FIGURES

FIGS. 2-3 illustrate a 5% CPR scenario, according to one embodiment of the invention.

FIGS. 4-5 illustrate a 9% CPR scenario, according to one embodiment of the invention.

FIGS. 6-7 illustrate a 35% CPR scenario, according to one embodiment of the invention.

FIG. 8 illustrates weighted life average (WAL) comparisons between Non-Capped NAS/AS and Capped NAS/AS scenarios, according to one embodiment of the invention.

FIG. 9 illustrates the relative decrement sensitivity comparisons between the 5%, 9%, and 35% CPR scenarios.

BRIEF SUMMARY OF EMBODIMENTS OF THE INVENTION

Figure 1:
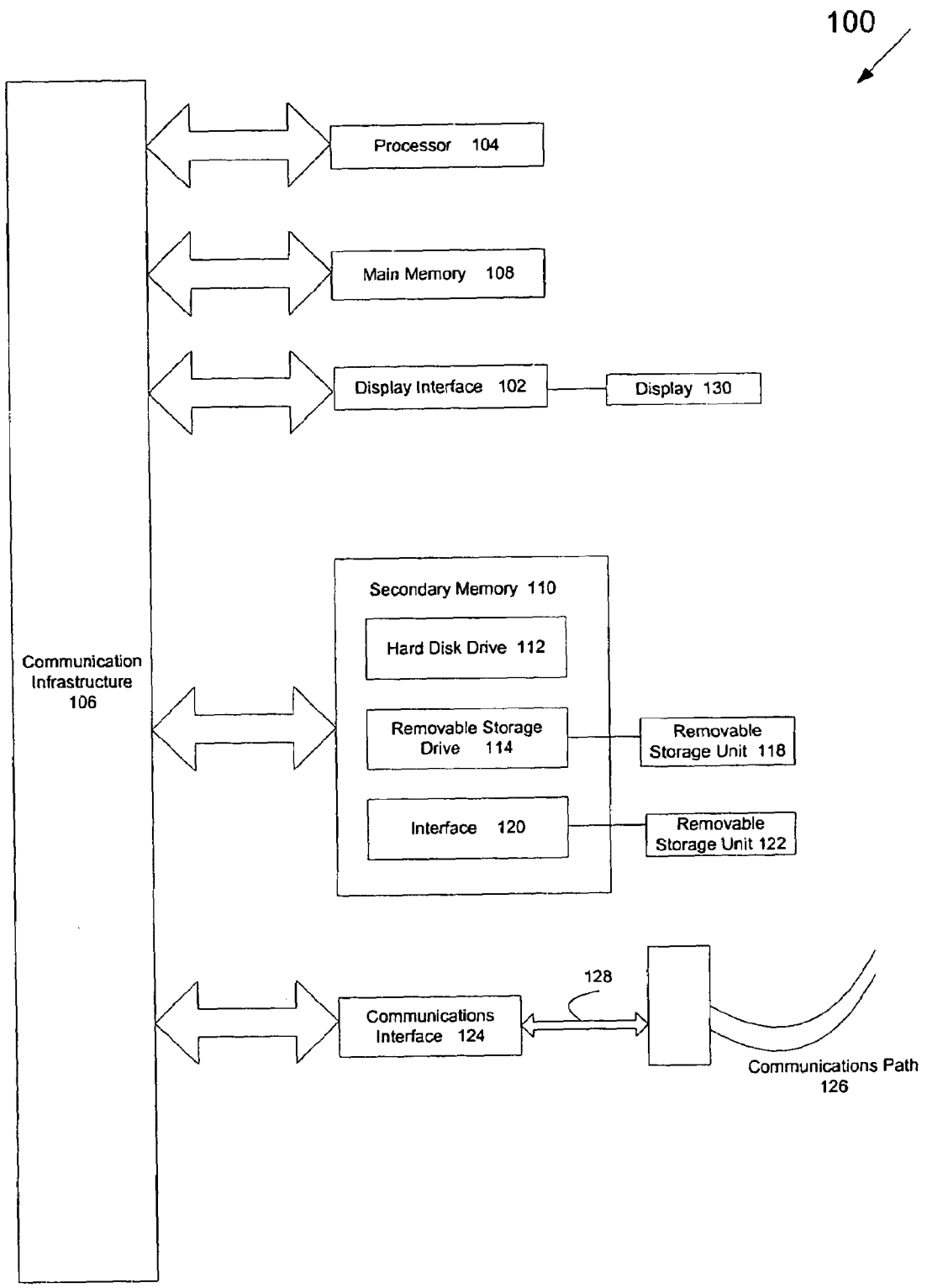
FIG. 1 illustrates a computer system 100, according to one embodiment of the invention.

The present invention is directed to a system and method for allocating principal payments for securities with structured cash flows.

In an embodiment, the present invention is directed to a method for allocating principal payments by creating Capped NAS/AS securities classes. Both scheduled and unscheduled principal prepayments are redirected, subject to a maximum percentage, or cap, as determined by formula. Embodiments of the present invention are described in terms of comparing the payment priority rules in previous transactions featuring Non-Capped NAS/AS Classes and the Capped NAS payment rule, as described in the example below. This is for convenience only and is not intended to limit the application of the present invention. In fact, after reading the following description, it will be apparent to one skilled in the relevant art(s) how to implement the following invention in alternative embodiments.

A Capped NAS Class, according to one embodiment of the present invention, is a class in a securities offering (e.g., a REMIC) representing part of a structure generally comprised of numerous classes having differing payment priorities. The Capped NAS Class embodies a customized payment rule that addresses a specific investor risk concern. More specifically, one embodiment of the present invention is an innovative Capped NAS payment rule, or cash flow allocation, used within a structure to redirect principal in such a way as to redistribute or mitigate call risk (i.e., the risk that an investor will receive a return of investment sooner than expected).

The Capped NAS payment rule, according to one embodiment of the present invention, is a novel payment priority rule that redistributes risks related to the borrower's prepayment option through prioritization of the cash flows among the NAS/AS Classes, allowing for the efficient creation of classes with more and less WAL stability to meet specific investor's needs. Thus, the Capped NAS payment rule creates the potential for improved arbitrage opportunities (i.e., purchasing securities for re-sale in order to profit from price discrepancies) by redistributing yield and risk.

BRIEF DESCRIPTION OF EMBODIMENTS OF THE INVENTION

Capped NAS Payment Rule

The following scenario, set forth in Table 1, illustrates the application of the Capped NAS payment rule. Assume a structured transaction comprised of numerous classes, including, for the sake of simplicity, one NAS and one AS Class. In months 1-12 the AS Class received 100% of the principal; in months 13-24, it received 75%; and so on. In other words, the AS Class first received more, and then less, of its "share" of the underlying collateral, while the NAS received 0%, 25%, and so on (less, and then more). This Non-Capped scenario is illustrated in Table 1 and the accompanying formula (I) below.

TABLE 1

| Month <= | Shift % of Principal to the NAS Class |
|---|---|
| 12 | 0% |
| 24 | 25% |
| 36 | 50% |
| 84 | 75% |
| 120 | 100% |

The "Non-Capped" NAS/AS payment rule applies formula (I):

$$\text{Principal Payment to the NAS Class} = \text{Shift \%} * \text{Principal available} \quad (1)$$

The Capped (or modified) NAS payment rule provides another control mechanism for risk distribution particularly during later payments within the structure when a larger percentage of principal is being directed toward the NAS. Because the Capped NAS payment rule imposes a cap upon the amount of principal distributed to the NAS class, it provides additional call risk protection for the NAS Class while maintaining its extension protection. Thus, in an embodiment of the invention, a Capped NAS/AS Class combination uses payment rule (2):

$$\text{Principal Payment to the NAS Class} = \text{Minimum of} \\ \{(\text{Multiplier } X\% * \text{Shift \%} * \text{Prepaid Principal available} + \text{Multiplier } Y\% * \text{Shift \%} * \text{Amortized Principal available}), (\text{Cap})\}; \quad (2)$$

Note: the multiplier X and Y may or may not be used to affect the relative percentages of prepaid versus amortized principal.

wherein:

$$\text{Cap} = Z\% * \text{Collateral Balance};$$

or, in an alternate embodiment:

$$\text{Cap} = Z\% * \text{Collateral Balance} * \text{Shift \%}.$$

In the above payment rule, Z is typically a small percentage ranging from 0.5% to 2.0% as determined by the structurer of the security. In later periods when the Shift percentage is greater than zero, after the lockout has expired, the Cap provides a limit to the maximum amount of principal that may be directed towards the NAS Class. In those periods when prepayments are large, the Cap will provide call risk protection to the NAS Class, and thus reinvestment risk protection to the Class investor, by distributing principal in excess of the Cap to the AS Class.

In periods of slow prepayments (generally periods of higher interest rates when it is desirable for an investor to have its principal returned) the Cap will not impede the amount of principal otherwise available for distribution to the NAS Class, as per the Shift percentage, since in these periods the principal available will likely be less than the Cap.

In this example, the NAS Class is entitled to receive an allocation of principal up to the priority amount before any principal received on the underlying assets is payable to the AS Classes. Each priority amount includes prescribed allocations of scheduled principal payments and prepayments on the underlying mortgages that vary over time.

As a result of these allocations, under many prepayment scenarios the WALs of the NAS Class should be more stable, and those of the AS Class less stable, than would be the case if they received principal payments in a strictly pro rata or sequential manner, or in a Non-Capped NAS/AS structure.

Example Embodiments

FIGS. 2-9 present several examples of embodiments of the present invention, which illustrate the relative WAL between a Capped NAS and a Non-Capped NAS cash flow stream under three prepayment speed assumptions. The three prepayment speeds used will represent a 5% CPR (Constant Prepayment Rate) scenario, a 9% CPR scenario, and a 35% CPR scenario. CPR is a standardized, industry measure used to calculate the percentage of outstanding principal that is likely to be prepaid over a 12-month period.

Structure Description. In the following examples, the payment rules for both the Capped NAS and the Non-Capped NAS are identical with the exception of the addition of the Capped NAS priority payment rule. Assume that both structures are collateralized with $100 million of mortgage pass-through certificates, which are structured into a $25 million NAS Class and a $75 million AS Class. Both structures distribute scheduled and unscheduled principal to the NAS Class according to the Shift Percentage. The Capped NAS structure, however, adds an additional condition, which in certain prepayment environments modifies the amount of total principal allocated to the NAS and AS Class in the capped structure. To further illustrate this rule, we will calculate the distribution amounts using 5%, 9% and 35% CPR.

Principal Shift % Amount. The Shift Percentage determines the amount of prepayments allocated between the Capped NAS and AS Classes. The shift percentages in this example for both the Capped NAS/AS structure and the Non-Capped NAS/AS structure are as follows: For each payment period 0 to period 12, 0% will be distributed to the NAS Class. For each payment period 13 to period 24, 25% will be distributed to the NAS Class. For each payment period 25 to payment period 36, 50% will be distributed to the NAS Class. For each payment period 37 to payment period 84, 75% will be distributed to the NAS Class. And for each payment period over 84, 100% of scheduled and unscheduled principal will be distributed to the NAS Class.

5% CPR Example

Figure 2:
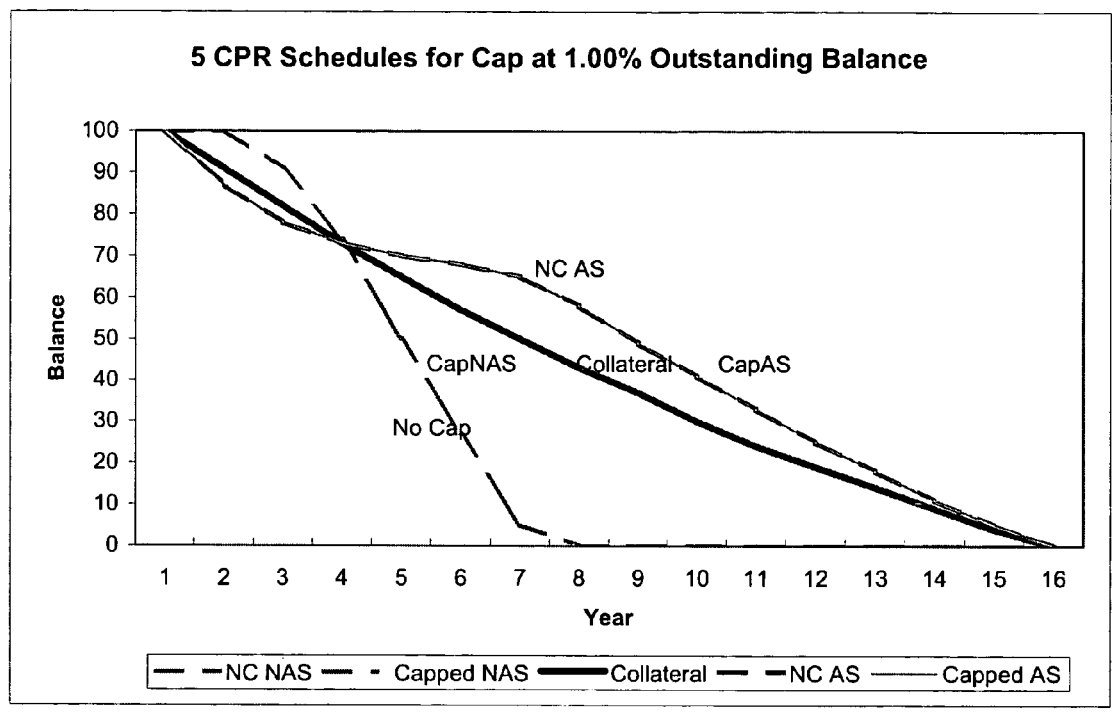
Figure 3:
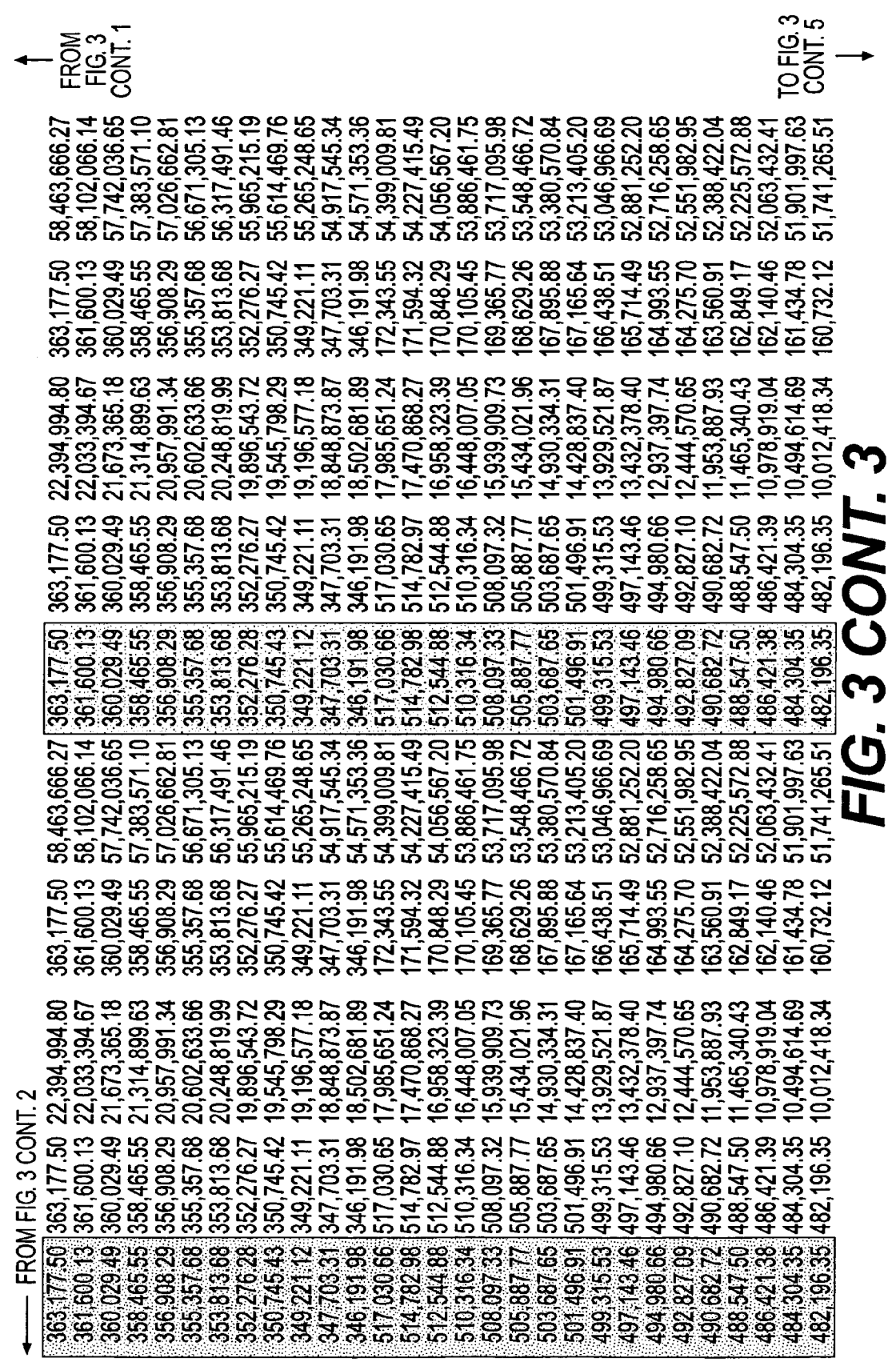

Non-Capped NAS Principal Distribution Amount. FIGS. 2-3 illustrate the example of a 5% CPR, according to one embodiment of the present invention. FIG. 2 illustrates an overview graph of the cash flow data of FIG. 3. FIG. 3 illustrates cash flow data associated with 5% CPR. As set forth in FIG. 3, in month one (1), there is $424,905.27 (line 1, column 4) of principal prepayments available and $381,356.69 (line 1, column 3) of scheduled principal available for distribution. The calculated amount of principal payable to the NAS Class will equal $424,905.27*0%+$381,356.69*0%=$0. In month 45, $286,899.79 (line 45, column 4) of unscheduled and $378,854.25 (line 45, column 3) of scheduled principal is available for distribution. Applying the shift percentage distribution formula results in ($286,899.7*75%)+($378,854.25*75%)=$499,315.53 payable to the NAS Class.

Capped NAS Total Principal Distribution Amount. As set forth in FIG. 3, in payment one (1) using 5% CPR, the collateral balance=$99,193,738.04 (line 1, column 2). The Cap Amount is 1%*$99,193,738.04=$991,937.38 (line 1, column 5). Therefore, the amount payable to the NAS Class in payment month 1 is the Minimum of ($0) or ($991,937.38)=$0. In payment month 45, the cap amount is 1%*$66,976,488.56=$669,764.89 (compare line 45, column 2 against column 5). In payment month 45, the amount payable to the NAS Class is the Minimum of $499,315.53 or $669,764.89=$499,315.53. As evidenced by this example, the distribution amounts for both the Capped NAS and Non-Capped NAS are identical using the 5 CPR assumption.

9% CPR Example

Figure 4:
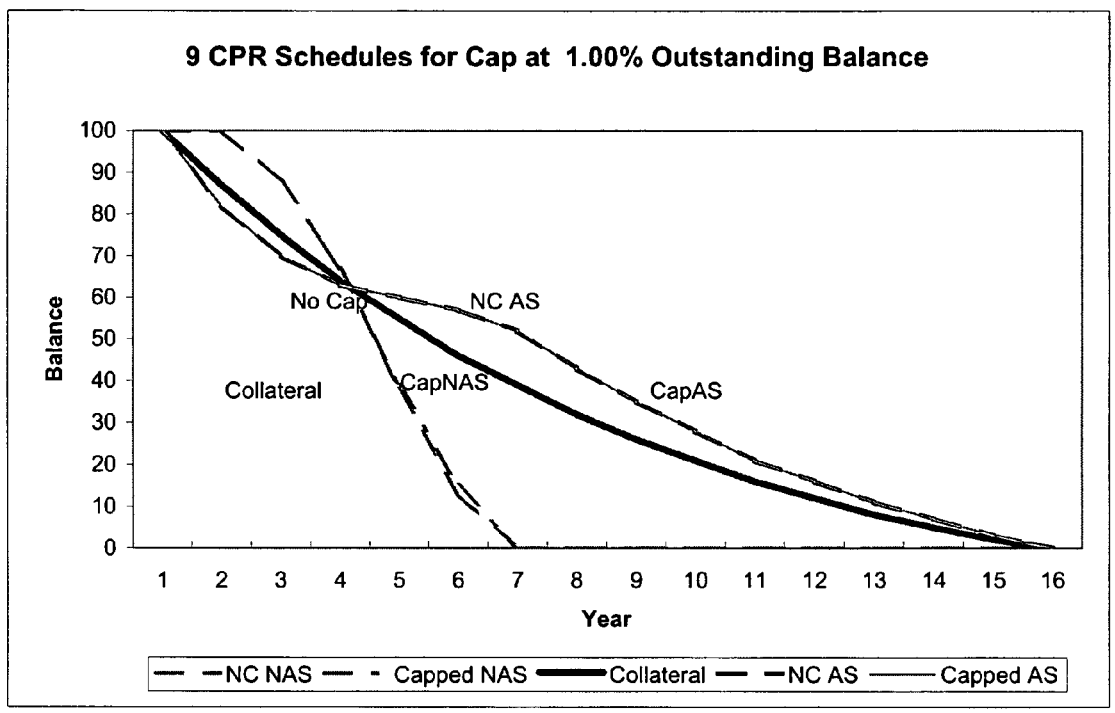
Figure 5:
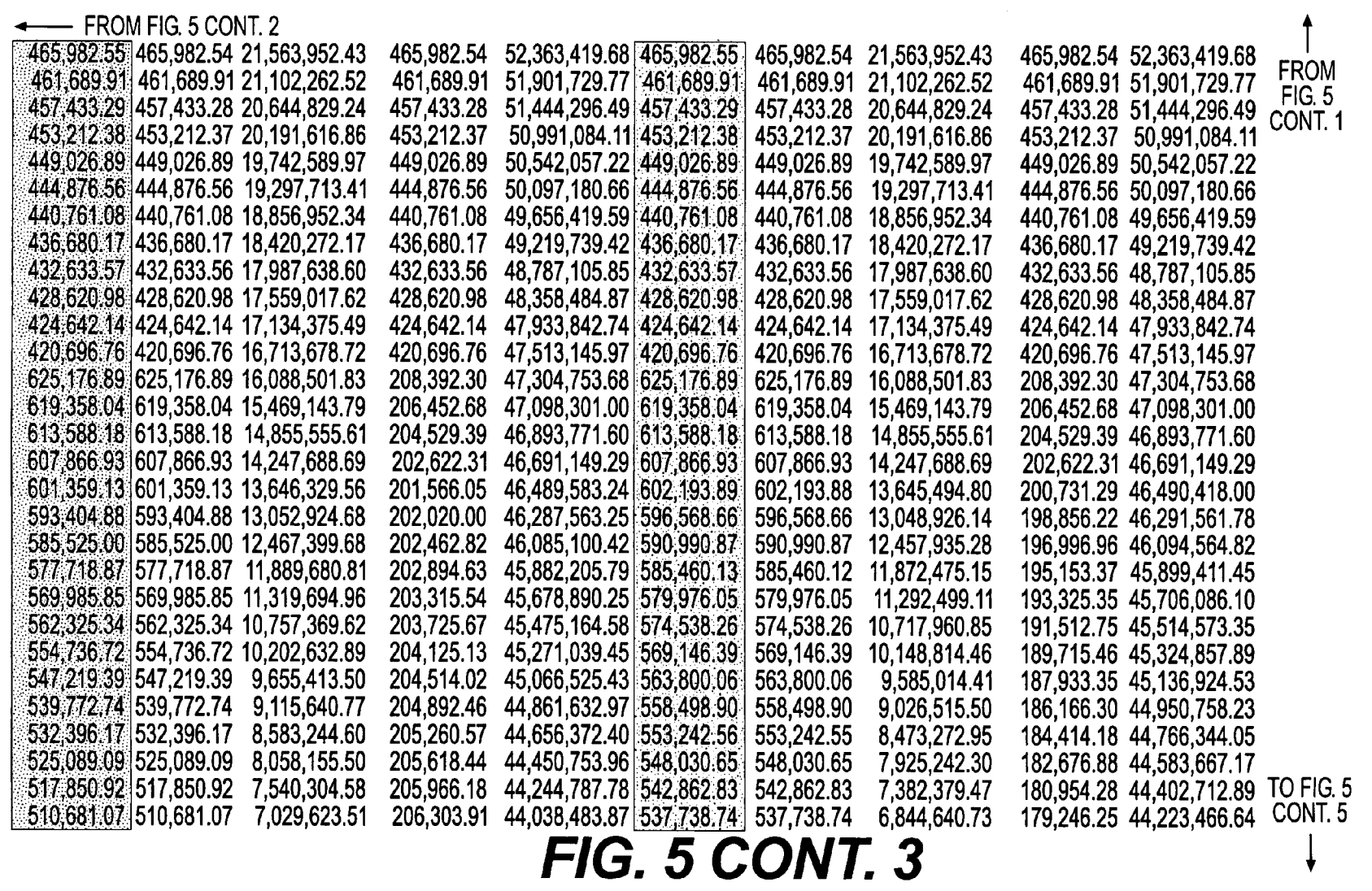
Figure 5:
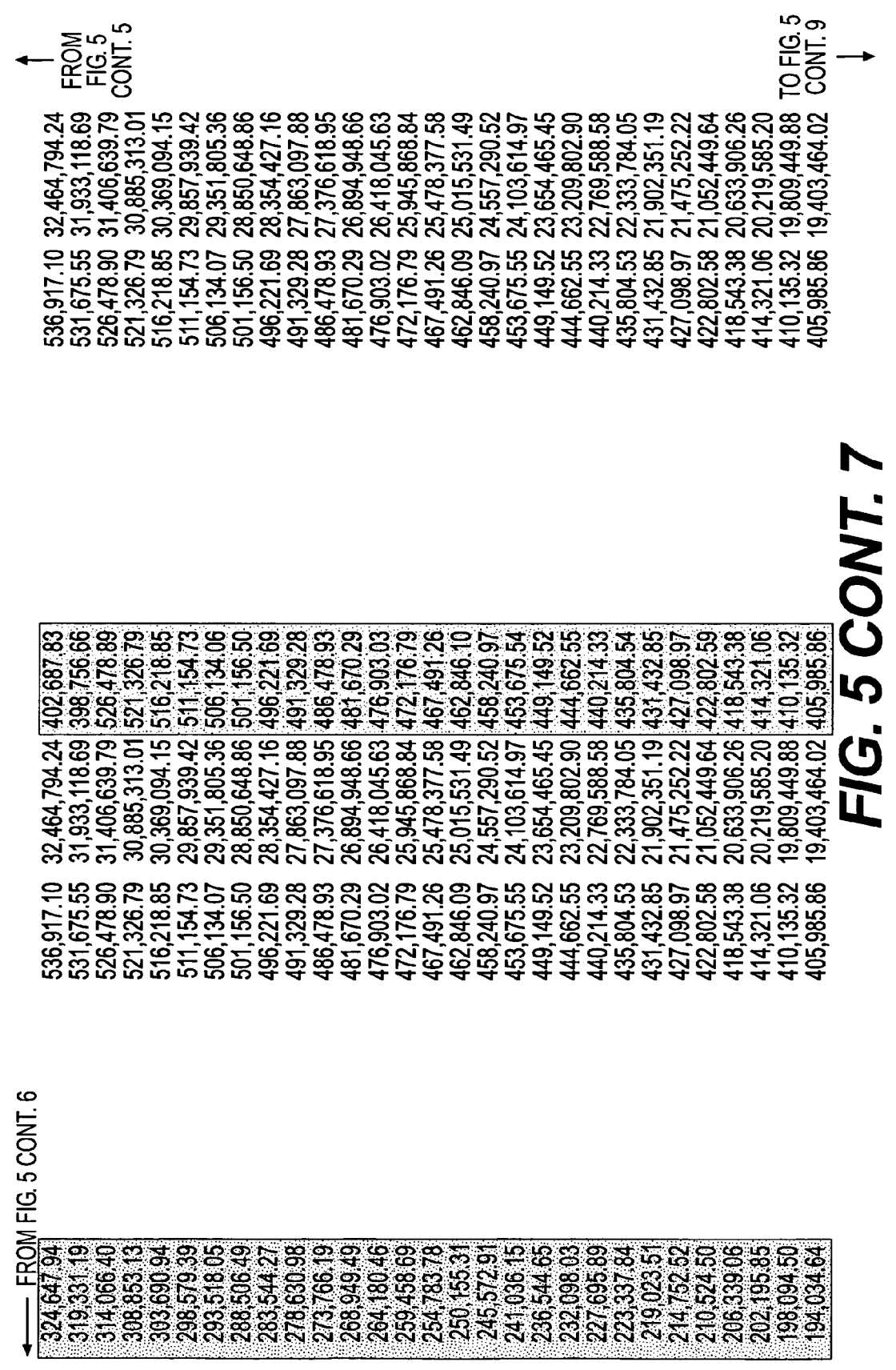

Non-Capped NAS Principal Distribution Amount. FIGS. 4-5 illustrate the example of a 9% CPR, according to one embodiment of the present invention. FIG. 4 illustrates an overview graph of the cash flow data of FIG. 4. FIG. 5 illustrates cash flow data associated with 9% CPR. As set forth in FIG. 5, in month one (1), there is $779,856.61 (line 1, column 4) of principal prepayments available and $381,356.69 (line 1, column 3) of scheduled principal available for distribution. Both principal amounts will be multiplied by the shift percentage to determine the amount of principal payable to the NAS Class. The AS class will receive the remaining amount of available principal after the NAS Class is paid its distribution amount. According to Equation (2) set forth above, in month one (1), the calculated amount of principal payable to the NAS Class will equal ($779,856.61*0%)+($381,356.69*0%)=$0. In month 45, $449,729.56 of principal prepayments and $323,571.84 of scheduled principal is available for distribution. Applying the Shift percentage distribution formula results in ($449,729.56*75%)+($323,571.84*75%)=$579,976.05 (line 45, column 15) payable to the NAS Class.

Capped NAS Total Principal Distribution Amount. The Capped NAS/AS structure adds a condition to the amount payable to the NAS Class. The condition establishes a maximum limit to the amount distributed to the NAS Class. The Capped NAS distribution rule=Min {(Principal Shift % Amount), (Cap)}. In this example, the cap is specified to equal (1%*the collateral balance in the current month), where the "collateral balance" is the unpaid principal balance of the underlying assets. In payment month one (I) under the prepayment speed assumption of 9% CPR, the collateral balance=$98,838,786.69 (line 1, column 2). The Cap is 1%*$98,838,786.69=$988,387.87. The amount payable to the NAS Class in payment month one (1) is the Minimum of ($0) or ($988,387.87)=$0. In payment month 45, the cap amount is 1%*$56,998,585.21=$569,985.85. In payment month 45, the amount payable to the NAS Class is the Minimum of $579,976.05 (line 45, column 15) or $569,985.85=$569,985.85.

35% CPR Example

Figure 6:
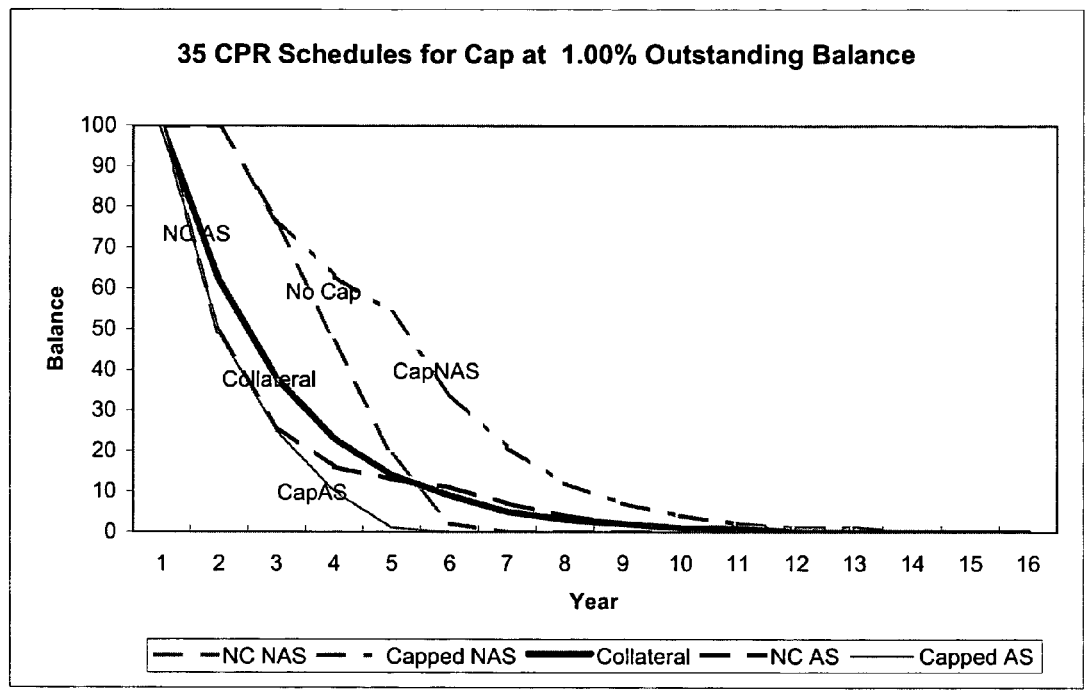

Non-Capped NAS Principal Distribution Amount. FIGS. 6-7 illustrate the example of a 35% CPR, according to one embodiment of the present invention. FIG. 6 illustrates an overview graph of the cash flow data of FIG. 7. FIG. 7 illustrates cash flow data associated with 35% CPR. As set forth in FIG. 7, In month 1, there is $3,512,739.07 (line 1, column 4) of pre-paid principal available and $381,356.69 (line 1, column 3) of scheduled principal available for distribution. The calculated amount of principal payable to the NAS Class will equal ($3,512,739.07*0%)+($381,356.69*0%)=$0. In month 45, $589,901.86 (line 45, column 4) of unscheduled and $94,225.38 of scheduled principal is available for distribution. Applying the shift percentage distribution formula results in ($589,901.86*75%)+($94,225.38*75%)=$513,095.43 payable to the NAS Class.

Capped NAS Total Principal Distribution Amount. As set forth in FIG. 7, in payment month one (1) using 35% CPR, the collateral balance=$96,105,904.23 (line 1, column 2). The Cap Amount is 1%*$96,105,904.23=$961,059.04. Therefore, the amount payable to the NAS Class in payment month one (1) is the Minimum of ($0) or ($961,059.04)=$0. In payment month 45, the cap amount is 1%*$16,139,272.05=$161,392.72 (line 45, column 5). In payment month 45, the amount payable to the NAS Class is Minimum of $513,095.43 or $161,392.72=$161,392.72. As evidenced in this example, the amount payable to the NAS Class is significantly limited by the Cap condition.

This is further illustrated in the WAL table illustrated in FIG. 8. The WAL comparison tables further demonstrate that the Capped AS Class is clearly less stable than the Non-Capped AS Class, which implies that the Capped NAS Class is more stable than the Non-Capped NAS Class. FIG. 9 further illustrates the relative decrement sensitivities between the Capped NAS and the Non-Capped NAS under 5% (columns 1-5), 9% (columns 1-5), and 35% (columns 1-5) CPR.

Computer Embodiments

Embodiments of the present invention (process 100 or any part(s) or function(s) thereof) may be implemented using hardware, software or a combination thereof and may be implemented in one or more computer systems or other processing systems. However, the manipulations performed were often referred to in terms, such as adding or comparing, which are commonly associated with mental operations performed by a human operator. No such capability of a human operator is necessary, or desirable in most cases, in any of the operations described herein, which form part of the present invention. Rather, the operations are machine operations. Useful machines for performing the operation of embodiments of the present invention include general purpose digital computers or similar devices.

In fact, in one embodiment, the invention is directed toward one or more computer systems capable of carrying out the functionality described herein. An example of a computer system 100 is shown in FIG. 1.

The computer system 100 includes one or more processors, such as processor 104. The processor 104 is connected to a communication infrastructure 106 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 100 can include a display interface 102 that forwards graphics, text, and other data from the communication infrastructure 106 (or from a frame buffer not shown) for display on the display unit 130.

Computer system 100 also includes a main memory 108, preferably random access memory (RAM), and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 318 in a well-known manner. Removable storage unit 118 represents a floppy disk, magnetic tape, optical disk, etc., which is read by and written to by removable storage drive 114. As will be appreciated, the removable storage unit 118 includes a computer usable storage medium having stored therein computer software and/or data.

In alternative embodiments, secondary memory 110 may include other similar devices for allowing computer programs or other instructions to be loaded into computer system 100. Such devices may include, for example, a removable storage unit 122 and an interface 120. Examples of such may include a program cartridge and cartridge interface (such as that found in video game devices), a removable memory chip, such as an erasable programmable read only memory (EPROM), or programmable read only memory (PROM)) and associated socket, and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 114, a hard disk installed in hard disk drive 112, and signals 128. These computer program products provide software to computer system 100. Embodiments of the invention are directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features of embodiments of the present invention, as discussed herein. In particular, the computer programs, when executed, enable the processor 104 to perform the features of embodiments of the present invention. Accordingly, such computer programs represent controllers of the computer system 100.

In an embodiment where the invention is implemented using software, the software may be stored in a computer program product and loaded into computer system 100 using removable storage drive 114, hard drive 112 or communications interface 124. The control logic (software), when executed by the processor 104, causes the processor 104 to perform the functions of embodiments of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention.

For example, the Capped NAS payment rule has been described above with respect to the Agency mortgage-related securities market, but has application to non-Agency mortgage-related securities, as well as any type of security with structured cash flows (i.e., based on expected or recurring cash flows). Thus, the present invention should not be limited by any of the above-described exemplary embodiments.

In addition, it should be understood that the Figures described above, which highlight the functionality and advantages of the present invention, are presented for example purposes only. The architecture of the present invention is sufficiently flexible and configurable, such that it may be utilized in ways other than that shown in the Figures.

Further, the purpose of the Abstract and the Summary are to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract and the Summary are not intended to be limiting as to the scope of the present invention in any way.

What is claimed is:

1. A computer-implemented method of prioritizing principal payments for structured cash flow securities to efficiently distribute yield and risk, the method comprising:

structuring a package of NAS Class securities using a processor;

structuring a package of AS Class securities using the processor;

determining, using the processor, an amount of available principal to be distributed to the NAS Class and the AS Class;

calculating, according to a predetermined formula and using the processor, an amount of principal payable to the NAS Class from the available principal, wherein the calculated amount of principal payment to the NAS Class is subject to a cap under predetermined circumstances;

paying the calculated amount of principal payments to the NAS Class; and paying a remainder amount of the available principal to the AS Class, unless the AS Class has been extinguished.

2. The method of claim 1, wherein the predetermined formula is:

NAS principal payment=MIN {[(X %*shift %*prepaid principal payments available)+(Y %*shift %*amortized principal payments available)], [cap]}, wherein:

X % and Y % are multipliers used to affect the relative percentages of the prepaid versus amortized principal respectively, and shift % is the percentage of principal to be shifted to the NAS Class based upon a predetermined shifting schedule.

3. The method of claim 2, further comprising calculating the cap as:

cap=(Z %*collateral balance*shift %), wherein Z % is a user-determined multiplier.

4. The method of claim 3, wherein:

Z % equals one, and the cap=(collateral balance*shift %).

5. The method of claim 2, wherein:

X % and Y % equal one, and

NAS principal payment=MIN {[(shift %*prepaid principal payments available)+(shift %*amortized principal payments available)], [cap]}.

6. The method of claim 5, further comprising calculating the cap as:
cap=(Z %*collateral balance*shift %), wherein Z % is a user-determined multiplier.

7. The method of claim 6, wherein:
Z % equals one, and
the cap=(collateral balance*shift %).

8. The method of claim 2, further comprising issuing a structured security including the NAS Class and the AS Class.

9. The method of claim 2, wherein the structured cash flow securities are mortgage backed.

10. The method of claim 2, wherein the structured cash flow securities are non-mortgage related business cash flows.

11. A computer program product comprising a computer usable medium having control logic stored therein which, when executed by a processor, performs a method for prioritizing principal payments for structured cash flow securities to efficiently distribute yield and risk, the method comprising:
structuring a package of NAS Class securities;
structuring a package of AS Class securities;
determining an amount of available principal to be distributed to the NAS Class and the AS Class;
calculating, according to a predetermined formula, an amount of principal payable to the NAS Class from the available principal, wherein the calculated amount of principal payment to the NAS Class is subject to a cap under predetermined circumstances;
paying the calculated amount of principal payment to the NAS Class; and
paying a remainder amount of the available principal to the AS Class, unless the AS Class has been extinguished.

12. The computer program product of claim 11, wherein the predetermined formula is:
NAS principal payment=MIN {[(X %*shift %*prepaid principal payments available)+(Y %*shift %*amortized principal payments available)], [cap]}, wherein:

X % and Y % are multipliers used to affect the relative percentages of the prepaid versus the amortized principal respectively, and
shift % is the percentage of principal to be shifted to the NAS Class based upon a predetermined shifting schedule.

13. The computer program product of claim 12, wherein the method further comprises calculating the cap as:
cap=(Z %*collateral balance*shift %), wherein Z % is a user-determined multiplier.

14. The computer program product of claim 13, wherein:
Z % equals one, and
the cap=(collateral balance*shift %).

15. The computer program product of claim 12, wherein:
X % and Y % equal one, and
NAS principal payment=MIN {[(shift %*prepaid principal payments available)+(shift %*amortized principal payments available)], [cap]}.

16. The computer program product of claim 15, wherein the method further comprises calculating the cap as:
cap=(Z %*collateral balance*shift %), wherein Z % is a user determined multiplier.

17. The computer program product of claim 16, wherein:
Z % equals one, and
the cap=(collateral balance*shift %).

18. The computer program product of claim 12, wherein the method further comprises issuing a structured security including the NAS Class and the AS Class.

19. The computer program product of claim 12, wherein the structured cash flow securities are mortgage backed.

20. The computer program product of claim 12, wherein the structured cash flow securities are non-mortgage-related business cash flows.

* * * * *